(12) United States Patent
Li et al.

(10) Patent No.: US 11,229,050 B2
(45) Date of Patent: Jan. 18, 2022

(54) METHOD AND APPARATUS FOR FRAME BASED EQUIPMENT OPERATION OF NR UNLICENSED

(71) Applicant: Samsung Electronics Co., Ltd., Suwon-si (KR)

(72) Inventors: Yingzhe Li, Mountain View, CA (US); Hongbo Si, Plano, TX (US); Qiongjie Lin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 16/810,731

(22) Filed: Mar. 5, 2020

(65) Prior Publication Data

US 2020/0314891 A1 Oct. 1, 2020

Related U.S. Application Data

(60) Provisional application No. 62/826,315, filed on Mar. 29, 2019, provisional application No. 62/861,101, filed on Jun. 13, 2019, provisional application No. 62/874,770, filed on Jul. 16, 2019.

(51) Int. Cl.
*H04W 72/00* (2009.01)
*H04W 74/00* (2009.01)
*H04W 16/14* (2009.01)

(52) U.S. Cl.
CPC ......... *H04W 74/006* (2013.01); *H04W 16/14* (2013.01)

(58) Field of Classification Search
CPC ..... H04W 72/04; H04W 16/02; H04W 16/18; H04W 72/02; H04W 72/00; H04W 16/14; H04W 72/044; H04W 28/00; H04W 72/1205; H04W 28/02; H04H 20/42;
(Continued)

(56) References Cited

U.S. PATENT DOCUMENTS

| 2016/0105897 A1* | 4/2016 | Liu | H04W 72/1226 370/235 |
| 2016/0242186 A1* | 8/2016 | Nissila | H04W 28/0252 |
| 2016/0345360 A1* | 11/2016 | Papaleo | H04W 72/0446 |

(Continued)

OTHER PUBLICATIONS

Huawei et al., "Coexistence and channel access for NR unlicensed band operations", 3GPP TSG RAN WG1 Meeting #96, Feb. 25-Mar. 1, 2019, R1-1901525, 21 pages.

(Continued)

*Primary Examiner* — Shantell L Heiber

(57) ABSTRACT

A method and apparatus in a wireless communication system supporting a semi-static shared spectrum channel access is provided. The method and apparatus comprises: receiving system information carried by downlink channels; identifying a duration of idle period, a fixed frame period, a number of observation slots, and an index; determining a first phase based on a first time period between a starting instance of the idle period and an ending instance of the at least one observation slot, a second phase based on a second time period between the ending instance of the at least one observation slot and an ending instance of the idle period, and a third phase based on a third time period between the ending instance of the idle period and an ending instance of the fixed frame period; and identifying the downlink channels as an idle state in the at least one observation slot.

20 Claims, 32 Drawing Sheets

(58) Field of Classification Search
CPC ..... H04J 2203/0067; H04L 2012/5631; H04Q 2213/13526
See application file for complete search history.

(56) References Cited

U.S. PATENT DOCUMENTS

| | | | |
|---|---|---|---|
| 2017/0339588 A1* | 11/2017 | Moon | H04W 76/27 |
| 2018/0115981 A1* | 4/2018 | Kim | H04W 24/10 |
| 2018/0263054 A1* | 9/2018 | Wang | H04L 1/1887 |
| 2019/0021071 A1* | 1/2019 | Islam | H04W 72/04 |
| 2019/0098605 A1* | 3/2019 | Seo | H04L 1/1812 |
| 2019/0253976 A1* | 8/2019 | Pelletier | H04W 52/242 |

OTHER PUBLICATIONS

Samsung, "Channel access procedures for NR-U", 3GPP TSG-RAN WG1 Meeting #96, Feb. 25-Mar. 1, 2019, R1-1902257, 10 pages.
Qualcomm Incorporated, "Channel access procedures for NR unlicensed", 3GPP TSG RAN WG1 Meeting #96, Feb. 25-Mar. 1, 2019, R1-1902985, 15 pages.
Intel Corporation, "Channel access mechanism for NR-unlicensed", 3GPP TSG RAN WG1 Meeting #96, Feb. 25-Mar. 1, 2019, R1-1902471, 13 pages.
Notification of Transmittal of the International Search Report and the Written Opinion of the International Searching Authority, or the Declaration dated Jul. 2, 2020 in connection with International Patent Application No. PCT/KR2020/004052, 9 pages.
"3rd Generation Partnership Project; Technical Specification Group Radio Access Network; NR; Physical channels and modulation (Release 15)", 3GPP TS 38.211 V15.4.0, Dec. 2018, 96 pages.
"3rd Generation Partnership Project; Technical Specification Group Radio Access Network; NR; Multiplexing and channel coding (Release 15)", 3GPP TS 38.212 V15.4 0, Dec. 2018, 100 pages.
"3rd Generation Partnership Project; Technical Specification Group Radio Access Network; NR; Physical layer procedures for control (Release 15)" 3GPP TS 38.213 V15.4.0, Dec. 2018, 104 pages.
"3rd Generation Partnership Project; Technical Specification Group Radio Access Network; NR; Physical layer procedures for data (Release 15)", 3GPP TS 38.214 V15.4.0, Dec. 2018, 102 pages.
"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.
IEEE Std 802.11-2016, "Part 11: Wireless LAN Medium Access Control (MAC) and Physical Layer (PHY) Specifications", 2016, 3534 pages.
ETSI EN 301 893 V2.1.1, "5 GHz RLAN; Harmonised Standard covering the essential requirements of article 3.2 of Directive 2014/53/EU", 2017, 135 pages.
ETSI EN 302 567 V2.1.1, "Multiple-Gigabit/s radio equipment operating in the 60 GHz band; Harmonised Standard covering the essential requirements of article 3.2 of Directive 2014/53/EU", 2017, 40 pages.

* cited by examiner

NR-U common preamble
NR-U transmission

METHOD AND APPARATUS FOR FRAME BASED EQUIPMENT OPERATION OF NR UNLICENSED

CROSS-REFERENCE TO RELATED APPLICATIONS AND CLAIM OF PRIORITY

The present application claims priority to:
U.S. Provisional Patent Application No. 62/826,315, filed on Mar. 29, 2019;
U.S. Provisional Patent Application No. 62/861,101, filed on Jun. 13, 2019; and
U.S. Provisional Patent Application No. 62/874,770, filed on Jul. 16, 2019.
The content of the above-identified patent documents is incorporated herein by reference.

TECHNICAL FIELD

The present disclosure relates generally to wireless communication systems and, more specifically, to a frame based equipment operation of an NR unlicensed.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide a frame based equipment operation of an NR unlicensed.

In one embodiment, a user equipment (UE) in a wireless communication system supporting a semi-static shared spectrum channel access is provided. The UE comprises at least one transceiver configured to receive, from a base station (BS), system information carried by downlink channels that are sensed by the BS. The UE further comprises at least one processor operably connected to the at least one transceiver, the at least one processor configured to: identify, based on the system information, a duration of idle period, a fixed frame period, a number of observation slots included in the duration of idle period, and an index of at least one observation slot; determine a channel occupancy time based on the identified duration of idle period and the fized frame period; determine a first phase based on a first time period between a starting instance of the idle period and an ending instance of the at least one observation slot; determine a second phase based on a second time period between the ending instance of the at least one observation slot and an ending instance of the idle period; determine a third phase based on a third time period between the ending instance of the idle period and an ending instance of the channel occupancy time; and identify the downlink channels as an idle state in the at least one observation slot.

In another embodiment, a base station (BS) in a wireless communication system supporting a semi-static shared spectrum channel access is provided. The BS comprises at least one processor configured to: sense downlink channels to transmit, to a user equipment (UE), system information, and generate the system information including a duration of idle period, a fixed frame period, a number of observation slots included in the duration of idle period, and an index of at least one observation slot. The BS further comprises at least one transceiver operably connected to the at least one processor, the at least one transceiver configured to transmit, to the UE, the generated system information over the sensed downlink, wherein a channel occupancy time is determined based on the duration of idle period and the fixed frame period, and wherein a first phase, a second phase, and a third phase are determined based on a first time period between a starting instance of the idle period and an ending instance of the at least one observation slot, a second time period between the ending instance of the at least one observation slot and an ending instance of the idle period, and a third time period between the ending instance of the idle period and an ending instance of the channel occupancy time, respectively, and wherein the downlink channels are determined as an idle state in the at least one observation slot.

In yet another embodiment, a method of a user equipment (UE) in a wireless communication system supporting a semi-static shared spectrum channel access is provided. The method comprises receiving, from a base station (BS), system information carried by downlink channels that are sensed by the BS; identifying, based on the system information, a duration of idle period, a fixed frame period, a number of observation slots included in the duration of idle period, and an index of at least one observation slot; determining a channel occupancy time based on the identified based on the duration of idle period and the fixed frame period; determining a first phase based on a first time period between a starting instance of the idle period and an ending instance of the at least one observation slot; determining a second phase based on a second time period between the ending instance of the at least one observation slot and an ending instance of the idle period; determining a third phase based on a third time period between the ending instance of the idle period and an ending instance of the channel occupancy time; and identifying the downlink channels as an idle state in the at least one observation slot.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 43, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 38.211 v15.4.0, "E-UTRA, Physical channels and modulation;" 3GPP TS 38.212 v15.4.0, "E-UTRA, Multiplexing and Channel coding;" 3GPP TS 38.213 v15.4.0, "E-UTRA, Physical Layer Procedures;" 3GPP TS 38.214 v 15.4.0, "NR, Physical Layer Procedures for Data;" 3GPP TS 38.331 v15.4.0, "NR, Radio Resource Control (RRC) protocol specification;" ETSI EN 301 893 V2.1.1, "5 GHz RLAN: Harmonized Standard covering the essential requirements of article 3.2 of Directive 2014/53/EU," 2017; ETSI EN 302 567 V2.1.1, "Multiple-Gigabit/s radio equipment operating in the 60 GHz band: Harmonized Standard covering the essential requirements of article 3.2 of Directive 2014/53/EU," 2017; 3GPP TR 36.889 V13.0.0, "Study on Licensed-Assisted Access to Unlicensed Spectrum," 2015; and IEEE Std 802.11-2016, "Part 11: Wireless LAN Medium Access Control (MAC) and Physical Layer (PHY) Specifications," 2016.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
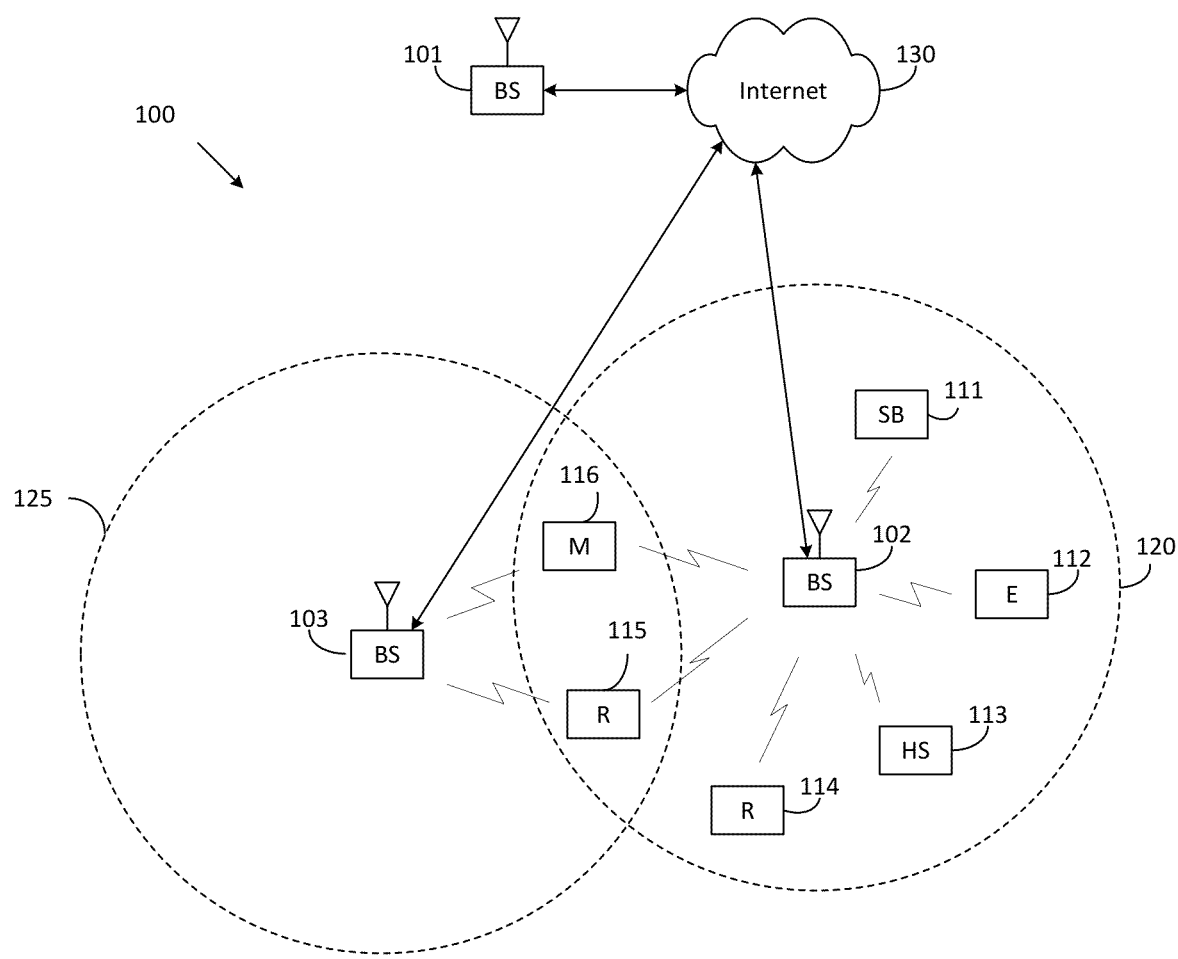
FIG. 1 illustrates an example wireless network according to embodiments of the present disclosure.
Figure 2:
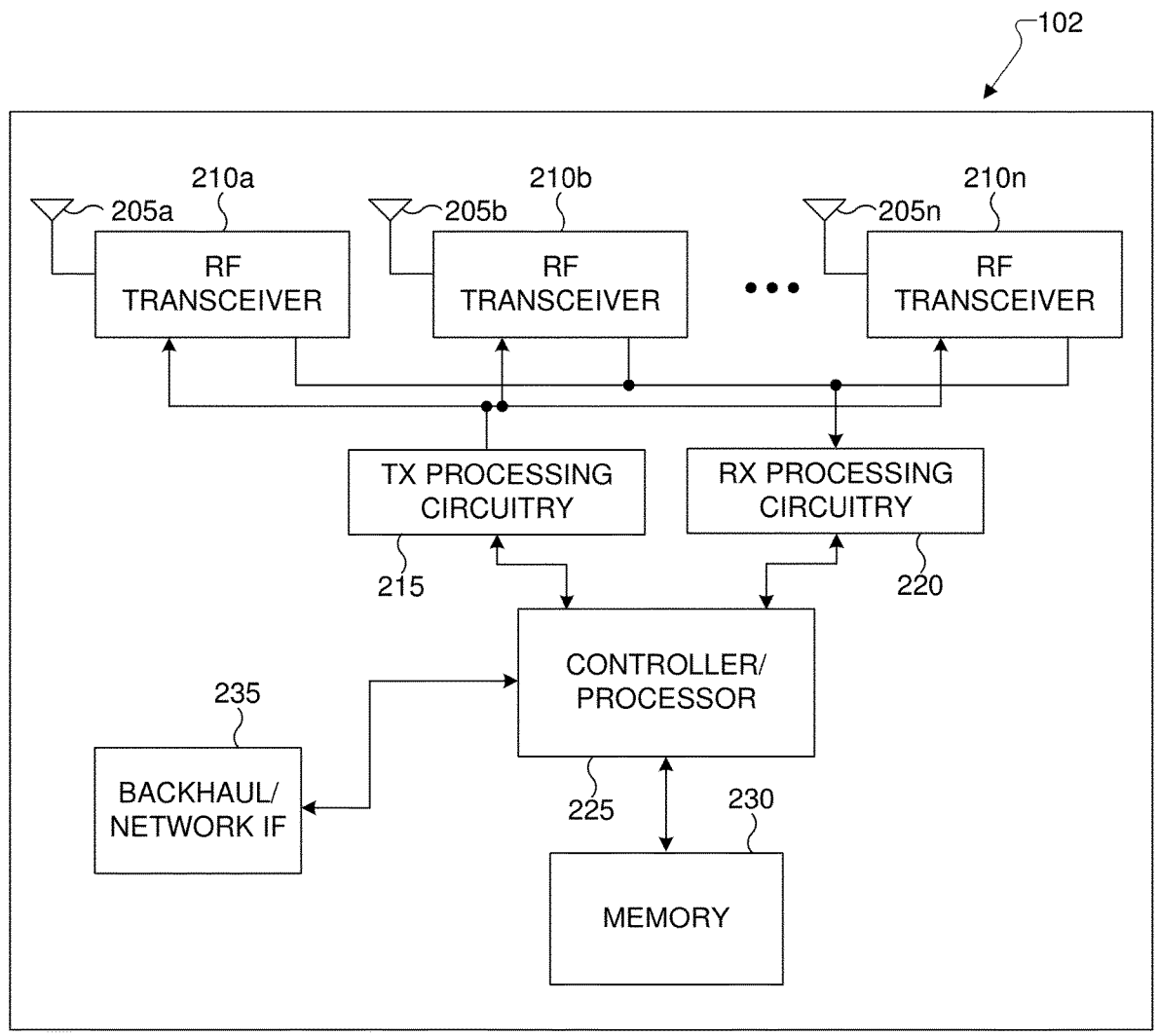
FIG. 2 illustrates an example gNB according to embodiments of the present disclosure.
Figure 3:
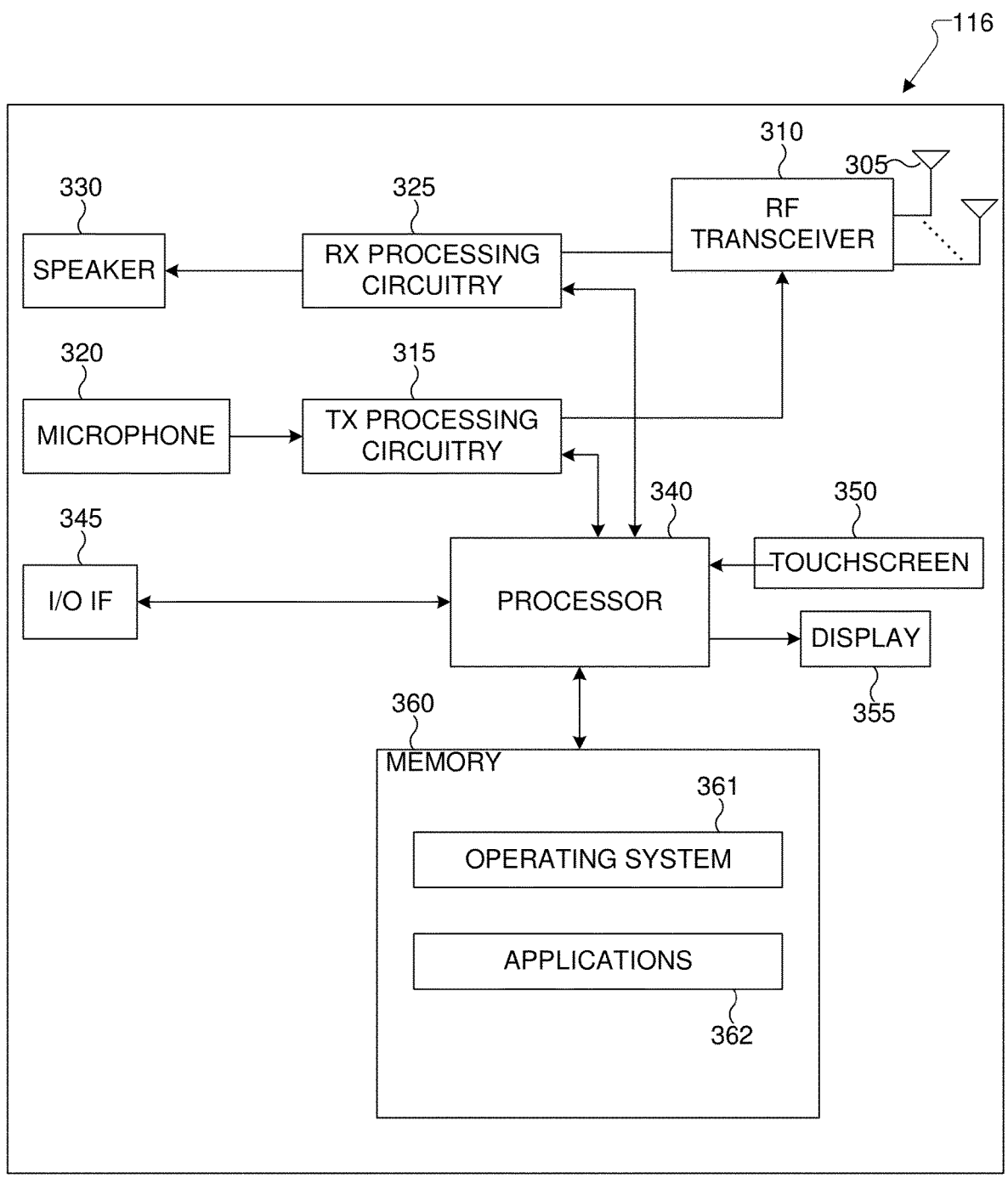
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or gNB), a 5G base station (a gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient frame-based equipment operation for wideband operations of NE unlicensed spectrum in advanced wireless communication system. In certain embodiments, and one or more of the gNBs 101-103 includes circuitry, programing, or a combination thereof, for efficient frame-based equipment operation for wideband operations of NE unlicensed spectrum in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting the PSS and SSS over downlink channels.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of generating a primary synchronization signal (PSS) including one of multiple PSS sequences that is generated based on a binary phase shift keying (BPSK) modulated length-127 M-sequence in a frequency domain, wherein the PSS includes part of cell identification (ID) information.

In some embodiments, the controller/processor 225 is capable of generating a secondary synchronization signal (SSS) including one of multiple SSS sequences that is generated based on multiple BPSK modulated length-127 M-sequences in the frequency domain, wherein the SSS includes the cell identification (ID) information.

In some embodiments, the controller/processor 225 is capable of determining a number of PSS sequences corresponding to a number of cell ID hypotheses carried by PSS, respectively and a number of SSS sequences corresponding to the number of cell ID hypotheses carried by the PSS and SSS, respectively.

In some embodiments, the controller/processor 225 is capable of determining a polynomial for an M-sequence generating the PSS sequence and a cyclic shift for the M-sequence based on the cell ID information carried by PSS, and generating the PSS sequence by performing the cyclic shift to the M-sequence for a cell ID.

In some embodiments, the controller/processor 225 is capable of determining a polynomial for a first M-sequence generating the SSS sequence, a first cyclic shift for the first M-sequence based on the cell ID information carried by PSS and SSS, the polynomial for a second M-sequence generating the SSS sequence, a second cyclic shift for the second M-sequence based on the cell ID information carried by PSS and SSS, and generating the SSS sequence by performing a product of the first and second M-sequences, wherein each of the first and second M-sequences is generated by the first and second cyclic shifts, respectively, for the cell ID.

In such embodiments, the polynomial for the M-sequence is given by $x^7+x^4+1$ and a corresponding recursive construction scheme is given by $d_M(i+7)=[d_M(i+4)+d_M(i)]\mod 2$, $0\leq i\leq 119$, the polynomial for the first M-sequence is given by $x^7+x^4+1$ and a corresponding recursive construction scheme is given by $d_M(i+7)=[d_M(i+4)+d_M(i)]\mod 2$, $0\leq i\leq 119$, and the polynomial for the second M-sequence is given by $x^7+x+1$ and a corresponding recursive construction scheme is given by $d_M(i+7)=[d_M(i+1)+d_M(i)]\mod 2$, $0\leq i\leq 119$.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving a primary synchronization signal (PSS) and a secondary synchronization signal (SSS) over downlink channels.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of determining the PSS including one of multiple PSS sequences that is generated based on a binary phase shift keying (BPSK) modulated length-127 M-sequence in a frequency domain, wherein the PSS includes part of cell identification (ID) information and the SSS including one of multiple SSS sequences that is generated based on multiple BPSK modulated length-127 M-sequences in the frequency domain, wherein the SSS includes the cell identification (ID) information.

In some embodiments, the processor 340 is capable of determining a number of PSS sequences corresponding to a number of cell ID hypotheses carried by PSS, respectively; and a number of SSS sequences corresponding to the number of cell ID hypotheses carried by the PSS and SSS, respectively.

In some embodiments, the processor 340 is capable of determining a polynomial for an M-sequence generating the PSS sequence, a cyclic shift for the M-sequence based on the cell ID information carried by PSS, and generating the PSS sequence by performing the cyclic shift to the M-sequence for a cell ID.

In some embodiments, the processor 340 is capable of determining a polynomial for a first M-sequence generating the SSS sequence, a first cyclic shift for the first M-sequence based on the cell ID information carried by PSS and SSS, the polynomial for a second M-sequence generating the SSS sequence, a second cyclic shift for the second M-sequence based on the cell ID information carried by PSS and SSS, and generating the SSS sequence by performing a product of the first and second M-sequences, wherein each of the first and second M-sequences is generated by the first and second cyclic shifts, respectively, for the cell ID.

In such embodiments, the polynomial for the M-sequence is given by $x^7+x^4+1$ and a corresponding recursive construction scheme is given by $d_M(i+7)=[d_M(i+4)+d_M(i)] \mod 2$, $0 \le i \le 119$, the polynomial for the first M-sequence is given by $x^7+x^4+1$ and a corresponding recursive construction scheme is given by $d_M(i+7)=[d_M(i+4)+d_M(i)] \mod 2$, $0 \le i \le 119$, and the polynomial for the second M-sequence is given by $x^7+x+1$ and a corresponding recursive construction scheme is given by $d_M(i+7)=[d_M(i+1)+d_M(i)] \mod 2$, $0 \le i \le 119$.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
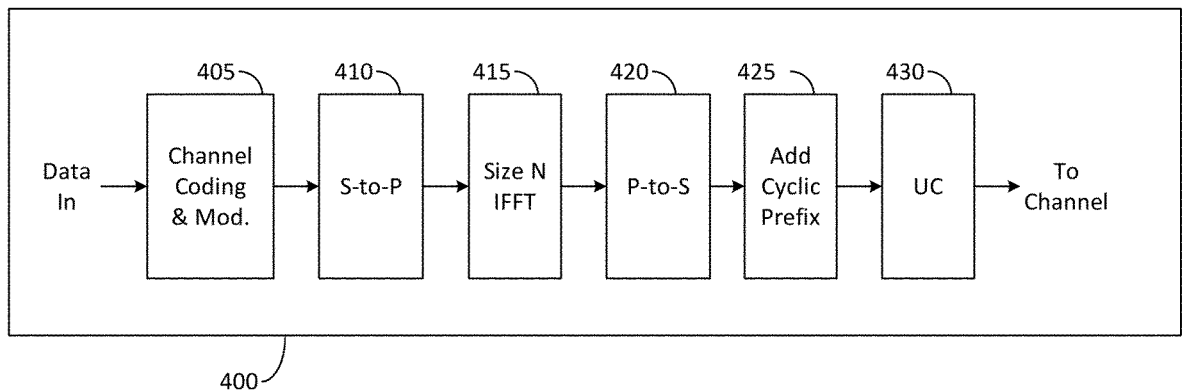
FIG. 4A illustrates a high-level diagram of an orthogonal frequency division multiple access transmit path according to embodiments of the present disclosure.
Figure 4B:
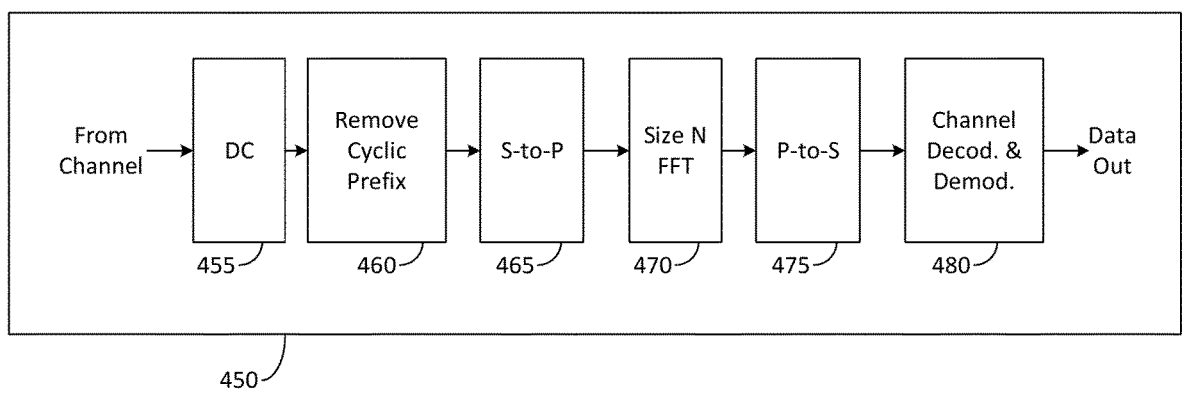
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB, eNB) 102 or a relay station, and the receive path circuitry may be implemented in a user equipment (e.g., user equipment 116 of FIG. 1). In other examples, for uplink communication, the receive path circuitry 450 may be implemented in a base station (e.g., the gNB 102 of FIG. 1) or a relay station, and the transmit path circuitry may be implemented in a user equipment (e.g., the user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to the gNBs 101-103 and may implement a receive path corresponding to the architecture for receiving in the downlink from the gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
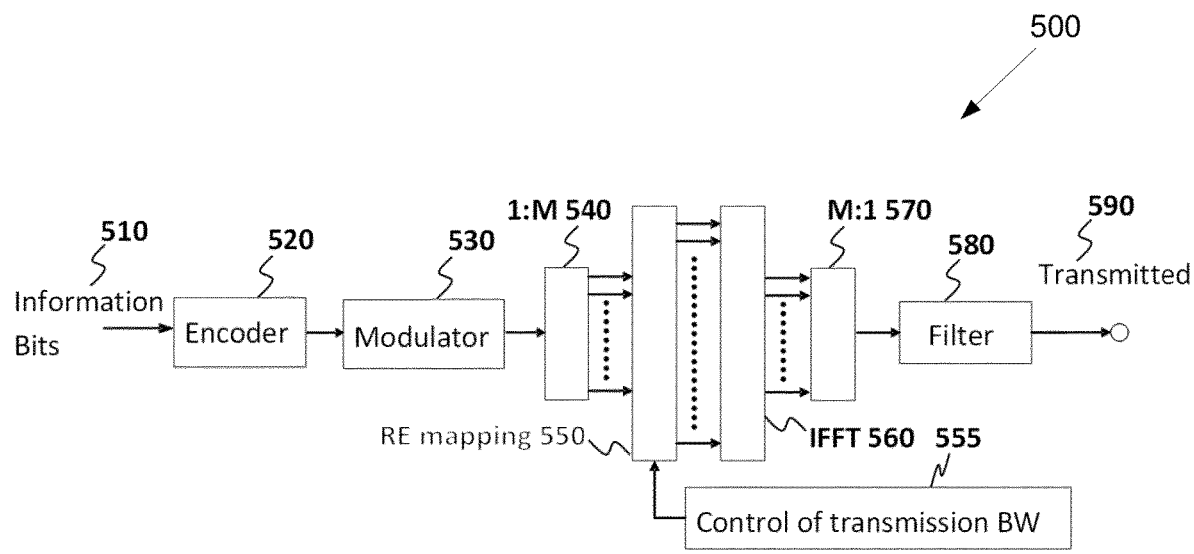
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
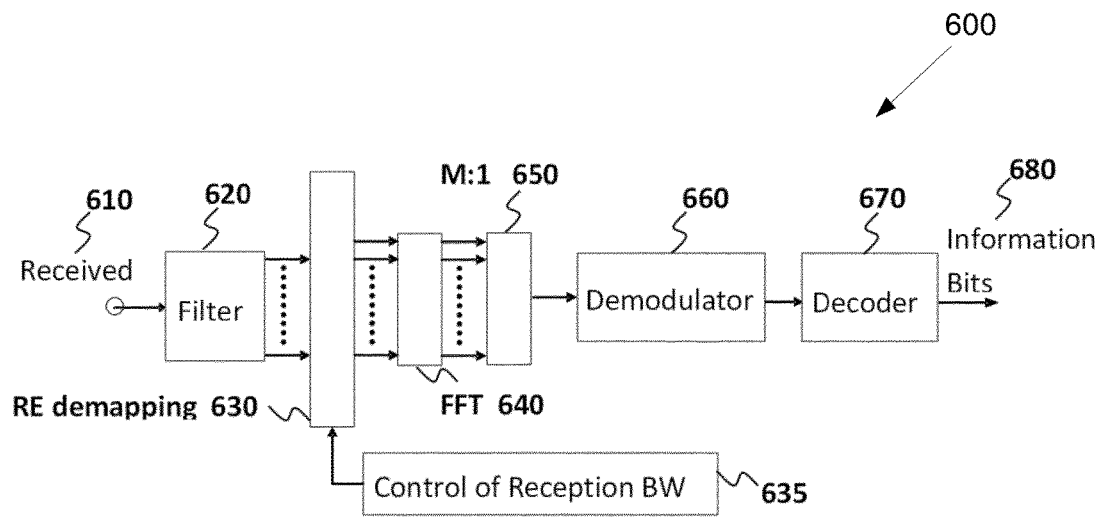
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
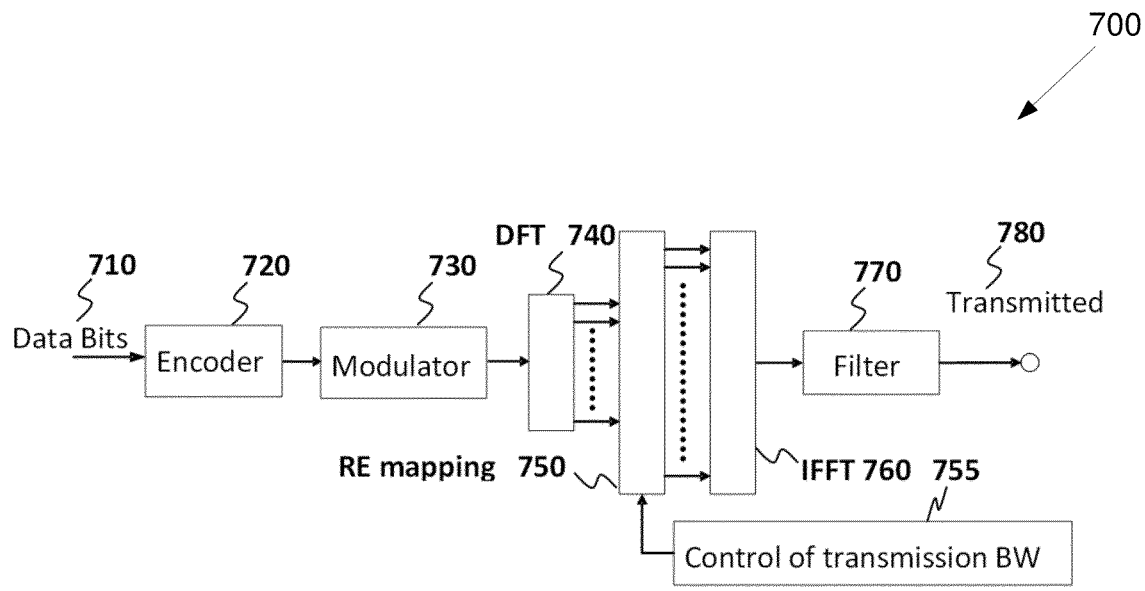
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
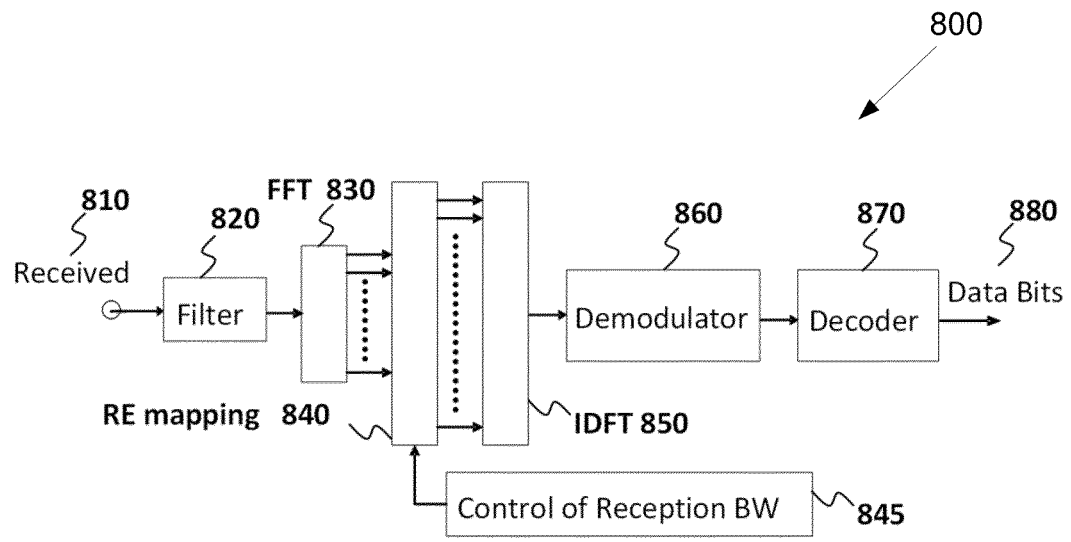
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
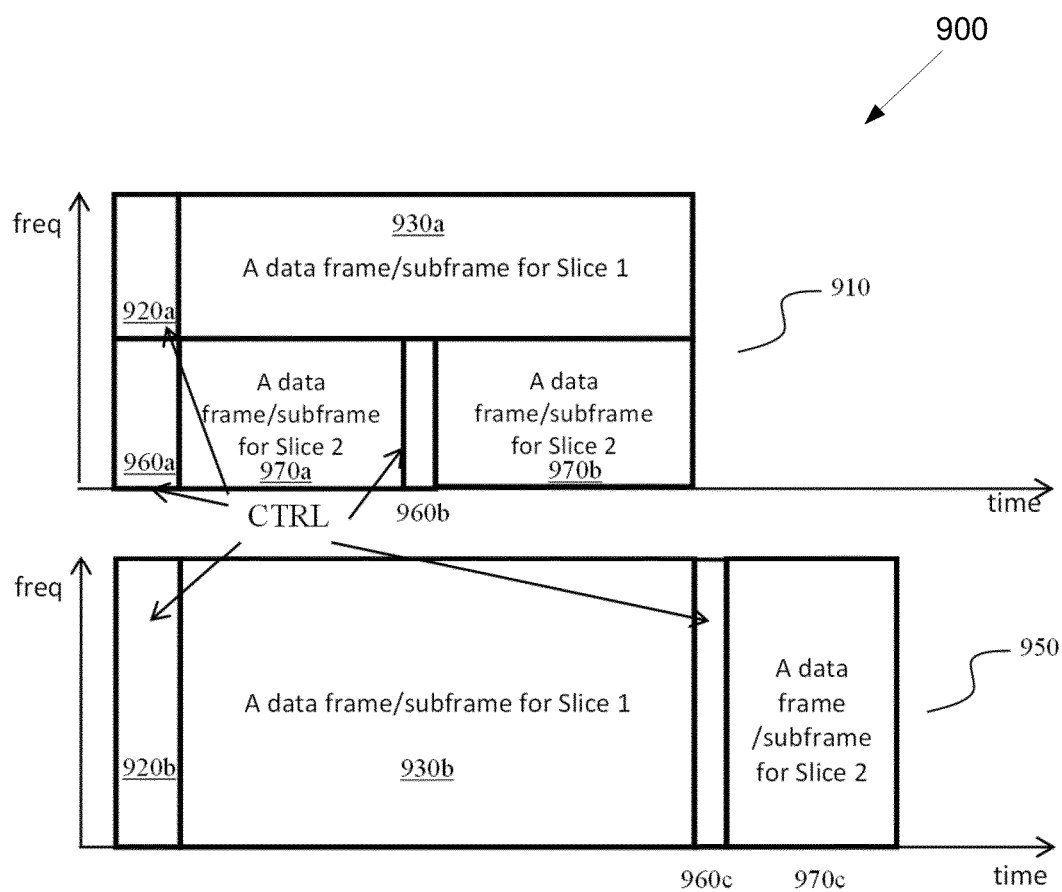
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
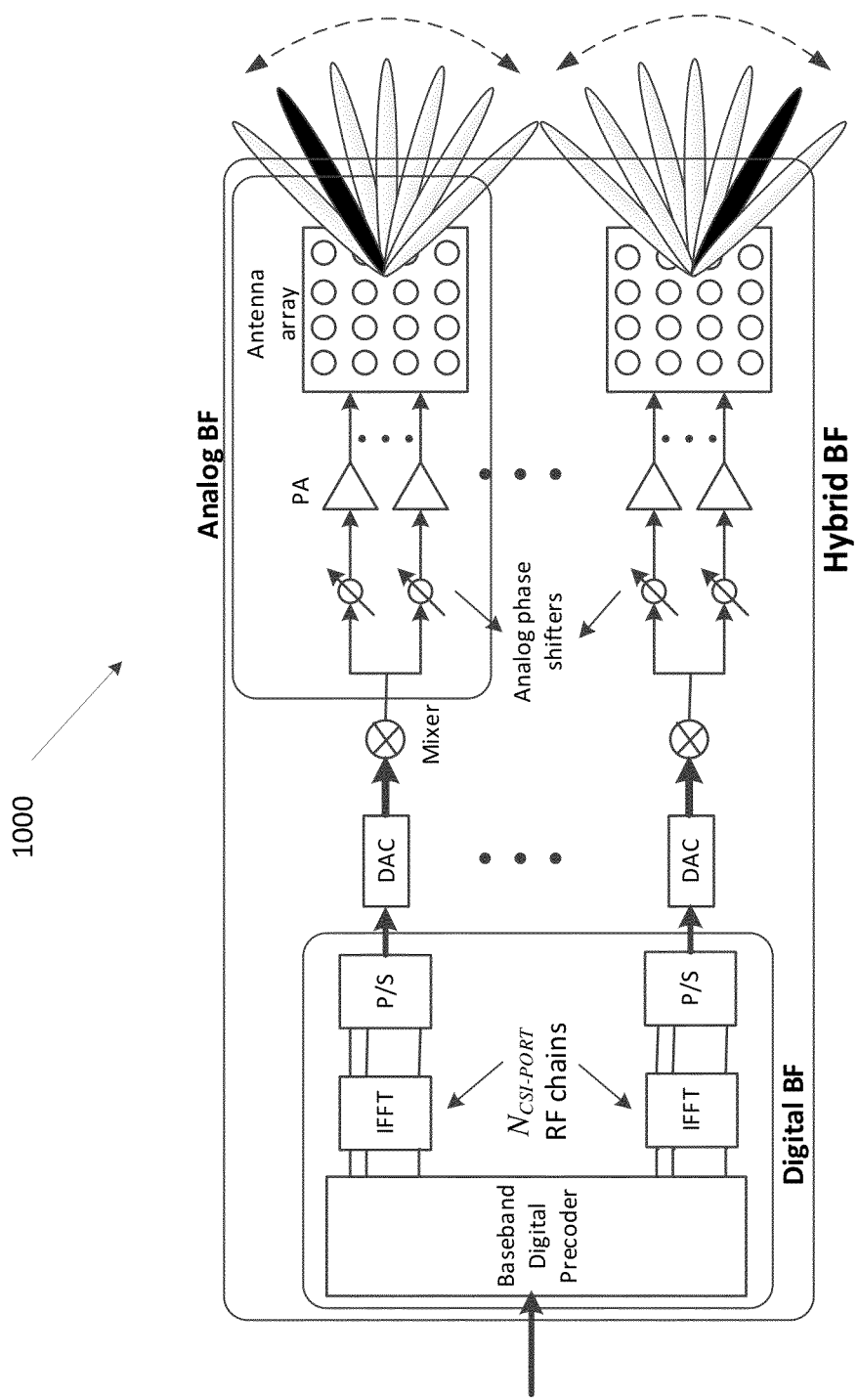
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
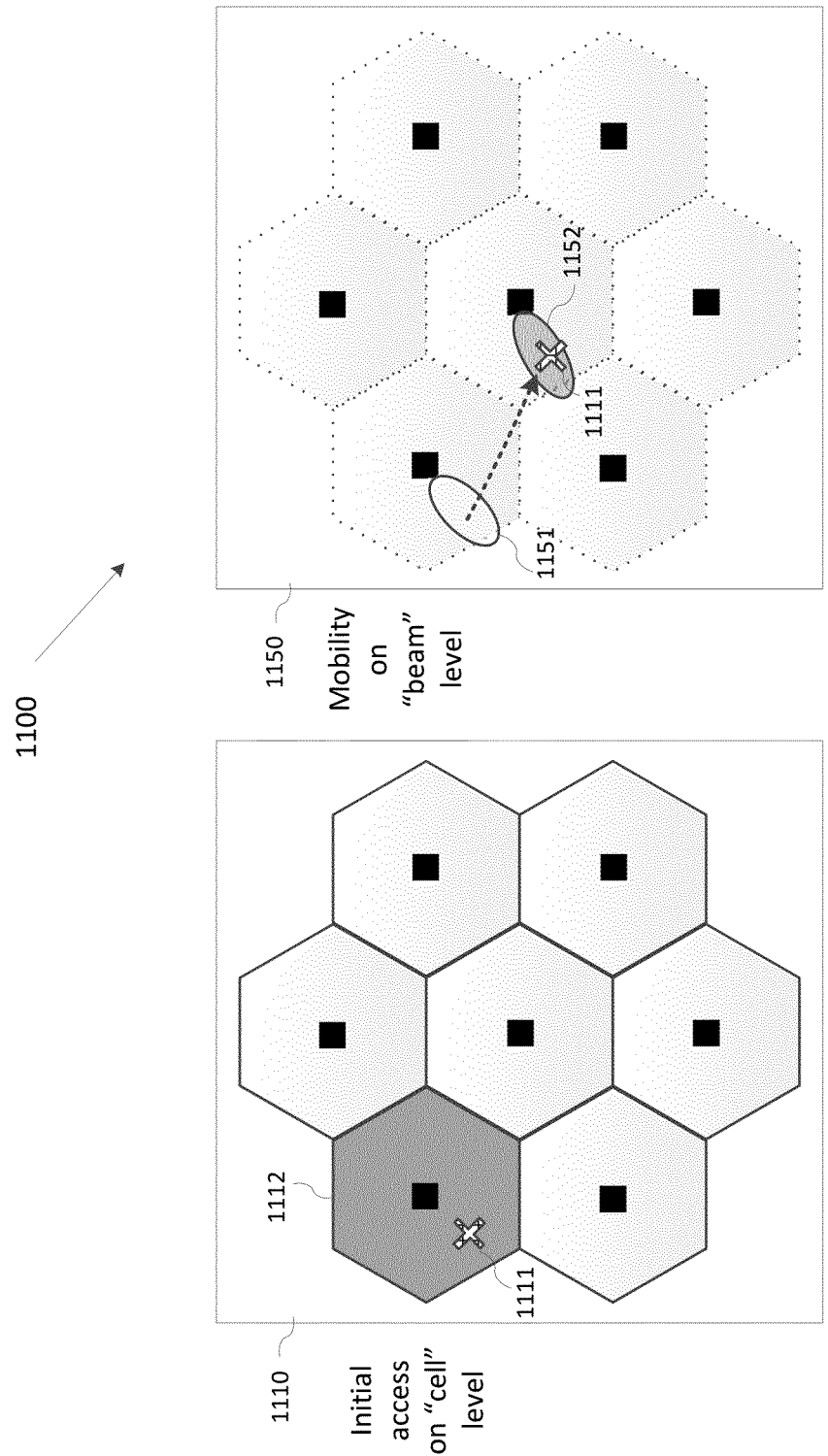
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in embodiment 1150. That is, UE mobility is handled on beam level rather than cell level, where one cell can be associated with N beams (N can be 1 or >1). Unlike cell, however, beam is a physical layer entity. Therefore, UE mobility management is handled solely on physical layer. An example of UE mobility scenario based on the second level RR is given in embodiment 1150 of FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring M beam (or RR) acquisition signals.

Figure 12:
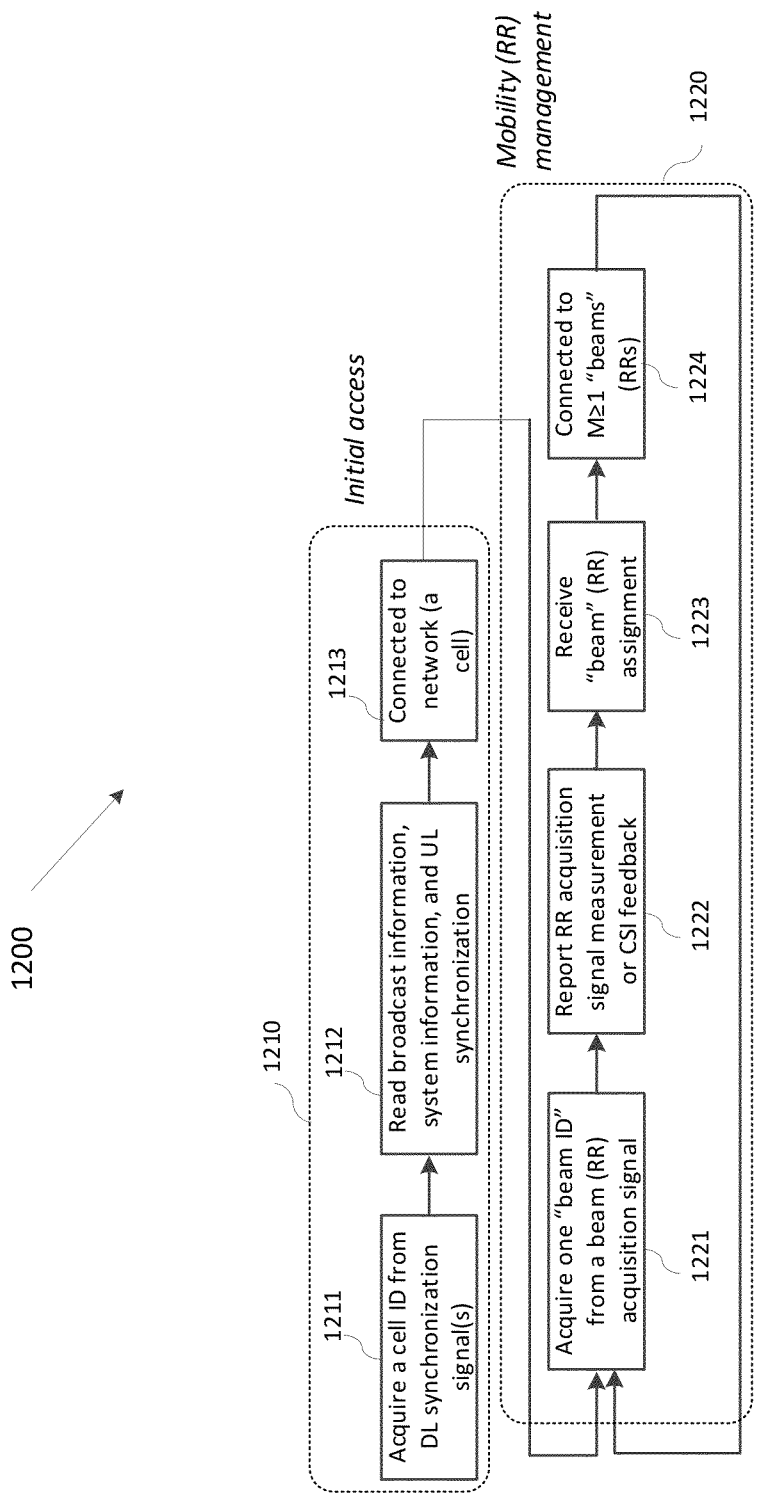
FIG. 12 illustrates an example beam sweeping operation according to embodiments of the present disclosure.

FIG. 12 illustrates an example beam sweeping operation 1200 according to embodiments of the present disclosure. The embodiment of the beam sweeping operation 1200 illustrated in FIG. 12 is for illustration only. FIG. 12 does not limit the scope of this disclosure to any particular implementation of the beam sweeping operation 1200.

As shown in FIG. 12, the aforementioned initial access procedure 1210 and the aforementioned mobility or radio resource management 1220 from the perspective of a UE are described. The initial access procedure 1210 includes cell ID acquisition from DL synchronization signal(s) 1211 as well as retrieval of broadcast information (along with system information required by the UE to establish DL and UL connections) followed by UL synchronization (which can include random access procedure). Once the UE completes 1211 and 1212, the UE is connected to the network and associated with a cell. Following the completion of initial access procedure, the UE, possibly mobile, is in an RRM state described in 1220. This state includes, first, an acquisition stage 1221 where the UE can periodically (repeatedly) attempt to acquire a "beam" or RR ID from a "beam" or RR acquisition signal (such as a measurement RS).

The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE system. In this case, the UE can be configured with a set of K>1 CSI-RS resources to monitor. Several options are possible for measurement report 1222. First, the UE can measure each of the K CSI-RS resources, calculate a corresponding RS power (similar to RSRP or RSRQ in LTE system), and report the RS power to the TRP (or network). Second, the UE can measure each of the K CSI-RS resources, calculate an associated CSI (which can include CQI and potentially other CSI parameters such as RI and PMI), and report the CSI to the TRP (or network). Based on the report from the UE, the UE is assigned M≥1 "beams" or RRs either via a higher-layer (RRC) signaling or an L1/L2 control signaling 1223. Therefore, the UE is connected to these M "beams"/RRs.

For certain scenarios such as asynchronous networks, the UE can fall back to cell ID based or cell-level mobility management similar to 3GPP LTE system. Therefore, only one of the two levels of radio resource entity (cell) is applicable. When a two-level ("cell" and "beam") radio resource entity or management is utilized, synchronization signal(s) can be designed primarily for initial access into the network. For mmWave systems where analog beam sweeping (as shown in FIG. 12) or repetition may be used for enhancing the coverage of common signals (such as synchronization signal(s) and broadcast channel), synchronization signals can be repeated across time (such as across OFDM symbols or slots or subframes). This repetition factor, however, is not necessarily correlated to the number of supported "beams" (defined as radio resource units, to be differentiated with the analog beams used in beam sweeping) per cell or per TRP. Therefore, beam identification (ID) is not acquired or detected from synchronization signal(s). Instead, beam ID is carried by a beam (RR) acquisition signal such as measurement RS. Likewise, beam (RR) acquisition signal does not carry cell ID (hence, cell ID is not detected from beam or RR acquisition signal).

Therefore, considering the above new challenges in initial access procedure and RRM for the new radio access technology (NR), there is a need for designing synchronization signals (along with their associated UE procedures) and primary broadcast channel which carries broadcast information (e.g., master information block or MIB).

In the present disclosure, numerology refers to a set of signal parameters which can include subframe duration, sub-carrier spacing, cyclic prefix length, transmission bandwidth, or any combination of these signal parameters.

For LTE, primary and secondary synchronization signals (PSS and SSS, respectively) are used for coarse timing and frequency synchronization and cell ID acquisition. Since PSS/SSS is transmitted twice per 10 ms radio frame and time-domain enumeration is introduced in terms of system frame number (SFN, included in the MIB), frame timing is detected from PSS/SSS to avoid the need for increasing the detection burden from PBCH.

In addition, a cyclic prefix (CP) length and, if unknown, duplexing scheme can be detected from PSS/SSS. The PSS is constructed from a frequency-domain ZC sequence of length 63, with the middle element truncated to avoid using the d.c. subcarrier. Three roots are selected for PSS to represent the three physical layer identities within each group of cells. The SSS sequences are based on the maximum length sequences (also known as M-sequences). Each SSS sequence is constructed by interleaving two length-31 BPSK modulated sequences in frequency domain, where the two source sequences before modulation are different cyclic shifts of the same M-sequence.

The cyclic shift indices are constructed from the physical cell ID group. Since PSS/SSS detection can be faulty (due to, for instance, non-idealities in the auto- and cross-correlation properties of PSS/SSS and lack of CRC protection), cell ID hypotheses detected from PSS/SSS may occasionally be confirmed via PBCH detection. PBCH is primarily used to signal the master block information (MIB) which consists of DL and UL system bandwidth information (3 bits), PHICH information (3 bits), and SFN (8 bits).

Adding 10 reserved bits (for other uses such as MTC), the MIB payload amounts to 24 bits. After appended with a 16-bit CRC, a rate-⅓ tail-biting convolutional coding, 4× repetition, and QPSK modulation are applied to the 40-bit codeword. The resulting QPSK symbol stream is transmitted across 4 subframes spread over 4 radio frames. Other than detecting MIB, blind detection of the number of CRS ports is also needed for PBCH.

Frame based equipment, or FBE, is a channel access mechanism wherein the transmit/receive structure has a periodic timing with a periodicity named the fixed frame period (FFP); and that the initiating device may perform listen-before-talk (LBT) during an observation slot before starting transmissions on an operating channel at the start of a FFP. The FFP is within 1 ms to 10 ms, and the observation slot is at least 9 microseconds. If the LBT fails on an operating channel, the initiating device may not transmit on that channel, except for short control signaling transmissions providing it complies with certain requirements.

Figure 13:
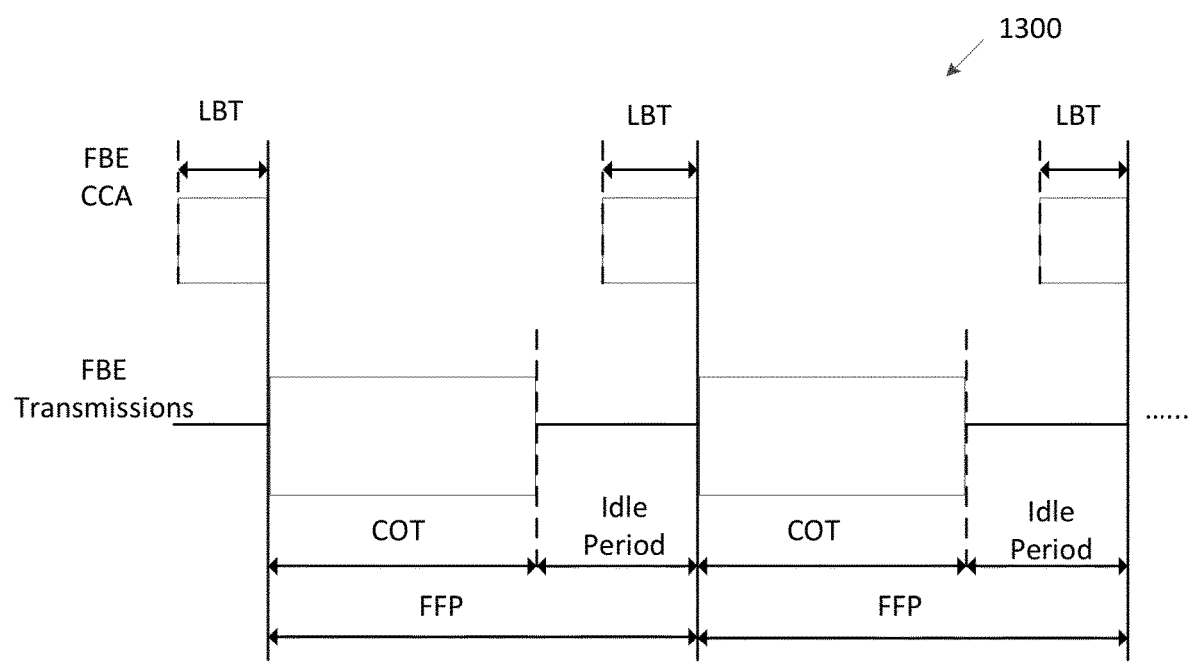
FIG. 13 illustrates an example timing for FBE operation according to embodiments of the present disclosure.

FIG. 13 illustrates an example timing for FBE operation 1300 according to embodiments of the present disclosure. The embodiment of the timing for FBE operation 1300 illustrated in FIG. 13 is for illustration only. FIG. 13 does not limit the scope of this disclosure to any particular implementation.

The channel occupancy time (COT) associated with a successful LBT check for an FBE operation may be no greater than 95% of the FFP, and the COT may be followed by an idle period until the start of next FFP such that the idle period is at least the max(5% of channel occupancy time, 100 microseconds). FIG. 13 gives the basic example of timing for FBE operation. In the present disclosure, an observation slot refers to the duration for an FBE device to perform LBT, while an NR-U slot refers to a slot of 14 OFDM symbols of the NR-U system.

Besides the load-based equipment (LBE) operation mode, NR unlicensed (NR-U) can also support the above FBE operation mode for various application scenarios. Examples can include a single NR-U operator exists in the operating channel(s) and other Wi-Fi network can be precluded (e.g., by deployment); and two or more NR-U operators coexist in the operating channel(s), potentially with coordination among the operators; and one or more NR-U operator coexist with an FBE operation based Wi-Fi network; etc. Compared to the LBE operation mode, the FBE operation mode can potentially have higher spectrum utilization under such scenarios, given the much simpler LBT process in FBE operation than the ones in LBE operation.

The present disclosure provides design aspects of NR-U to support the FBE operation mode, and enhancements over the baseline FBE operations to support more efficient channel access and transmissions for FBE operation-based NR-U.

The present disclosure includes several embodiments, principles, and examples that can be used in conjunction or in combination with one another or can operate as standalone.

In the present disclosure, FR1 NR-U refers to NR-U that operates in the unlicensed/shared bands in FR1, such as the 5 GHz unlicensed bands or the 6 GHz unlicensed/shared bands; and FR2 GHz NR-U refers to NR-U that operators in the unlicensed/shared bands in FR2, such as the 60 GHz unlicensed bands.

In one embodiment, principles on supporting FBE operation mode for NR-U is provided. In one embodiment, an FBE operation mode can be supported for NR-U subject to the regulation in the unlicensed/shared band of NR-U. In one example, an FBE operation mode can be supported for NR-U operating on the 5 GHz unlicensed band, wherein the unlicensed regulation already supports the FBE operation.

In another example, an FBE operation mode can be supported for FR1 NR-U operating on the 6 GHz unlicensed/shared band. In another example, an FBE operation mode can be supported for FR1 NR-U operating on the unlicensed/shared bands other than 5 GHz or 6 GHz bands.

In yet another example, an FBE operation mode can be supported for FR2 NR-U. In one sub-example, the FR2 NR-U can operate in the 60 GHz unlicensed bands. In yet another example, for FBE NR-U, the initiating device can be the gNB, and the responding device is the UE. In yet another example, for FBE NR-U, the initiating device can be the UE, and the responding device is the gNB.

In one embodiment, an FBE operation mode can be supported for a carrier, if the absence of any other technology (such as Wi-Fi) sharing the carrier can be guaranteed on a long term basis (such as by deployment), and only the NR-U operator(s) or other nodes coordinating the NR-U operators supporting the FBE operations mode coexist in the carrier.

In one embodiment, an FBE operation mode can be supported for a carrier, based on the NR-U operator's configuration, such as the carrier can be configured by the NR-U operator to switch between FBE operation mode and LBE operation mode dynamically.

In one embodiment, the switching between FBE operation mode and LBE operation mode can be based on the channel access success ratio for a certain observation duration Tl, wherein the channel access success ratio can be evaluated on at least one of a per-gNB basis, per-NR-U operator basis, or across the NR-U operators with coordination among the NR-U operators.

For instance, an FBE operation mode can be supported by default, and when the channel access success ratio over T1 is below some threshold T1 (e.g., 5%), the NR-U operator can determine to switch to the LBE operation mode. This can happen when there is a random jammer in the operating channel, or when a nearby LBE-based network (e.g., LAA, Wi-Fi) is activated. Furthermore, NR-U can switch back to FBE operation mode from the LBE operation mode, such as after LBE mode is used for a certain duration T2; or the channel access success ratio over another certain duration T3 is above some threshold T2; or a nearby LBE-based network (e.g., LAA, Wi-Fi) is de-activated.

In one example, the switching between an FBE operation mode and an LBE operation mode can be based on detecting the existence of an LBE-based network (e.g., LAA, Wi-Fi) in the operating channel. For instance, the FBE operation mode can be used when an LBE-based network is detected to be not present in the operating channel, and the LBE operation mode can be used when an LBE-based network is detected to be present in the operating channel.

In one embodiment, the configuration of FBE operation mode is provided when an FBE operation mode is supported by NR-U. In one embodiment, a fixed frame period (FFP) can be configurable, when an FBE operation mode is supported.

In one example, for FR-1 FBE NR-U, the FFP can be configured to a value between 1 millisecond (ms) and 10 ms. In one sub-example, the FFP can be configured from a set of predefined values in the unit of 1 ms. For instance, the set of supported FFPs can be {1, 2, 3, 4, 5, 6, 7, 8, 9, 10} ms using 4 bits.

In one sub-example, the FFP can be configured from a set of predefined values in the unit of 1 NR-U slot. For instance, the set of supported FFPs can be {1, 2, 3, 4, 5, 6, 7, 8, 9, 10, 11, 12, 13, 14, 15, 16} NR-U slots using 4 bits, wherein the subcarrier spacing (SCS) associated to the slot can be determined from other system parameters.

In one sub-example, the FFP can be configured from a set of predetermined values in the unit of 1 NR-U symbol.

In one sub-example, the value of FFP can be configured through a higher layer parameter. For instance, the FFP value can be configured by RRC layer through an RRC layer parameter.

In one sub-example, the value of FFP can be configured and indicated to the UE through downlink control information (DCI), which can indicate the chosen FFP value from the set of predefined FFP values.

In one embodiment, when an FBE operation mode is supported, a channel occupancy time (COT) can be configurable or determined from configurations for other related system information.

In one example, a maximum COT (MCOT) value can be configured as the percentage $\eta$ of the FFP, wherein $0\% \leq \eta \leq 95\%$ for example. In one sub-example, the percentage $\eta$ can be fixed in the specification. In one sub-example, a set of values of the percentage $\eta$ can be supported, wherein the chosen value of the percentage $\eta$ can be configured by higher layer parameter or DCI. For instance, the set of supported percentage $\eta$ can be $\{0, 5, 10, 15, \ldots, 95\}$ %. In another instance, the value of $\eta$ can be adjusted according to the load of the current cell, such that a smaller $\eta$ can be configured for a lightly-loaded cell for power-saving purpose.

In one example, a MCOT value can be fixed in the specification and determined as the maximum duration allowed by regulation, subject to: (1) COT is at most 95% of the FFP; and (2) the idle period is at least 5% of COT with minimum of 100 microseconds.

In one example, a MCOT value can be configured from a set of predefined values, wherein the time unit of the value can be chosen from one or multiple of {1 ms, 1 NR-U slot, 1 NR-U mini-slot, 1 NR-U OFDM symbol}.

In one sub-example, the NR-U mini-slot can be of 2, 4 or 7 symbols as in NR standard specification. In another sub-example, the NR-U mini-slot can be of any number of symbols less than 14 symbols. This sub-example of min-slot can be applied to the rest of this disclosure when referring to the mini-slot. In another sub-example, the MCOT can be allocated as 21 NR-U slots with 30 kHz SCS. In another sub-example, the MCOT can be allocated as 9 NR-U slots plus 1 NR-U mini-slot of 7 symbols with 15 kHz SCS. In another sub-example, the MCOT value can be configured through a higher layer parameter or DCI.

In one example, when the ending position of the configured NR-U FBE MCOT is aligned with the NR-U slot boundary, the actual COT for FBE NR-U may be the same as the configured MCOT.

Figure 14:
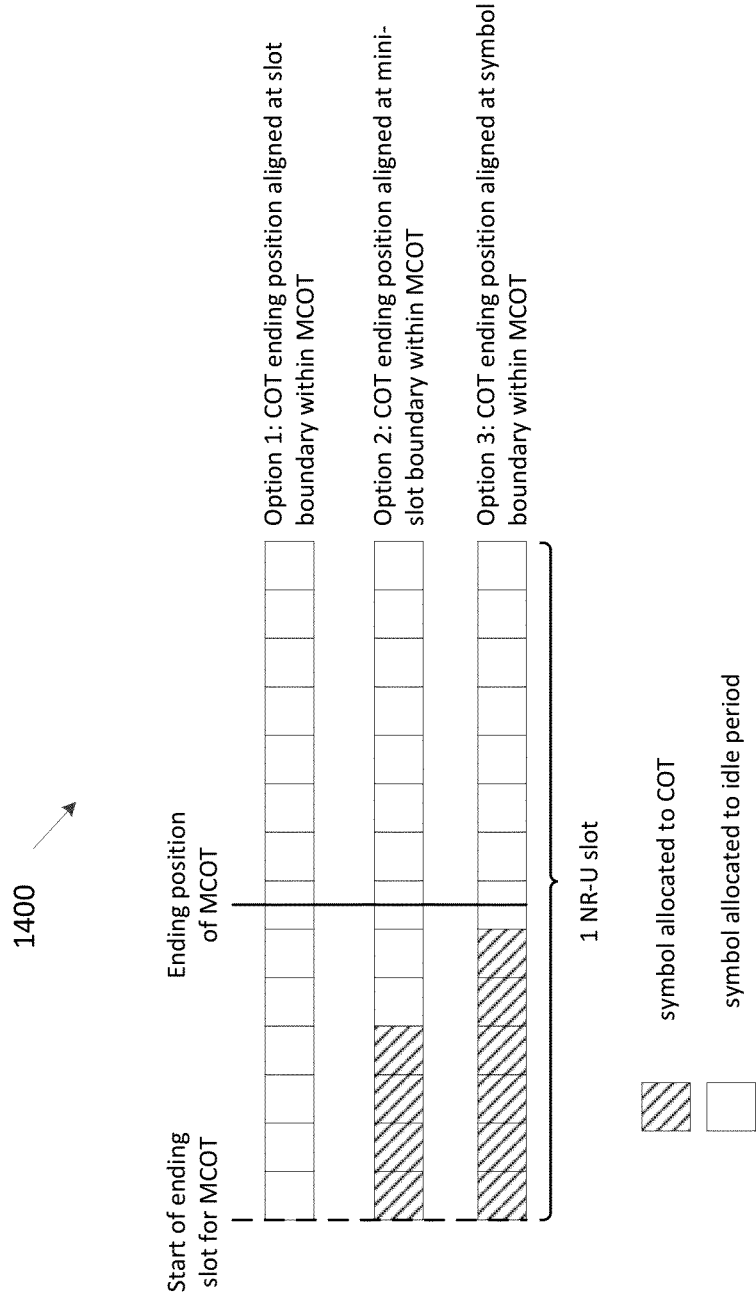
FIG. 14 illustrates an example NR-U slot according to embodiments of the present disclosure.

In one example, when the ending position of the configured NR-U FBE MCOT is not aligned with the NR-U slot boundary, one of the following options can be adopted and illustration of the options is illustrated in FIG. 14.

FIG. 14 illustrates an example NR-U slot 1400 according to embodiments of the present disclosure. The embodiment of the NR-U slot 1400 illustrated in FIG. 14 is for illustration only. FIG. 14 does not limit the scope of this disclosure to any particular implementation.

In one instance, the entire NR-U slot that contains the ending position of the configured NR-U FBE MCOT can be allocated to the IDLE period, and the actual COT may include the NR-U slots that comes before this slot within the current FFP.

In one instance, the ending position of the FBE NR-U COT can be allocated in the granularity of NR-U mini-slot (s), such that the ending position of FBE NR-U COT can be aligned at NR-U mini-slot boundary with the configured MCOT. For instance, one NR-U mini-slot can be consisted of 2, 4, or 7 OFDM symbols. In another instance, the ending position of the FBE COT can be aligned at OFDM symbol position that can be constructed by combination of one or multiple mini-slots.

In one instance, the ending position of the FBE COT can be allocated in the granularity of OFDM symbol, such that the ending position of FBE COT can be aligned at NR-U symbol boundary within the configured MCOT. As a result, the actual COT may be smaller than the configured MCOT.

In one example, based on the configured fixed frame period and channel occupancy time, the idle period can be determined accordingly as (fixed frame period—actual channel occupancy time).

In one example, the idle period duration can be configurable and adjusted through higher layer parameter or DCI. Based on the idle period duration and the FFP duration, the corresponding MCOT duration can be inferred.

In one example, the fixed frame period (FFP) for FBE NR-U can be dynamically adjusted within an allowed value range.

In one example, the adjustment of FFP can be based on the average channel access probability (CAP) over certain period T, wherein the period T can be at least 200 ms. For instance, if the CAP within T is greater than or equal to certain threshold τ3, the FFP can be increased, e.g., to the next available value or by a fixed amount; while if the CAP within T is smaller than certain threshold τ4, the FFP can be can be decreased, e.g., to the next available value or by a fixed amount. In addition, the CAP can be computed as the success rate of the single-shot LBT by NR-U gNB(s) before the transmission at each FFP; or the CAP can be computed as the success rate of all LBTs that happened within the period T, e.g., also include the LBT operations for DL/UL switching within the FFP.

In one example, the FFP duration can be adjusted through higher layer parameter or DCI. In one example, the FFP duration can be adjusted such that coexisting FBE NR-U initiating devices/operators can have the same FFP duration.

In one example, the starting timing position of FFP for FBE NR-U can be adjusted.

In one example, the starting timing position of each FFP for an FBE NR-U operator can be adjusted, such that all FBE NR-U device belonging to the same NR-U operator can be adjusted (e.g., advanced or postponed) by a same fixed time duration. For instance, this can be applied for two sync'ed NR-U operators to align their respective starting timing positions of the FFP.

In one example, the starting timing position of FFP for each FBE device of an FBE NR-U operator can be adjusted (e.g., advanced or postponed) by a specific time duration. For instance, this can be applied for async'ed NR-U operator to align the starting timing positions of the FFP for each gNB within the operator.

In one example, the time unit for adjusting the FFP starting position can be an integer multiple of $T_c$, wherein $T_c$ is the time unit for NR with $T_c=1/(480\ kHz*4096)$. For instance, the granularity can be $T_c$, or an NR-U OFDM symbol duration.

In one example, the time unit for adjusting the FFP starting position can be millisecond or microsecond.

In one example, the value of the time unit for adjusting the FFP can be configured and indicated through the higher layer parameter or DCI.

In one example, the starting timing position of FFP for FBE NR-U can be aligned with the frame structure of the NR-U with a granularity of NR-U slot/mini-slot/symbol level.

In one example, the starting position of each fixed frame period of the FBE NR-U can be aligned with the start of an NR-U slot. In one sub-example, the FFP duration also needs to be in integer multiples of the NR-U slot.

In one example, the starting position of each fixed frame period of the FBE NR-U can be aligned with the start of an NR-U mini-slot or an NR-U symbol. In one sub-example, the FFP duration also needs to be an integer multiple of the NR-U symbol. In another sub-example, the FFP can starts in the middle of an NR-U slot.

In one embodiment, the channel access scheme is provided for FBE operation of NR-U.

In one embodiment, FBE NR-U can utilize the baseline FBE channel access scheme for determining whether the initiating device can obtain channel access in the next FFP, wherein the initiating device performs LBT with energy detection only, immediately before starting transmission on an operating channel at the start of a FFP, for the duration of a single observation slot, and the initiating device can start transmission within COT of the next FFP if the initiating device passes the LBT.

In one example, the observation slot duration is at least 9 microseconds for 5 GHz unlicensed spectrum. The same observation slot duration constraint can be used for FR1 FBE NR-U.

In one example, the FBE NR-U device can have multiple transmissions within the COT without performing an additional CCA on the operating channel is the gap between such transmissions does not exceed certain duration τ. In one sub-example, for FR1 FBE NR-U, the duration can be 16 μs.

In one example, if gap between two transmissions of an FBE NR-U device within the COT exceeds certain duration τ, the FBE NR-U device may continue transmission provided that an additional CCA within the gap and within the observation slot immediately before transmission has passed.

In one example, if the LBT to continue transmission fails at an observation slot, the FBE NR-U device can continue to perform such LBT attempt.

In one sub-example, the FBE NR-U device can perform LBT to continue transmission as long as the transmission can start within the current COT.

In another sub-example, the LBT attempt(s) can start after an interval τ1 with respect to the previously failed LBT attempt. For instance, τ1 can be a NR-U slot, a NR-U mini-slot, or an NR-U OFDM symbol duration.

In another sub-example, the LBT attempt(s) can be performed such that the transmission can start at one of NR-U OFDM symbol, NR-U mini-slot, and NR-U slot boundary.

In one example, in addition to the energy detection scheme, one potential enhancement for channel access efficiency is to introduce preamble detection type of channel access scheme.

In one example, the preamble for NR-U can be chosen from the synchronization signal/physical broadcast channel block (SS/PBCH block, or SSB), channel state information reference signal (CSI-RS), demodulation reference signal (DM-RS), or sounding reference signal (SRS) for uplink. In one sub-example, the DM-RS can be of a wideband DM-RS for the group common (GC) PDCCH.

In another example, the preamble for NR-U can be introducing a new type of sequence or message for NR-U, compared to NR.

In another example, with the preamble detection channel access scheme considers the operating channel is clear if the strongest preamble power received at the initiating device is less than the preamble detection threshold.

In yet another example, the preamble detection threshold can be proportional to the maximum transmit power and can be lower than the corresponding energy detection threshold. In one sub-example, if denote by PH (dBm) the maximum transmit power with 0 dBi receive antenna, the preamble detection threshold (PDT) can be: for PH<=13 dBm, PDT=−85 dBm/MHz; for 13 dBm<PH<23 dBm, PDT=−85 dBm/MHz+(23 dBm −PH); for PH>=23 dBm, PH=−85 dBm/MHz.

In another example, with preamble detection scheme being supported, one or multiple of the LBT modes can be supported to determine if the operating channel is busy: (1) LBT mode 1: energy detection only; (2) LBT mode 2: preamble detection only; (3) LBT mode 3: channel is reported as busy if the total energy is above the energy detection threshold OR the preamble power is above the preamble detection threshold; (4) LBT mode 4: channel is reported as busy if the total energy is above the energy detection threshold AND the preamble power is above the preamble detection threshold.

In another example, the preamble can be utilized to facilitate the handshake exchange between the initiating device and the responding device, wherein the preamble can be served as a channel access request (CARQ) message/sequence.

In another example, the preamble can carry certain useful information regarding system configuration. For instance, the useful information can be the channel access priority information of the initiating device. In another instance, the preamble can carry information such as the COT duration, and/or the FFP duration.

In another example, the NR-U preamble can carry information regarding the radio access technology (RAT), and/or the NR-U operator, and/or NR-U cell information. In one sub-example, with the RAT information, NR-U node detecting the NR-U preamble can determine the preamble is from NR-U instead of other RAT, such as Wi-Fi.

In another example, the preamble detection scheme detailed in the above examples can be extended to LBE-based channel access schemes as well.

In one example, the LBT for FBE NR-U can be performed omni-directionally or quasi-omni-directional.

In one example, omni-directional/quasi-omni-directional LBT can be performed during the observation slot before the FFP, and omni-directional/quasi-omni-directional or directional communications can be supported during the FFP if LBT is successful.

In one example, directional LBT can be supported by FBE NR-U.

In one example, if only one directional spatial TX parameter is intended to be used by the initiating device during the FFP, the LBT can be performed over the spatial RX parameter that is aligned with the intended spatial TX parameter by the initiating device before the FFP.

Figure 15:
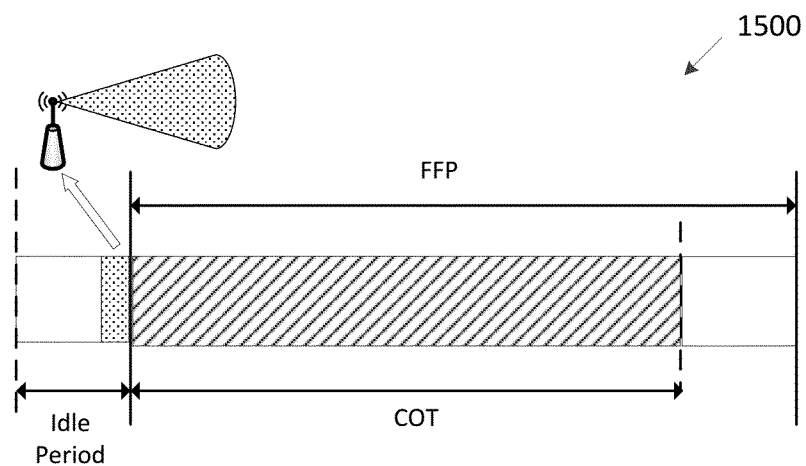
FIG. 15 illustrates an example directional LBT according to embodiments of the present disclosure.

FIG. 15 illustrates an example directional LBT 1500 according to embodiments of the present disclosure. The embodiment of the directional LBT 1500 illustrated in FIG. 15 is for illustration only. FIG. 15 does not limit the scope of this disclosure to any particular implementation.

In one example, when multiple directional spatial TX parameters are intended to be used by the initiating device during the FFP, the initiating device can perform LBT over multiple spatial RX parameters that are aligned with the intended spatial TX parameters simultaneously at the observation slot, such that the availability of the spatial TX parameters can be determined at the same time.

In one sub-example, spatial parameters that passed LBT at the observation slot can be utilized for transmission in the following COT within the FFP; and the initiating device can determine which spatial parameter(s) to utilize for transmission. For instance, even if direction LBT fails at a subset of the spatial parameters, the initiating device can still utilize the remaining spatial parameter(s) that have succeeded in LBT for transmission in the FFP.

In another sub-example, this example can be applied when hybrid beamforming or digital beamforming is supported by the initiating device.

Figure 16:
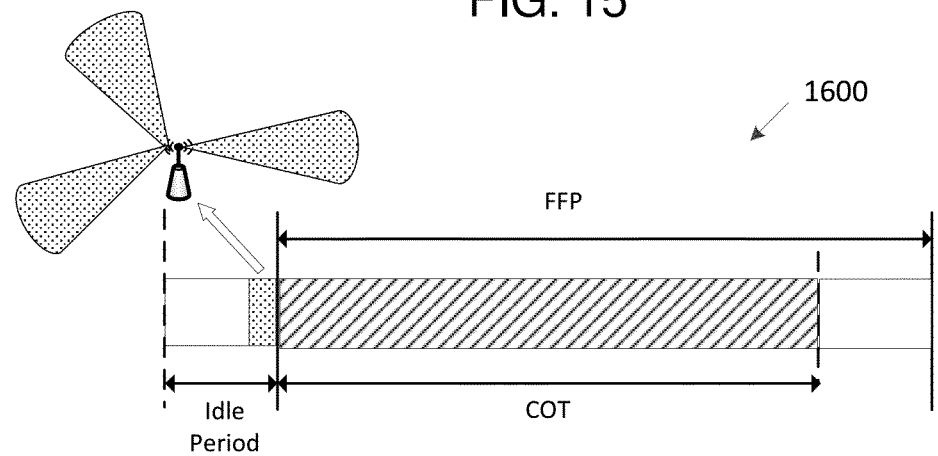
FIG. 16 illustrates another example directional LBT according to embodiments of the present disclosure.

FIG. 16 illustrates another example directional LBT 1600 according to embodiments of the present disclosure. The embodiment of the directional LBT 1600 illustrated in FIG. 16 is for illustration only. FIG. 16 does not limit the scope of this disclosure to any particular implementation.

In one example, when multiple directional spatial TX parameters are intended to be used by the initiating device during the FFP, the initiating device can perform LBT over multiple spatial RX parameters that are aligned with the intended spatial TX parameters over multiple time units.

In one sub-example, the time unit can be one or multiple observation slots, and the multiple time units can be consecutive or nonconsecutive in time domain. For instance, the time unit can be one observation slot, and the multiple time units can be consecutive in time-domain and are located at the end of the IDLE period.

In another sub-example, this option can be used to when hybrid beamforming is not supported; or when hybrid beamforming is supported but the number of RF chains is smaller than the number of intended spatial parameters.

In another sub-example, if full-duplex is supported, the initiating device can perform LBT in a time unit while transmitting in spatial TX parameters that passed LBT in previous time units.

In another sub-example, the multiple time units can be within the IDLE period that comes before the FFP.

In another sub-example, a subset of the multiple units can be within the IDLE period, while the remaining time units are within the next FFP.

In another sub-example, spatial parameters that passed LBT at a respective observation slot can be utilized for transmission in the following COT within the next FFP; and the initiating device can determine which spatial parameter(s) to utilize for transmission. For instance, even if direction LBT fails at a subset of the spatial parameters, the initiating device can still utilize the remaining spatial parameter(s) that have succeeded in LBT for transmission in the FFP.

Figure 17:
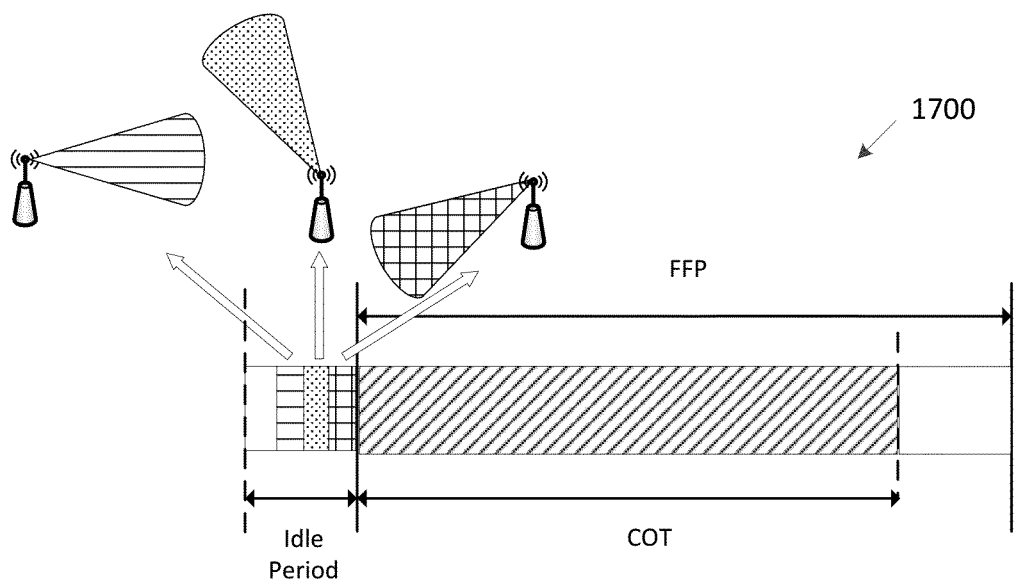
FIG. 17 illustrates yet another example directional LBT according to embodiments of the present disclosure.

FIG. 17 illustrates yet another example directional LBT 1700 according to embodiments of the present disclosure. The embodiment of the directional LBT 1700 illustrated in FIG. 17 is for illustration only. FIG. 17 does not limit the scope of this disclosure to any particular implementation.

In one example, a hybrid approach of omni-directional/quasi-omni-directional LBT and directional LBT can be used by FBE NR-U.

In one sub-example, the initiating device can first perform omni-directional/quasi-omni-directional LBT during an observation slot before the FFP, and the initiating device can transmit in the next FFP, potentially over directional spatial TX parameters, if the omni-directional/quasi-omni-directional LBT passes.

In another sub-example, if the omni-directional/quasi-omni-directional LBT fails, the initiating device can further perform directional LBT following examples.

Figure 18:
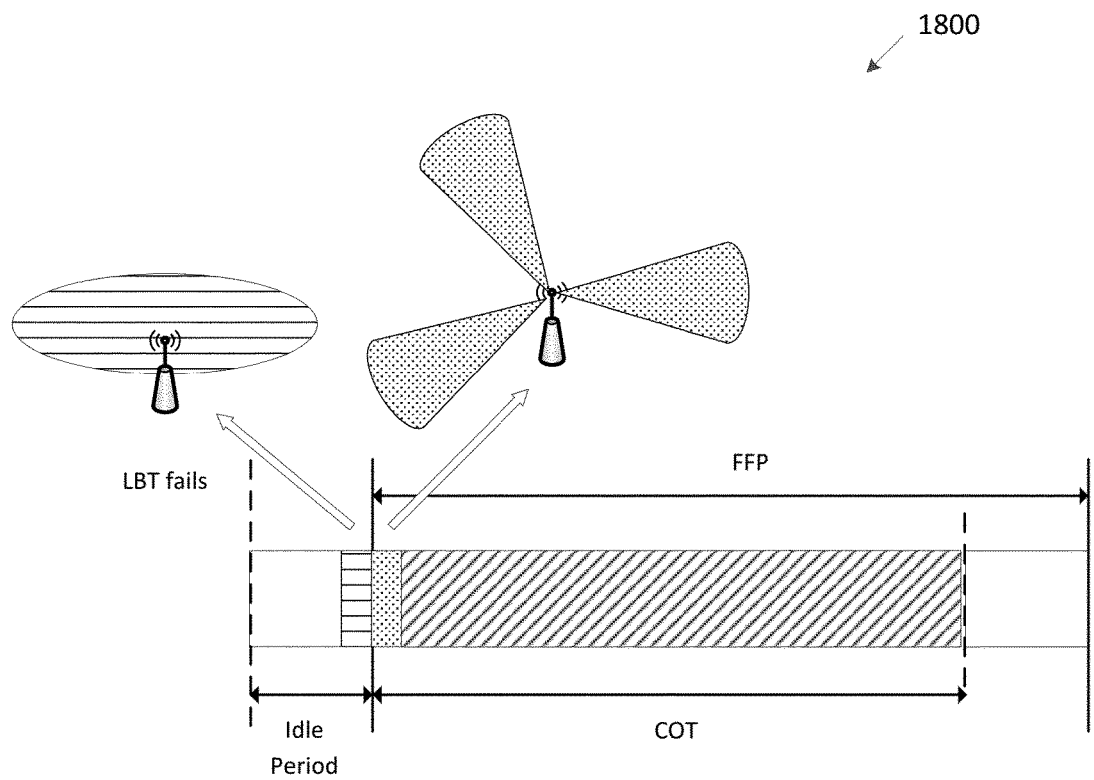
FIG. 18 illustrates yet another example directional LBT according to embodiments of the present disclosure.

FIG. 18 illustrates yet another example directional LBT 1800 according to embodiments of the present disclosure. The embodiment of the directional LBT 1800 illustrated in FIG. 18 is for illustration only. FIG. 18 does not limit the scope of this disclosure to any particular implementation.

In another sub-example, if directional LBT is used, the directional LBT can be performed within the idle period before the FFP, or during the start of the FFP. FIG. 18 provides an illustration of this example.

For the baseline FBE channel access scheme in the aforementioned embodiment and example, when one or multiple synchronized FBE NR-U operator(s) coexist in the operating channel, the initiating devices perform LBT at the same observation slot and therefore can pass the LBT process. For such synchronized FBE NR-U network(s), strong interference may exist between neighboring gNBs during the COT, and the effects of hidden terminal issue may also be severe.

Figure 19:
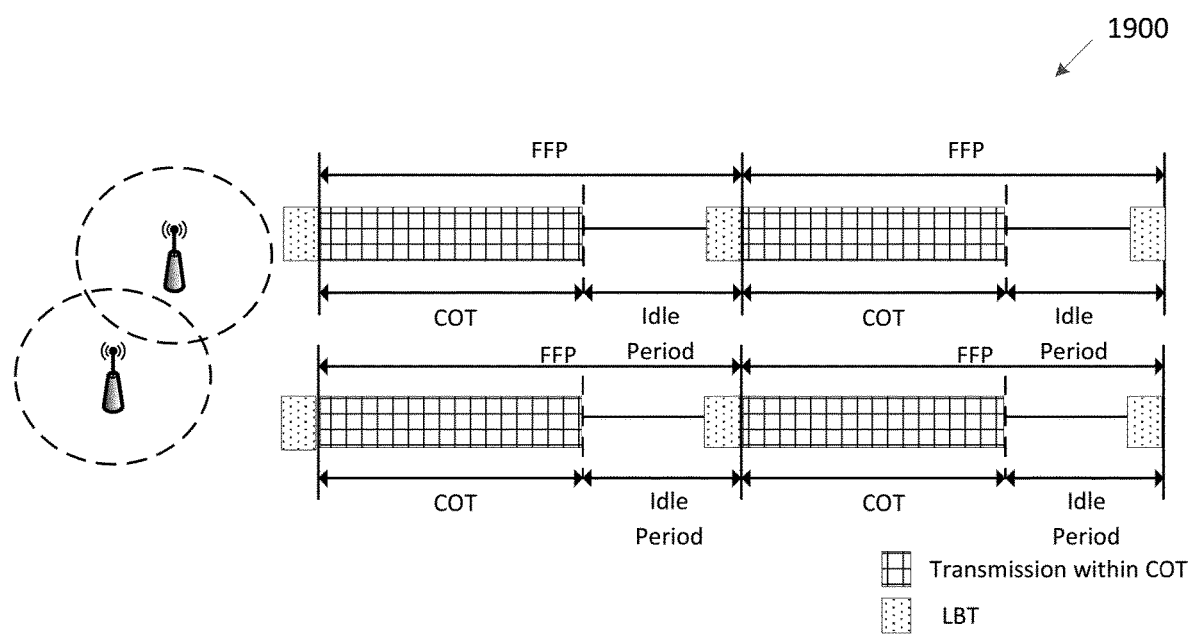
FIG. 19 illustrates an example LBT process access according to embodiments of the present disclosure.

FIG. 19 illustrates an example LBT process access 1900 according to embodiments of the present disclosure. The embodiment of the LBT process access 1900 illustrated in FIG. 19 is for illustration only. FIG. 19 does not limit the scope of this disclosure to any particular implementation.

FIG. 19 illustrates an example of this condition, wherein the two nearby gNBs can always pass their respective LBT process since the LBT is performed at the same time, but the following transmissions may collide at each other.

In addition, for asynchronous FBE NR-U, the initiating device performed at an observation slot may always be blocked by the transmission from a nearby asynchronous initiating device.

In one example, an enhancement to FBE NR-U channel access scheme is to introduce a set of N observation slots (N>=1), such that the LBT process for FBE initiating device can be performed at one or multiple observation slot(s) from the available set of observation slots.

In one example, the set of N observation slots can be consecutive in time domain, or non-consecutive in time domain to each other. In one sub-example, for non-consecutive observation slots, the gap between neighboring observation slots can be smaller than an observation slot length (e.g., 9 microseconds).

In one example, the number of observation-slots N can scale with the duration of the fixed frame period. In one sub-example, the number of allocated observation slots can be non-decreasing as the fixed frame period increases.

In one example, each FBE initiating device can be assigned one or multiple observation slot(s), according to some pre-defined rule.

In one sub-example, this rule can be randomly and uniformly selecting one or multiple observation slot(s) among all the N observation slots, such as for fairness in terms of channel access.

In another sub-example, this rule can be randomly and uniformly selecting one or multiple observation slot(s) within a subset of the N observation slots, such as for tiered access to the channel across different NR-U operators, wherein the observation slots of the subset assigned to one operator can always come before the subset assigned to other operator(s).

In another sub-example, this rule can be selecting multiple neighboring observation slots among all the N observation slots, such as to perform LBT over different spatial RX parameters at different assigned observation slot.

In yet another sub-example, this rule can be selecting multiple observation slots (potentially non-consecutive), wherein the number of assigned observation slots scales with the access priority of the initiating device to the operating channel.

In one example, when a set of observation slots are assigned, one or multiple of the following examples can be adopted to determine if the LBT is successful for the initiating device.

Figure 20:
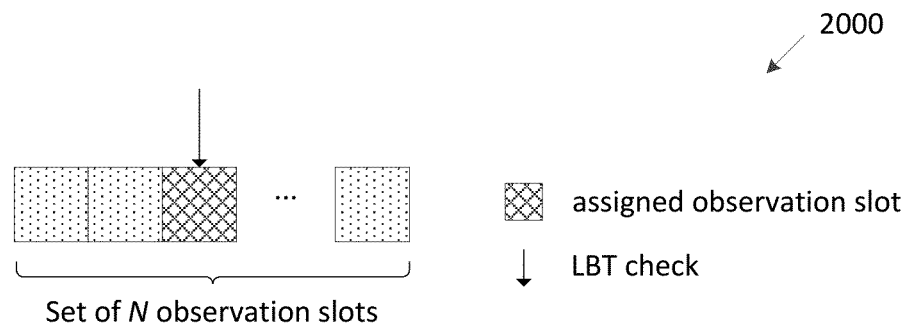
FIG. 20 illustrates an example observation slot according to embodiments of the present disclosure.

FIG. 20 illustrates an example observation slot 2000 according to embodiments of the present disclosure. The embodiment of the observation slot 2000 illustrated in FIG. 20 is for illustration only. FIG. 20 does not limit the scope of this disclosure to any particular implementation.

In one example, if one observation slot is assigned to the initiating device, the LBT is successful for the initiating device of FBE NR-U if the LBT at the assigned observation slot is successful. FIG. 20 provides an illustration of this example.

Figure 21:
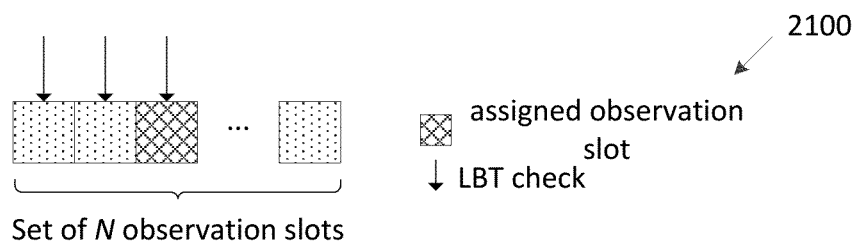
FIG. 21 illustrates another example observation slot according to embodiments of the present disclosure.
Figure 22:
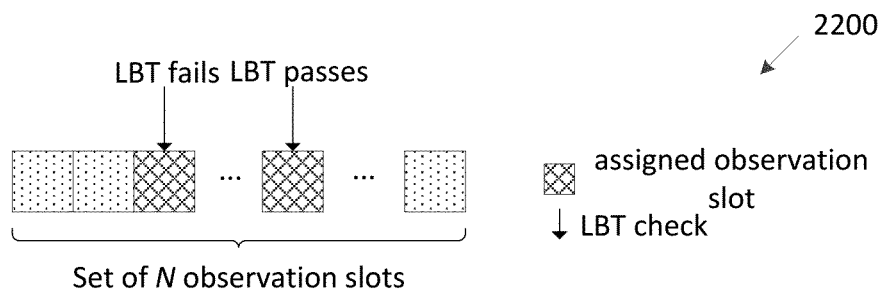
FIG. 22 illustrates yet another example observation slot according to embodiments of the present disclosure.

FIG. 21 illustrates another example observation slot 2100 according to embodiments of the present disclosure. The embodiment of the observation slot 2100 illustrated in FIG. 21 is for illustration only. FIG. 22 does not limit the scope of this disclosure to any particular implementation.

In one example, if one observation slot is assigned to the initiating device, the LBT is successful for the initiating device of FBE NR-U if the LBT processes performed at the assigned observation slot, as well as the observation slot(s) that come before the assigned observation slot are successful. FIG. 21 provides an illustration of this example.

FIG. 22 illustrates yet another example observation slot 2200 according to embodiments of the present disclosure. The embodiment of the observation slot 2200 illustrated in FIG. 22 is for illustration only. FIG. 22 does not limit the scope of this disclosure to any particular implementation.

In one example, if multiple observation slots are assigned to the initiating device, LBT can be considered as successful if LBT on any one of the assigned observation slots is successful. In one sub-example, if the initiating device performs LBT using different spatial parameter at different assigned observation slot, then the device can utilize the spatial parameter(s) that corresponds to the assigned observation slot(s) that passed LBT during the COT. FIG. 22 provides an illustration of this example, wherein the LBT is successful since (at least) one LBT at an assigned observation slot passes LBT.

Figure 23:
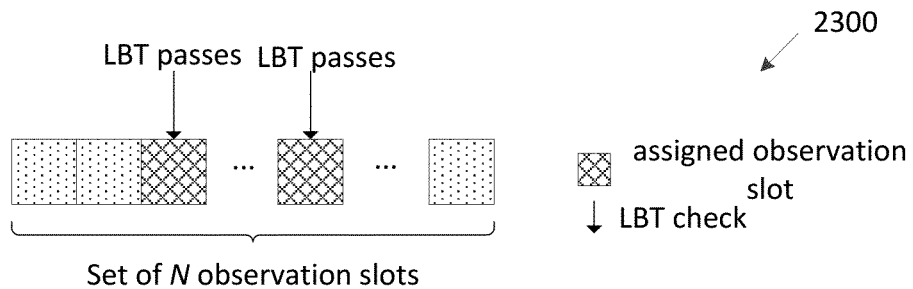
FIG. 23 illustrates yet another example observation slot according to embodiments of the present disclosure.

FIG. 23 illustrates yet another example observation slot 2300 according to embodiments of the present disclosure. The embodiment of the observation slot 2300 illustrated in FIG. 23 is for illustration only. FIG. 23 does not limit the scope of this disclosure to any particular implementation.

In one example, if multiple observation slots are assigned to the initiating device, LBT can be considered as successful if LBT on all of the assigned observation slot are successful. In one example, when two FBE NR-U operators coexist, gNBs of one operator 1 can be assigned more observation slots than gNBs of operator 2, such that operator 2 can have higher access priority to the operating channel than operator 1. FIG. 23 provides an illustration of this example, wherein the LBT is successful as the LBT at all the assigned observation slots has passed.

In one example, if the LBT is successful for the FBE initiating device on an assigned observation slot, the following examples are possible for the initiating device.

In one example, the initiating device can start transmissions immediately after the assigned observation slot that passed LBT.

In one sub-example, the transmission can be reservation signal similar to LAA, such that the initiating device can reserve the channel until the end of the set of N observation slots.

In another sub-example, the transmission can be the useful data addressed to the responding device(s), such as when the assigned slot is the last slot among the set of N observation slots.

In one example, after the initiating device passes LBT on an assigned slot, initiating device can defer the transmission until certain time instance (i.e., not to transmit until the start of the time instance).

In one sub-example, the time instance can be the start of next fixed frame period. In another sub-example, the time instance can be the end of the last assigned observation slot to the initiating device, when multiple observation slots are assigned. In another sub-example, the time instance can be in the middle of the set of N observation slots, such as the end of the subset of the observation slots that can be assigned to an FBE NR-U operator.

In one example, the transmission by the initiating device after the LBT is successful on an assigned observation slot(s) can be an NR-U signal.

In one sub-example, such NR-U signal can be the SS/PBCH block, CSI-RS, or DM-RS. In another sub-example, such NR-U signal can be an NR-U preamble.

In another sub-example, the signal transmitted by the initiating device can be utilized for handshake between the initiating device and responding device, and/or preamble detection/energy detection by other initiating devices, and/or the COT detection by the responding device.

In one example, the transmission by the initiating device after the LBT is successful on an assigned observation slot(s) can be FBE NR-U channel. In one sub-example, the transmission can be an FBE NR-U signal, such as the group-common (GC) PDCCH, and/or UE specific PDCCH, and/or the PDSCH.

In one example, one of the following examples can be adopted regarding the timing relation between the positions of the multiple observation slots and the fixed frame period.

Figure 24:
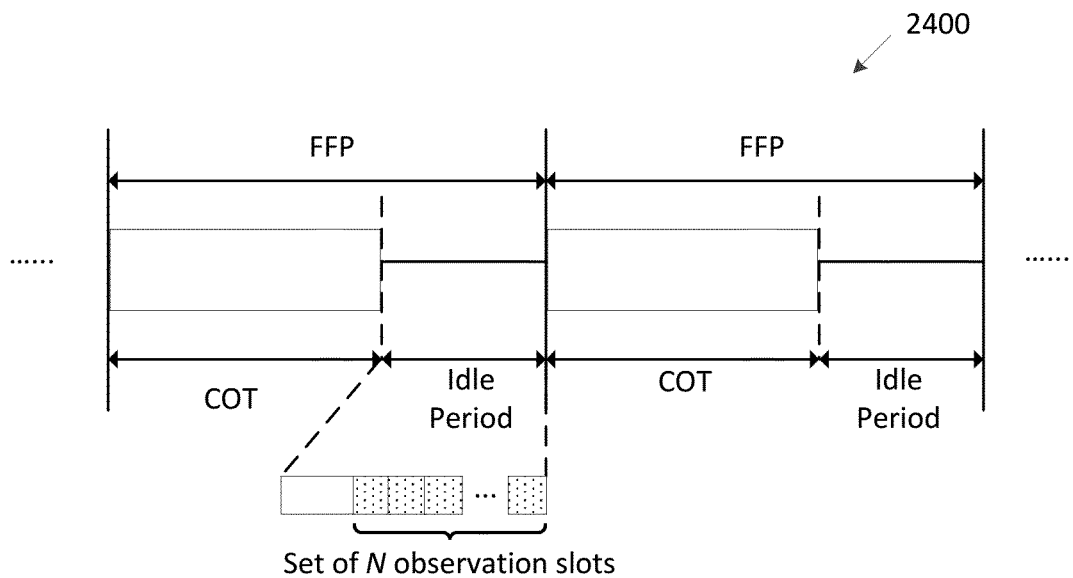
FIG. 24 illustrates an example observation slot in idle period according to embodiments of the present disclosure.

FIG. 24 illustrates an example observation slot in idle period 2400 according to embodiments of the present disclosure. The embodiment of the observation slot in idle period 2400 illustrated in FIG. 24 is for illustration only. FIG. 24 does not limit the scope of this disclosure to any particular implementation.

In one example, the observation slots can all be contained within the IDLE period of the fixed frame period. FIG. 24 provides an illustration of this example.

In one example, a subset of the N observation slots can be contained within the idle period, and the remaining observation slots can be contained within the start of the next fixed frame period.

In one sub-example, this example can be applied to when transmission in idle period is not permitted, e.g., by unlicensed regulation.

Figure 25:
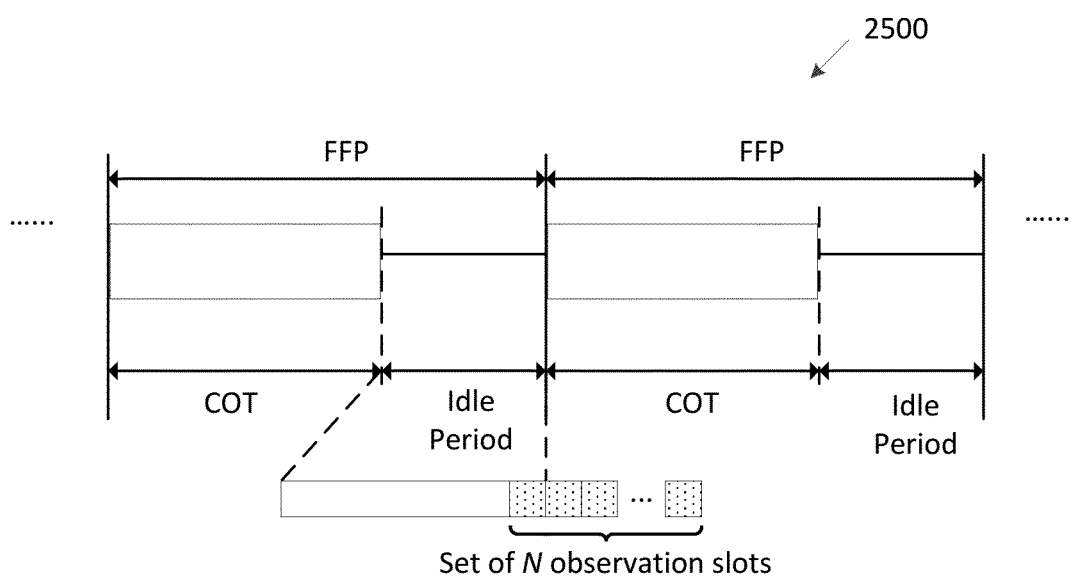
FIG. 25 illustrates another example observation slot in idle period according to embodiments of the present disclosure.

FIG. 25 illustrates another example observation slot in idle period 2500 according to embodiments of the present disclosure. The embodiment of the observation slot in idle period 2500 illustrated in FIG. 25 is for illustration only. FIG. 25 does not limit the scope of this disclosure to any particular implementation.

In another sub-example, the first observation slot can be at the end of the idle period and before the start of next fixed frame period, while the remaining N-1 observation slots are inside the next fixed frame period. In this case, the transmissions at the observation slots by the initiating device(s), which passed LBT in earlier observation slot(s), can meet the unlicensed regulation. Furthermore, such initiating device(s) can also transmit preamble signal/sequence for preamble detection/energy detection by other initiating devices. FIG. 25 provides an illustration of this example.

In one example, FBE NR-U can support simultaneously transmissions in adjacent or non-adjacent operating channels wherein the FBE device passes LBT, such that each FBE initiating device may use any combination/grouping of 20 MHz operating channels out of the supported channels.

In one example, FBE NR-U can also support this baseline option for sub-band operation, such that each gNB can utilize any sub-band within the system bandwidth that passes the LBT. In one sub-example, each sub-band can be one or multiple of 20 MHz, or the corresponding number of resource blocks (RBs) that is close to one or multiple of 20 MHz.

In one example, FBE NR-U can also support this baseline approach for multi-bandwidth part (BWP) operation, such that each gNB can utilize any BWP (within the system bandwidth) that passes the LBT. In one sub-example, each BWP can be of one or multiple of 20 MHz, or the corresponding number of resource blocks (RBs) that is close to one or multiple of 20 MHz.

In one example, when N observation slots are utilized to improve channel access efficiency on each operating channel or BWP, the sub-band or multi-BWP channel access scheme can follow one of the following options:

In one instance, the same set of observation slots can be assigned across different sub-bands/BWPs for an initiating device, and that the sub-band/BWP that passes LBT can be utilized to transmit.

In one instance, different set of observation slots can be assigned across different sub-bands/BWPs for an initiating device.

In one sub-example, transmission across different sub-bands/BWPs can be aligned after the last assigned observation slot across all sub-bands/BWPs is complete. In another sub-example, transmission across different sub-bands/BWPs can be aligned till the end of the N observation slots. In another sub-example, if a full-duplex is supported, operation at each sub-band/BWP can be independent; such that a gNB can perform LBT on certain sub-band/BWP and transmit on other sub-band(s)/BWP(s) that passed LBT.

In one example, an FBE NR-U UE needs to monitor for PDCCH within the fixed frame period; and one or multiple of the following examples can be adopted.

In one example, for FBE NR-U, a UE can monitor for PDCCH on an NR-U slot level within the COT of the fixed frame period, similar to NR-U within COT or as in licensed NR.

In one example, for FBE NR-U, a UE can monitor for PDCCH at OFDM symbol level or NR-U mini-slot level within the first or first few NR-U slots within the COT, and at NR-U slot level for the remaining COT. This example can be applied to the scenario as shown in FIG. 25.

In one example, during the IDLE period, a UE of FBE NR-U can defer monitoring for PDCCH until the start of next fixed frame period.

In one example, during the IDLE period, a UE of FBE NR-U can start to monitor for PDCCH after the start of the assigned observation slot(s), at the time granularity on a NR-U slot level, or NR-U mini-slot level, or OFDM symbol level.

In one example, the aforementioned embodiment and examples can also apply to sub-band or multi-BWP operation of FBE NR-U; and when sub-band or multi-BWP operation of FBE NR-U is used, a UE can determine which sub-band/BWP is available to use by detecting the existence of PDCCH in each sub-band/BWP.

In one embodiment, channel Access enhancement for asynchronous FBE NR-U network is provided. In such embodiment, the approaches and examples are provided for channel access mechanism enhancements for asynchronous FBE NR-U network(s).

The channel access mechanism for asynchronous FBE NR-U network (e.g., intra operator and/or inter-operator) may also be enhanced over the baseline channel access scheme, wherein asynchronous for two FBE devices or operators can refer to the fact that their start timing for the fixed frame period is different; and/or the duration of the fixed frame period is different; and/or the duration of the COT/idle period is different.

Figure 26:
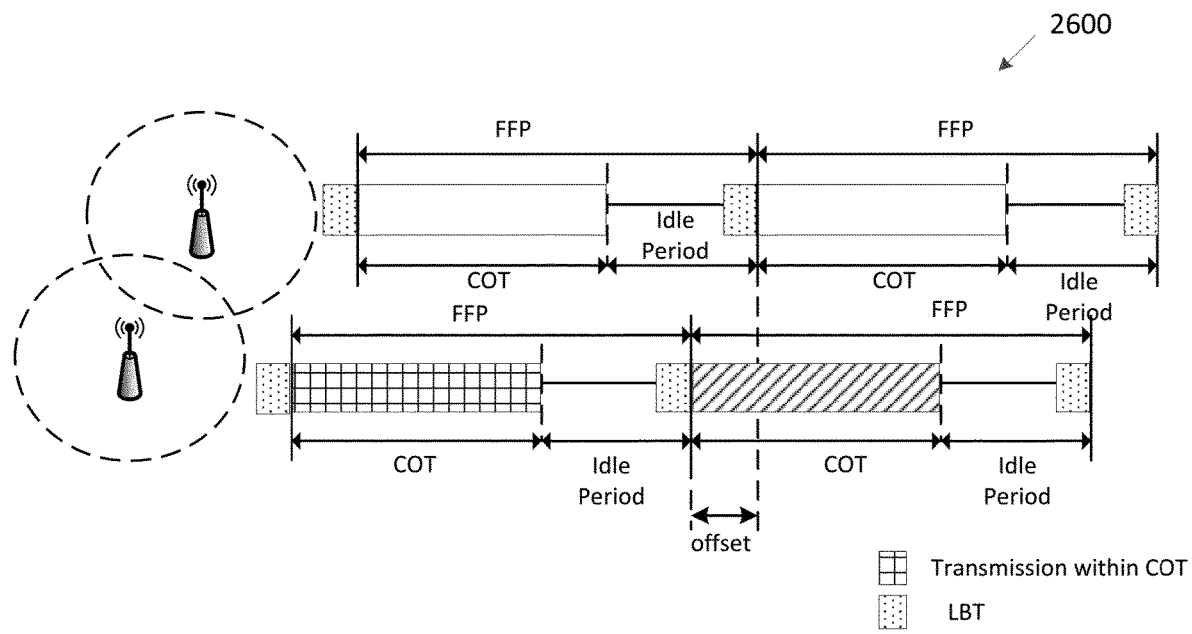
FIG. 26 illustrates an example LBT process access according to embodiments of the present disclosure.

FIG. 26 illustrates an example LBT process access 2600 according to embodiments of the present disclosure. The embodiment of the LBT process access 2600 illustrated in FIG. 26 is for illustration only. FIG. 26 does not limit the scope of this disclosure to any particular implementation.

For asynchronous NR-U devices, the LBT performed by one initiating device may always be blocked by the transmission from another initiating device that has an earlier start timing for the fixed frame period. FIG. 26 provides an illustration when LBT is performed omni-directionally between two neighboring asynchronous FBE NR-U initiating devices. One or multiple of the approaches in this embodiment can be adopted to enhance the channel access of asynchronous FBE NR-U. The approaches in this embodiment are beneficial in improving channel access for asynchronous FBE NR-U networks, but these approaches are not restricted to be only applied to asynchronous FBE NR-U network(s) and can be applied to any FBE NR-U network.

In one example, each initiating FBE NR-U device can perform directional LBT over directional spatial RX parameter(s).

In one example, for each initiating FBE NR-U device, the directional LBT scheme, and the spatial TX parameters utilized for transmission after the directional LBT can follow the aforementioned embodiments.

In one sub-example, the initiating FBE NR-U device can perform directional LBT over only one spatial RX parameter. In another sub-example, the initiating FBE NR-U device can perform directional LBT over multiple spatial RX parameters.

Given the first approach of this embodiment, the FBE LBT by an initiating device is less likely to be blocked by neighboring asynchronous initiating device(s) when their beam directions are not aligned, and hence spatial reuse can be improved.

Figure 27:
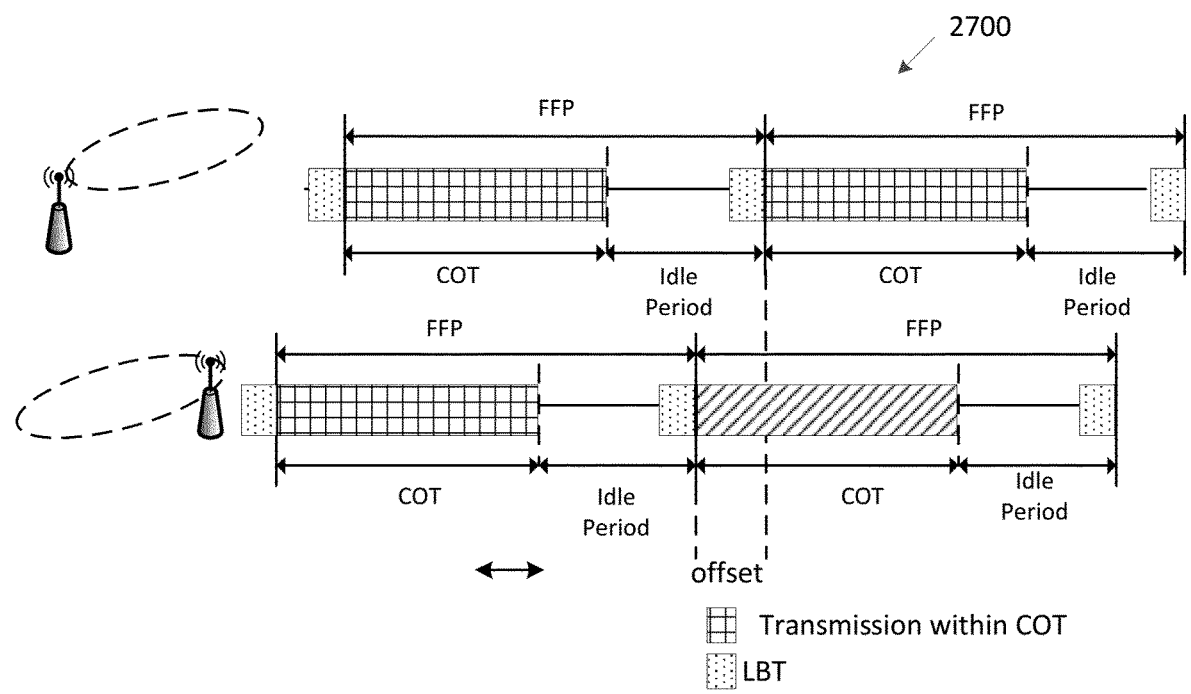
FIG. 27 illustrates another example LBT process access according to embodiments of the present disclosure.

FIG. 27 illustrates another example LBT process access 2700 according to embodiments of the present disclosure. The embodiment of the LBT process access 2700 illustrated in FIG. 27 is for illustration only. FIG. 27 does not limit the scope of this disclosure to any particular implementation.

As illustrated in FIG. 27, each FBE NR-U initiating device performs directional LBT over one spatial RX parameter, and both FBE NR-U device can transmit during the FFP since their spatial parameters are not aligned.

Figure 28:
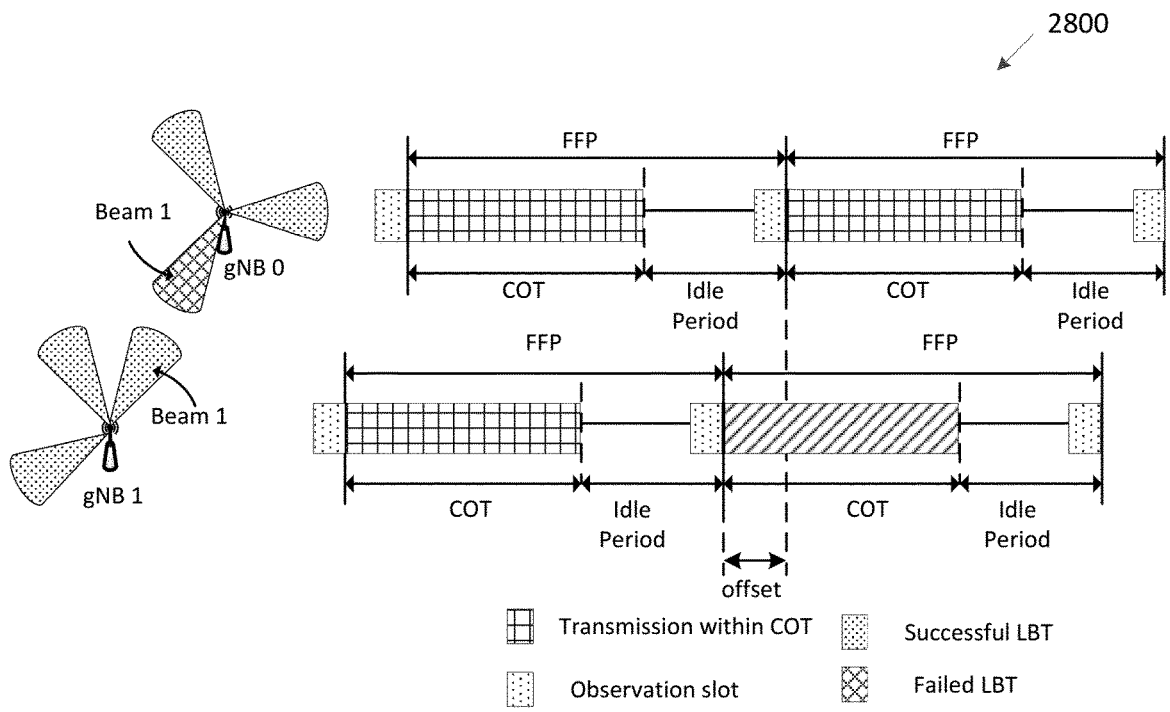
FIG. 28 illustrates yet another example LBT process access according to embodiments of the present disclosure.

FIG. 28 illustrates yet another example LBT process access 2800 according to embodiments of the present disclosure. The embodiment of the LBT process access 2800 illustrated in FIG. 28 is for illustration only. FIG. 28 does not limit the scope of this disclosure to any particular implementation.

As illustrated in FIG. 28, two FBE NR-U initiating devices performs directional LBT over three spatial RX parameters. Since one pair of the spatial RX parameters of a gNB0 and a gNB1 are aligned, and a gNB1 has an earlier start timing for the FFP, the directional LBT at beam 1 of a gNB0 may be blocked by the directional transmission at beam 1 of a gNB1. However, the LBT at remaining spatial RX parameters of a gNB0 other than beam 1 can still pass their respective directional LBT and thus a gNB0 can utilize next FFP for transmissions.

In one example, a set of N observation slots (N>=1) can be introduced to the asynchronous FBE NR-U initiating devices (or operators), such that each asynchronous initiating device (or operator) can have non-zero probability to access the operating channel through choosing the observation slot.

In one example, the aforementioned examples and embodiments can be utilized when the timing offset between asynchronous initiating devices (or two asynchronous FBE NR-U operators with fixed timing offset) is smaller than the idle period. In one sub-example, this can be extended to when the idle periods of the asynchronous devices/operators are different, and that the timing offset is smaller than the minimum of the idle periods of the asynchronous devices/operators.

In one example, the aforementioned examples and embodiments can be applied to the scenario when the fixed frame period is of the same length for the asynchronous FBE NR-U network(s). In one sub-example, the idle period can be the same or different for the asynchronous FBE NR-U network(s).

In one example, the aforementioned examples and embodiments can be applied to the scenario when the fixed frame period is of the different length for the asynchronous FBE NR-U network(s).

In one example, when a set of observation slots is introduced to the asynchronous FBE NR-U initiating devices (operators), the configuration of the observation slots set can follow the aforementioned embodiments. In one sub-example, the configuration of the observation slots set can include the time-domain positions of the observation slots, how to determine if the LBT is successful for the initiating device, timing relation between the positions of the multiple observation slots and the fixed frame period, when the initiating device can start transmissions after the assigned observation slot have passed LBT.

Figure 29:
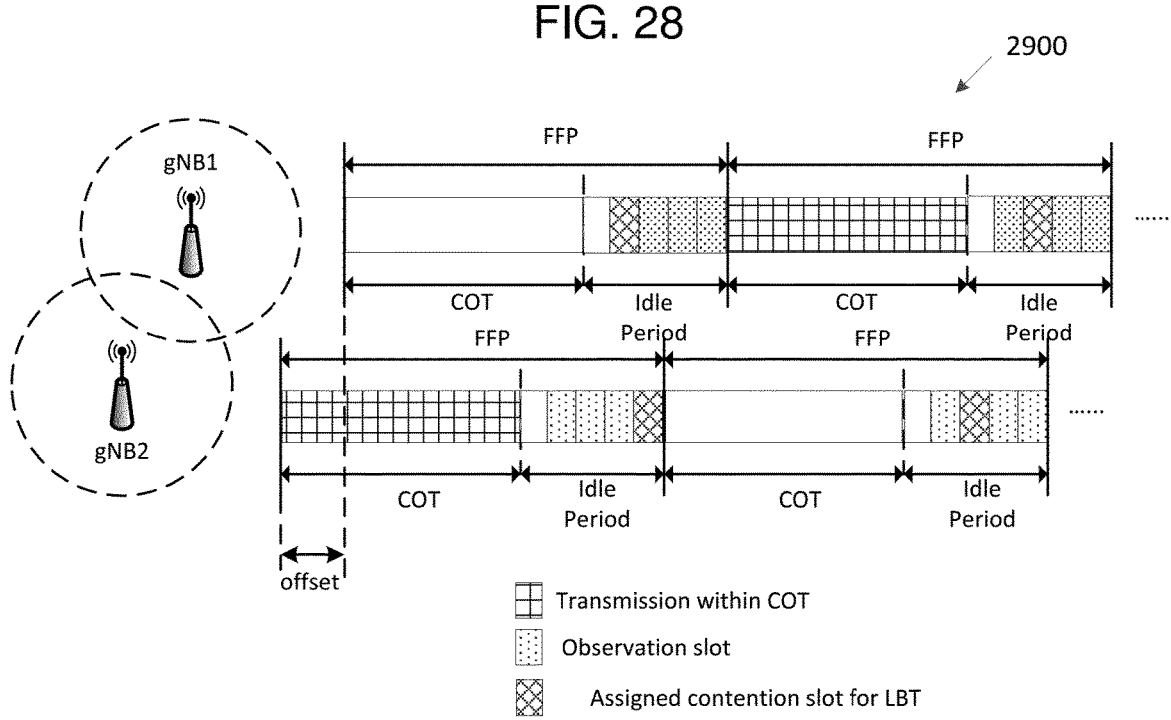
FIG. 29 illustrates yet another example LBT process access according to embodiments of the present disclosure.

FIG. 29 illustrates yet another example LBT process access 2900 according to embodiments of the present disclosure. The embodiment of the LBT process access 2900 illustrated in FIG. 29 is for illustration only. FIG. 29 does not limit the scope of this disclosure to any particular implementation.

FIG. 29 provides an illustration of this example, wherein a gNB1 is able to transmit in the next FFP, if an assigned observation slot comes before the assigned observation slot of the gNB2, and that the gNB1 starts transmission after the assigned observation slot if the bNB1 passes LBT.

In one example, the FBE device/operator can fall back to the LBE mode.

In one example, the aforementioned examples and embodiments can be used when the FBE device continuously fails the FBE LBT for duration D, or the FBE device continuously fails the FBE LBT after a certain number of LBT attempts N. For instance, this example can happen when timing offset is larger than the idle period between two asynchronous NR-U operators.

In one example, for asynchronous FBE NR-U devices/operators, one or multiple of the FBE NR-U devices/operators can adjust one or multiple of the start timing of the FFP, the FFP duration, the COT or idle period duration within each FFP, such that the FBE NR-U devices/operators can be synchronized.

In one example, the start timing of the FFP, the FFP duration, the COT or idle period duration within each FFP can be configured according to the aforementioned examples and embodiments.

In one example, the adjustment value for one or multiple of the start timing of the FFP, the FFP duration, the COT or idle period duration within each FFP can be determined and configured by higher layer parameter.

In one example, the adjustment value for one or multiple of the start timing of the FFP, the FFP duration, the COT or idle period duration within each FFP can be determined by the FBE NR-U device.

In one example, for the FBE NR-U device whose LBT at observation slot fails due to the transmission from neighboring asynchronous FBE NR-U device(s)/operator(s), the FBE NR-U device can determine during the FFP(s) corresponding to failed LBT one or multiple of the start timing of the FFP, the FFP duration, the COT or idle period duration of a neighboring FBE NR-U device(s)/operator(s).

In one sub-example, during the FFP(s) wherein the FBE NR-U device does not transmit due to failed LBT, the FBE NR-U device can determine the start timing of the FFP, the FFP duration, and the COT duration configuration of a neighboring FBE NR-U device through monitoring the energy of neighboring transmissions.

In another sub-example, during the FFP(s) wherein the FBE NR-U device does not transmit due to failed LBT, the FBE NR-U device can determine the start timing of the FFP, the FFP duration, and the COT duration configuration of a neighboring FBE NR-U device through monitoring the channels/signals of neighboring transmissions that contains the corresponding configuration information. For instance, the preamble as detailed in the aforementioned examples and embodiments.

Figure 30:
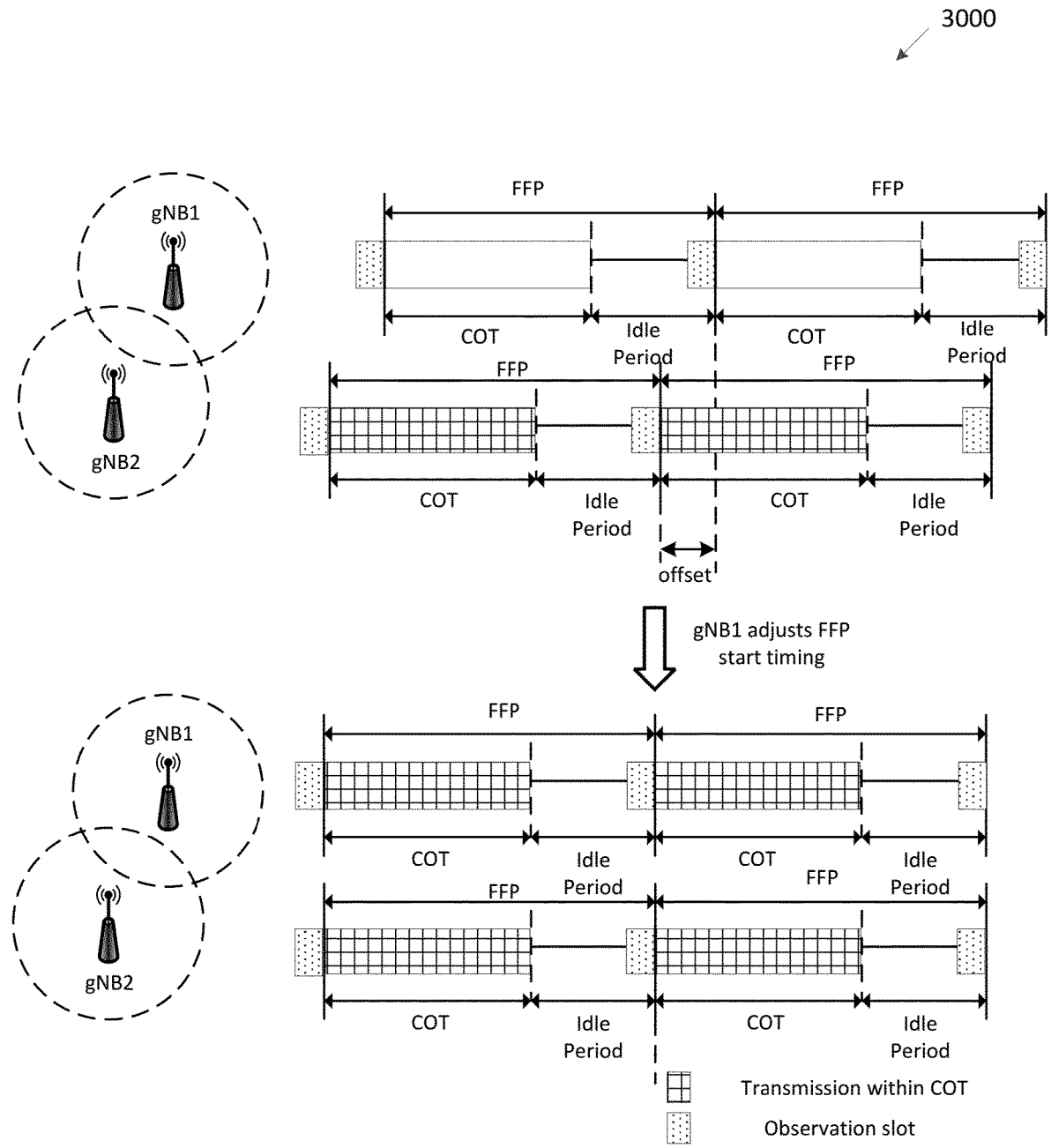
FIG. 30 illustrates yet another example LBT process access according to embodiments of the present disclosure.

FIG. 30 illustrates yet another example LBT process access 3000 according to embodiments of the present disclosure. The embodiment of the LBT process access 3000 illustrated in FIG. 30 is for illustration only. FIG. 30 does not limit the scope of this disclosure to any particular implementation.

As illustrated in FIG. 30, a gNB1 monitors for the start timing of the FFP of a gNB2 during the FFP(s) that the gNB1 fails LBT due to the gNB2 transmission; and the gNB1 correspondingly adjusts a start timing of the FFP, such that the gNB1 and the gNB2 are synchronized and both can transmit simultaneously.

In one example, for asynchronous FBE NR-U devices/operators, upon successful LBT, the initiating FBE NR-U device and corresponding device(s) of the initiating FBE NR-U can use directional transmissions during the COT, such that the other asynchronous FBE NR-U devices/operators can be have probability in passing their respective LBT.

In one example, the directional transmissions during the COT can be the directional transmission of NR-U signals/channels, such as the SS/PBCH blocks or DRS.

In one example, the directional transmissions during the COT can be at the beginning of the COT.

In one example, the directional transmissions during the COT can be at the end of the COT.

In one example, the directional transmissions at the initiating FBE NR-U device can be enabled at every N (N>=1) FFP upon successful LBT.

In one example, the directional transmissions at the initiating FBE NR-U device can be enabled at every N (N>=1) FFP.

Figure 31:
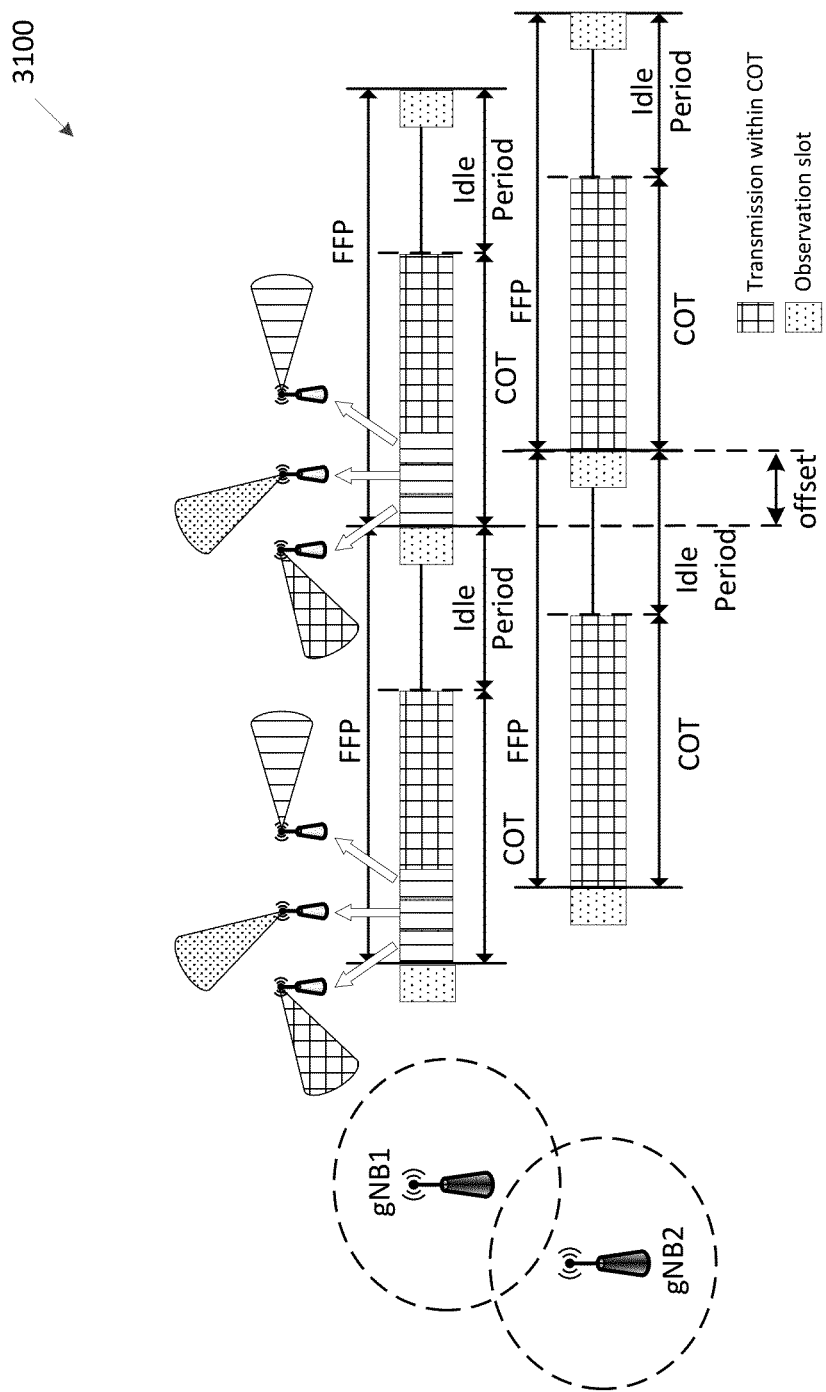
FIG. 31 illustrates yet another example LBT process access according to embodiments of the present disclosure.

FIG. 31 illustrates yet another example LBT process access 3100 according to embodiments of the present disclosure. The embodiment of the LBT process access 3100 illustrated in FIG. 31 is for illustration only. FIG. 31 does not limit the scope of this disclosure to any particular implementation.

As illustrated in FIG. 31, after a gNB1 has passed LBT, the gNB1 can use directional transmissions, e.g., to transmit SS/PBCH blocks; meanwhile, when a gNB2 performs LBT at an observation slot, since the directional spatial TX parameter from the gNB1 is not aligned with the gNB2, the gNB2 can pass LBT and utilize the following COT for own transmissions. By contrast, if both gNB1 only uses omnidirectional transmission, LBT at the gNB2 may always be blocked by the gNB1 as a result of the timing offset.

In one example, for FBE NR-U whose carrier channel bandwidth is larger than the operating channel bandwidth of the unlicensed/shared spectrum, and/or when the FBE NR-U supports multiple carriers, the FBE NR-U device can dynamically adjust an operating channel(s) and/or carrier(s) for FBE operation.

In one example, the operating channel bandwidth can be 20 MHz, and the carrier channel bandwidth can be an integer multiple of the operating channel bandwidth.

In one example, for each operating channel within the channel bandwidth and/or carrier of the FBE NR-U device, there can exist a maximum number of FFPs N1 that the operating channel and/or carrier can be utilized for transmission continuously.

In one sub-example, if the operating channel and/or carrier has been utilized for transmission after N1 consecutive FFPs, the FBE NR-U device can have an observation period of duration T1 or N2 (N2>=1) FFPs, during which the FBE NR-U device does not utilize current operating channel and/or carrier and can monitor for the transmission status of other FBE NR-U device(s)/operator(s) on this operating channel and/or carrier. For instance, if a gNB2 utilizes the operating channel and/or carrier right after the gNB1 stops transmission on current operating channel, this indicates it is likely that the transmission from the gNB1 has blocked LBT attempts of the gNB2 due to timing offset.

In another sub-example, after the observation period of duration T1 or N2 (N2>=1) FFPs, the current FBE NR-U device can resume to utilize the current operating channel and/or carrier after duration T2 or N3 (N3>=1) FFPs. For instance, T2 or N3 can also be infinite.

In one example, the FBE NR-U device can utilize different subsets of the operating channels within the channel bandwidth and/or carrier in a TDM'ed pattern.

In one sub-example, during a period of M (M>=1)FFPs, there can exist m (m>=1) subset, and the FBE NR-U device can use subset S_i (1<=i<=m) of the operating channels within the channel bandwidth and/or carrier for M_i (1<=i<=m) FFPs, with M_1+ . . . +M_m=M.

In another sub-example, different subset of the operating channels can be non-overlapping or overlapping. In one instance, one subset S_i can be all the operating channels within the channel bandwidth, and other subset(s) does not include all the operating channels within the channel bandwidth. In another instance, S_i (1<=i<=m) can be non-overlapping, and the union of S_i (1<=i<=m) is all the operating channels within the channel bandwidth. In another instance, the operating channel subset can be a null set.

In another sub-example, the duty cycle for each operating channel subset can be fixed. For instance, each subset can share equal fraction of time, and thus the duty cycle for each subset equals 1/m.

In another sub-example, the duty cycle for each operating channel subset can be dynamically adjusted. For instance, the subset with higher number of operating channels can have higher duty cycle, when the channel occupancy from other FBE NR-U devices using this subset is low and vice versa.

In another sub-example, from a single operating channel's perspective, the aforementioned example may be equivalent to enable the FBE NR-U device to utilize the operating channel through a TDM pattern; wherein the operating channel is utilized by the device if the operating channel belongs to the currently utilized subset of operating channels, and otherwise the operating channel is not utilized.

In one embodiment, short control signaling transmission for FBE NR-U is provided. In such embodiment, the principles and examples on supporting short control signaling transmissions for FBE NR-U is provided.

In one example, NR-U FBE can support the short control signaling transmissions, which are the transmissions used by the equipment to send management and control frames without sensing the channel for the presence of other signals.

In one example, the use of short control signaling transmissions needs to meet the constraints as follows: (1) within an observation period of 50 ms, the number of Short Control Signaling Transmissions by the equipment may be equal to or less than 50; and (2) the total duration of the equipment's Short Control Signaling Transmissions may be less than 2500 µs within the said observation period.

In one example, for an NR-U FBE initiating device that finds the operating channel to be occupied, it is allowed to continue the short control signaling transmissions on this channel providing it complies with the aforementioned examples.

In one example, the short control signaling constraint is interpreted as met if all the combined short control signaling transmissions from the gNB and the UEs associated with the gNB, have a total number of at most 50 transmissions with a total of at most 2500 µs within an observation period of 50 ms, with each short control signal transmission can be chosen from one of the channels/signals in the examples of the aforementioned embodiments and examples.

In one example, the short control signaling constraint can be interpreted per device (either a gNB or a UE), such that the constraint is met if the short control signaling transmissions from this device have a total number of at most 50 transmissions with a total of at most 2500 µs within an observation period of 50 ms, with each short control signal transmission can be chosen from one of the channels/signals in the examples of the aforementioned embodiments and examples.

In one example, FBE NR-U can support one or multiple types of signal/channel to be transmitted by utilizing the allowance of the short control signaling transmissions, without performing LBT.

In one example, the SS/PBCH blocks can be transmitted by a gNB. In one sub-example, the SS/PBCH block can be transmitted for initial access UEs to detect the SS/PBCH block and corresponding master information block (MIB). For instance, the remaining minimum system information (RMSI) and corresponding control resource set (CORESET) can also be transmitted along with the SS/PBCH block, subject to satisfying the constraints of short control signaling transmissions. In another instance, if SS/PBCH block design for FBE NR-U follows that as NR, wherein the SS burst set period is 20 ms and the SS burst is confined within a 5 ms measurement window; then at most 3 SS bursts can be transmitted within an observation period of 50 ms. If denote by n the maximum number of SS/PBCH blocks that can be transmitted within each SS burst to ensure short control signaling transmissions constraints are satisfied, then n needs to meet that: $3*\min(n,8)<=50$ and $3*4*n*symbol\_period<=2500$ µs. As a result, n is 2 and 5 respectively with 15 kHz SCS and 30 kHz SCS of the SS/PBCH block.

In another sub-example, the SS/PBCH block can be transmitted for measurement purpose, e.g., by the connected UEs. In another sub-example, a gNB can pre-configure the SS/PBCH block locations for connected UEs in fixed frame periods that succeed in LBT, wherein the configured SS/PBCH blocks may be used for measurement purpose. Compared to initial access, the SS/PBCH transmission periodicity for measurement can be increased from 20 ms to higher periodicity such as 40 or 80 ms; and the number of SS/PBCH to be transmitted can also be decreased.

In one example, the CSI-RS can be transmitted by a gNB. In one sub-example, the CSI-RS can be transmitted for measurement purpose, such as to evaluate the RSRP/RSRQ for the serving cell or neighboring cells. In another sub-example, the gNB can pre-configure the CSI-RS locations for connected UEs in fixed frame periods that succeed in LBT, wherein the configured CSI-RS be used for measurement purpose.

In one example, the DM-RS can be transmitted by a gNB, which can be multiplexed with PDCCH or PDSCH to be transmitted.

In one example, the UEs can transmit HARQ-ACK as short control signaling transmissions. In one sub-example, the UE can respond HARQ-ACK to the downlink transmissions from previous fixed frame period, regardless of if the LBT for current fixed frame period at a gNB fails or not. In another sub-example, the UE can respond HARQ-ACK to the downlink transmissions when the gap between timing for HARQ-ACK and the end of downlink transmission at the UE is larger than SIFS duration (e.g., 16 µs for 5 GHz unlicensed band); such that the UE does not need to perform an extra single-shot LBT for an observation slot duration before grating transmission of HARQ-ACK.

In one example, the UE can transmit PUCCH as short control signaling transmissions. In one sub-example, short PUCCH formats such as PUCCH format 0 or PUCCH format 2 can be transmitted with 1 symbol or 2 symbols in the PUCCH.

In one example, the UE can transmit SRS as the short control signaling transmissions.

In one example, the UE can transmit PRACH as the short control signaling transmissions.

In one sub-example, PRACH can be transmitted when the gap between timing for the allocated RACH occasion and the end of previous downlink transmission is larger than SIFS duration (e.g., 16 μs for 5 GHz unlicensed band); such that the UE does not need to perform an extra single-shot LBT for an observation slot duration before grating transmission of PRACH. In another sub-example, the UE can transmit PRACH at the allocated RACH occasion, regardless of if the LBT for current fixed frame period at a gNB fails or not. In another sub-example, following PRACH transmission, one or multiple of the Msg2, Msg3 and Msg4 of the random access procedure can be transmitted as the short control signaling transmissions, subject to satisfying the constraints.

In one example, the FBE NR-U responding device, upon correct reception of a packet which was intended for this device, can skip CCA and immediately proceed with the transmission of management and control frames; and a consecutive sequence of such transmissions by the equipment, without performing a new CCA may not exceed the MCOT. For instance, the management and control frames for FBE NR-U device can be HARQ-ACK.

In one example, all the previous principles and corresponding examples in this embodiment regarding the short control signaling transmission of FBE NR-U can also be applied to NR-U with LBE based operations, subject to the unlicensed regulations.

In one embodiment, a UE channel occupancy time detection for FBE NR-U is provided. In such embodiment, the approaches and examples on the detection of the COT for an FBE NR-U UE are provided, including the UE monitoring behavior of the COT and the COT structure detection of the UE.

In one example, the UE monitoring behavior for the COT and/or PDCCH can be divided into two or multiple phases, wherein the UE monitoring behavior for the COT and/or PDCCH can be different in different phases.

In one example, one phase can be the IDLE period. In one sub-example, the IDLE period phase can refer to the entire IDLE period of the fixed frame period. In another sub-example, when observation slots defined in Embodiment III are introduced as FBE NR-U enhancement, the IDLE period phase can refer to the start of the idle period until the start the start of the first contention slot within the idle period. In one sub-example, during this phase, the UE does not monitor for any NR-U channel/signal.

For instance, the UE can stay in a power saving mode. In one sub-example, if this phase is configured/supported, the UE can monitor for UE-specific PDCCH and/or GC-PDCCH and/or FBE NR-U preamble signals in this phase. In addition, if the UE has detected such signals/channels, the UE can determine a serving gNB has successfully passed LBT and may transmit in the COT.

In another sub-example, if the UE monitors for UE-specific PDCCH and/or GC-PDCCH and/or FBE NR-U preamble signals in this phase, the granularity for UE monitoring can be on an NR-U slot level or NR-U mini-slot level or NR-U symbol level; wherein the granularity can be fixed in the spec, or configured by higher layer parameter. In addition, the granularity for different channels/signals that a UE monitors for can be either same or different. For instance, a UE can be configured with dedicated monitoring period for PDCCH and GC-PDCCH respectively. In another sub-example, this monitoring phase can be referred to as Phase A.

In one example, when observation slots defined in the aforementioned embodiments and examples are introduced as FBE NR-U enhancement, one phase can be the configured observation slots.

In one sub-example, the configuration of the observation slots can be indicated through system information such as the remaining system information (RMSI) and/or the other system information (OSI).

In another sub-example, the configured observation slots can span both the end of the idle period and the start of the channel occupancy time of the next fixed frame period.

In another sub-example, if this phase is configured/supported, the a UE can monitor for the signals/channels that may be transmitted after the NR-U FBE initiating device (i.e., gNB) has passed LBT at an assigned observation slot(s), wherein such signals/channels are detailed in the aforementioned embodiments and examples. In addition, if such signals/channels have been detected by the FBE UE, the UE can determine a serving gNB has successfully passed LBT and may transmit in the COT.

In another sub-example, the time-domain granularity for UE monitoring can be an observation slot. In another sub-example, this monitoring phase can be referred to as Phase B.

In one example, another monitoring phase can be the entire channel occupancy time (COT).

In one sub-example, a UE can have the same monitoring behavior within the entire COT. This can be applied when there is no enhancement of random observation slots; and when the starting time of the fixed frame period is aligned with the starting position of an NR-U slot.

In one sub-example, if this phase is configured/supported, the UE can monitor for UE-specific PDCCH and/or GC-PDCCH and/or FBE NR-U preamble signals in this phase. In addition, if such signals/channels have been detected by the FBE UE, the UE can determine a serving gNB has successfully passed LBT and transmit in the current COT (i.e., COT is detected by the UE).

In another sub-example, the granularity for UE monitoring in this phase can be on an NR-U slot level or NR-U mini-slot level; wherein the granularity can be fixed in the spec, or configured by higher layer parameter, or can be dynamically adjusted according to the DCI. In addition, the granularity for different channels/signals that a UE monitors for can be either same or different. For instance, a UE can be configured with dedicated monitoring period for PDCCH and GC-PDCCH respectively.

In another sub-example, the UE monitoring behavior in this phase can be configured by higher layer and/or DCI, such that a UE only monitors for FBE NR-U channels/signals for a subset duration of this phase. In another sub-example, this monitoring phase can be referred to as Phase C.

In one example, another monitoring phase can be the starting portion with duration τ of the COT in the fixed frame period.

In one sub-example, when the start of the channel occupancy time is aligned with NR-U frame structure on a mini-slot and/or symbol level, τ can be the duration of the initial partial slot of the COT.

In one sub-example, if this phase is configured/supported, a UE can monitor for UE-specific PDCCH and/or GC-PDCCH and/or FBE NR-U preamble signals in this phase. In addition, if such signals/channels have been detected by the FBE UE, the UE can determine a serving gNB has successfully passed LBT and transmit in the current COT (i.e., COT is detected by the UE).

In another sub-example, the granularity for UE monitoring in this phase can be on an NR-U mini-slot level or NR-U symbol level; wherein the granularity can be fixed in the spec or configured by higher layer parameter. In addition, the granularity for different channels/signals that a UE monitors for can be either same or different. For instance, a UE can be configured with dedicated monitoring period for PDCCH and GC-PDCCH respectively. In another sub-example, this monitoring phase can be referred to as Phase D.

In one example, another monitoring phase can be from duration τ after the start of the COT until the end of the COT of the fixed frame period.

In one sub-example, this example can be applied when observation slots are introduced, and the configured observation slots ends after duration τ of a COT. If the observation slots are all contained within the idle period, τ can be 0; otherwise τ>0.

In another sub-example, this example can be applied when the start of the channel occupancy time is aligned with NR-U frame structure on a mini-slot and/or symbol level, τ can be the duration of the initial partial slot of the COT.

In one sub-example, if this phase is configured/supported, the UE can monitor for UE-specific PDCCH and/or GC-PDCCH in this phase and/or FBE NR-U preamble signals.

In another sub-example, the granularity for UE monitoring in this phase can be on an NR-U slot level or NR-U mini-slot level; wherein the granularity can be fixed in the spec, or configured by higher layer parameter, or can be dynamically adjusted according to the DCI. In addition, the granularity for different channels/signals that a UE monitors for can be either same or different. For instance, a UE can be configured with dedicated monitoring period for PDCCH and GC-PDCCH respectively. In another sub-example, this monitoring phase can be referred to as Phase E.

In one example, each fixed frame period can be divided into two monitoring phases with Phase A and Phase C only, wherein Phase A spans over the entire idle period of the COT.

In one sub-example, the UE switching from Phase A (of a previous COT) to Phase C (of current COT) can be implicit, wherein a UE switches from Phase A (of a previous COT) to Phase C (of current COT) according to the configured structure of the fixed frame period (i.e., COT duration and idle period duration in each COT), wherein the UE can obtain the fixed frame period configuration according to the aforementioned embodiments and examples.

In one sub-example, the UE switching from Phase A (of a previous COT) to Phase C (of current COT) can be explicit, wherein trigger for a UE to switch from Phase A (of a previous COT) to Phase C (of current COT) is that UE-specific PDCCH and/or GC-PDCCH and/or FBE NR-U preamble signals has been detected by the UE.

In one sub-example, the UE switching from Phase C (of a current COT) to Phase A (of current COT) can be implicit, wherein a UE switches from Phase C (of current COT) to Phase A (of current COT) according to the configured structure of the fixed frame period (i.e., COT duration and idle period duration in each COT), wherein the UE can obtain the fixed frame period configuration according to the aforementioned embodiments and examples.

In one sub-example, the UE switching from Phase C (of a current COT) to Phase A (of current COT) can be implicit, wherein a UE switches from Phase C (of a current COT) to Phase A (of current COT) according to a configured structure of the fixed frame period (i.e., COT duration and idle period duration in each COT), wherein the UE can obtain the fixed frame period configuration according to the aforementioned embodiments and examples.

In one example, each fixed frame period can be divided into three monitoring phases with Phase A, Phase B and Phase E.

In one sub-example, this example can be used when random observation slots are introduced.

In another sub-example, the UE switching from Phase A (of a previous COT) to Phase B can be implicit, wherein a UE switches from Phase A (of a previous COT) to Phase B according to the configured structure of the fixed frame period (i.e., COT duration and idle period duration in each COT), wherein the UE can obtain the fixed frame period configuration according to the aforementioned embodiments and examples.

In one sub-example, the UE switching from Phase A (of a previous COT) to Phase B can be explicit, wherein the trigger for a UE to switch from Phase A (of a previous COT) to Phase B if UE-specific PDCCH and/or GC-PDCCH and/or FBE NR-U preamble signals has been detected by the UE.

In another sub-example, the UE switching from Phase B to Phase E (of current COT) can be implicit, wherein a UE switches from Phase B to Phase E (of current COT) according to the configured structure of the fixed frame period (i.e., COT duration and idle period duration in each COT), wherein the UE can obtain the fixed frame period configuration according to the aforementioned embodiments and examples.

This example can be applied regardless if a UE has detected the signals/channels that may be transmitted by the NR-U FBE initiating device (i.e., gNB) after the UE has passed an LBT at an assigned observation slot(s), which is detailed in the aforementioned examples and embodiments.

In another sub-example, the UE switching from Phase B to Phase E (of current COT) can be explicit, wherein a UE switches from Phase B to Phase E (of current COT) if the UE has detected the signals/channels that may be transmitted by the NR-U FBE initiating device (i.e., gNB) after the UE has passed an LBT at an assigned observation slot(s), which is detailed in the aforementioned examples and embodiments.

In another sub-example, the UE switching from Phase E (of a current COT) to Phase A (of current COT) can be implicit, wherein a UE switches from Phase E (of a current COT) to Phase A (of current COT) according to the configured structure of the fixed frame period (i.e., COT duration and idle period duration in each COT), wherein the UE can obtain the fixed frame period configuration according to the aforementioned embodiments and examples.

In one example, each fixed frame period can be divided into three monitoring phases with Phase A, Phase D and Phase E.

In one sub-example, this example can be used when the start of the channel occupancy time is aligned with NR-U frame structure on a mini-slot and/or symbol level.

In another sub-example, this example can be used when the UE monitoring behavior (e.g., for PDCCH/GC-PDCCH/ preamble signal) in first k>=1 slots of the channel occupancy time (including mini-slot) is different from the remaining slots of the COT.

In another sub-example, the UE switching from Phase A (of a previous COT) to Phase D (of current COT) can be implicit, wherein a UE switches from Phase A (of a previous COT) to Phase D (of current COT) according to the configured structure of the fixed frame period (i.e., COT duration and idle period duration in each COT), wherein the UE can obtain the fixed frame period configuration according to the aforementioned embodiments and examples.

In one sub-example, the UE switching from Phase A (of a previous COT) to Phase D (of current COT) can be explicit, wherein the trigger for a UE to switch from Phase A (of a previous COT) to Phase D (of current COT) can be UE-specific PDCCH and/or GC-PDCCH and/or FBE NR-U preamble signals has been detected by the UE.

In another sub-example, the UE switching from Phase D (of current COT) to Phase E (of current COT) can be implicit, wherein a UE switches from Phase D (of current COT) to Phase E (of current COT) according to the configured structure of the fixed frame period (i.e., COT duration and idle period duration in each COT), wherein the UE can obtain from fixed frame period configuration (e.g., according to the aforementioned embodiments and examples) as well as the FBE frame structure, the switching boundary from Phase D to Phase E.

For instance, Phase D can be an initial NR-U mini-slot, while Phase E can start from the first NR-U full slot within the COT. This example can be applied regardless if a UE has detected the signals/channels that may be transmitted by the NR-U FBE initiating device (i.e., gNB) after the UE has passed an LBT at an assigned observation slot(s), which is detailed in the aforementioned examples and embodiments.

In another sub-example, the UE switching from Phase D to Phase E (of current COT) can be explicit, wherein trigger for a UE to switch from Phase D to Phase E (of current COT) if the UE has detected the signals/channels that may be transmitted by the NR-U FBE initiating device (i.e., gNB) after the UE has passed an LBT at an assigned observation slot(s), which is detailed in the aforementioned embodiments and examples.

In another sub-example, the UE switching from Phase E (of a current COT) to Phase A (of current COT) can be implicit, wherein a UE switches from Phase E (of a current COT) to Phase A (of current COT) according to the configured structure of the fixed frame period (i.e., COT duration and idle period duration in each COT), wherein the UE can obtain the fixed frame period configuration according to the aforementioned embodiments and examples.

In one example, the UE can obtain the structure of the channel occupancy time during the monitoring phase(s) of the fixed frame period.

In one example, the UE can obtain the slot format for each slot of the COT from the GC-PDCCH detected during the COT.

In one sub-example, the GC-PDCCH can reuse the DCI format 2_0 from NR, wherein the DCI format can indicate the DL/UL/flexible symbol for each slot within the COT.

In another sub-example, the GC-PDCCH can be enhanced from DCI format 2_0 of NR. For instance, the GC-PDCCH can be of a new DCI format other than DCI format 2_0.

In one example, for the FBE NR-U slot(s) that overlap with the IDLE period of the FBE fixed frame period, the UE can ignore the slot format configuration on symbol(s) of such FBE NR-U slot(s) that overlap with the IDLE period.

In one sub-example, if the random observation slots are used, the UE can ignore the UE can ignore the slot format configuration on symbol(s) of such FBE NR-U slot(s) that overlap with the IDLE period excluding the observation slots.

In another sub-example, if the random observation slots are used, the UE can treat the symbol(s) of such FBE NR-U slot(s) that overlap with the observation slots as DL symbols by default.

In another sub-example, if the random observation slots are used, the UE can determine the format of the symbol(s) that overlap with the observation slots according to the corresponding slot format indication (SFI).

In one example, the sub-band usage information can also be indicated to the UE through GC-PDCCH/UE-specific PDCCH/FBE NR-U preamble signals, which UE may detect during the monitoring phases of the fixed frame period.

In one sub-example, the sub-band usage information can include which sub-band(s) the gNB can utilize in current COT for DL/UL transmissions. For instance, such sub-bands can be determined by the gNB according to the aforementioned embodiments and examples. In another instance, such information can be indicated through GC-PDCCH.

In another sub-example, the sub-band usage information can include which sub-band(s) the gNB configures in current COT for DL/UL transmissions to the UE. For instance, such sub-bands can be a subset of the sub-bands determined by the gNB according to the aforementioned embodiments and examples. In another instance, such information can be indicated through UE specific PDCCH.

For the downlink (DL) to uplink (UL) switching and uplink to downlink switching operations performed by NR unlicensed (NR-U), the above unlicensed regulations regarding the LBT requirements need to be satisfied.

The present disclosure provides design aspects to support DL to UL switching and UL to DL switching of NR-U, the NR-U operations at DL to UL switching point(s) and UL to DL switching point(s) and the corresponding LBT requirements.

The present disclosure includes several embodiments, principles, approaches and examples that can be used in conjunction or in combination with one another or can operate as standalone. The embodiments/principles/approaches/examples in this disclosure can be applied to FBE-based NR-U, LBE-based NR-U, or both FBE-based and LBE-based NR-U.

In the present disclosure, sub-7 GHz NR-U refers to NR-U that operates in the unlicensed/shared bands below 7 GHz, such as the 5 GHz unlicensed bands or the 6 GHz unlicensed/shared bands; and above-7 GHz NR-U refers to NR-U that operators in the unlicensed/shared bands above 7 GHz, such as the 60 GHz unlicensed bands. In addition, the "DL/UL switching" refers to either one DL to UL switching, or one UL to DL switching.

In one embodiment, principles on DL/UL Switching for NR-U is provided.

In one embodiment, NR-U can support downlink to uplink switching within the channel occupancy time (COT), such that the UE(s) associated with a gNB can be authorized for uplink transmissions within the COT.

In one example, the COT can be obtained by the gNB, e.g., for FBE-based NR-U or LBE-based NR-U.

In one example, the uplink transmission can be scheduled by the gNB through UL grant, or grant-free uplink transmissions, or HARQ-ACK that responds to the previous downlink transmissions, or other PUCCH transmission, or SRS transmissions.

In one example, the LBT requirement for such uplink transmissions by the UE may follow that of the unlicensed regulation, i.e., LBT is not needed if uplink transmission starts within SIFS duration (e.g., 16 µs for 5 GHz band) after the last downlink transmission; otherwise LBT needs to be performed during an observation slot within a period of PIFS duration (e.g., 25 µs for 5 GHz band) ending before the granted uplink transmission needs to be performed by the UE.

In one example, a no-LBT option can be adopted for such uplink transmission, subject to regulation allowance and restrictions. For instance, this no-LBT option can be used when a UE responds HARQ-ACK to the corresponding DL transmission, subject to regulation restrictions.

In one embodiment, NR-U can support uplink to downlink switching within the COT, such that the serving gNB of the UE can be authorized for downlink transmissions within the COT.

In one example, the COT can be obtained by the UE through LBT operation similar to category-4 (CAT-4) LBT of LTE-LAA for LBE-based NR-U, or if a UE is initiating device for FBE-based NR-U.

In one example, the LBT requirement for such downlink transmissions by the gNB may follow that of the unlicensed regulation, i.e., LBT is not needed if downlink transmission starts within SIFS duration (e.g., 16 µs for 5 GHz band) after the last uplink transmission; otherwise LBT needs to be performed during an observation slot within a period of PIFS duration (e.g., 25 µs for 5 GHz band) ending before the downlink transmission needs to be performed by the gNB.

In one example, a no-LBT option can be adopted for such downlink transmission, subject to regulation allowance and restrictions. For instance, this no-LBT option can be used when a gNB responds HARQ-ACK to the corresponding UL transmission, subject to regulation restrictions.

In unlicensed regulation, the responding device may transmit in the current operating channel for the remaining COT after receiving the grant from the initiating device, and the responding device can have multiple transmissions providing the gap does not exceed 16 µs.

In addition, the grant can be issued to multiple responding devices, and each responding device can transmit in the remaining COT according to the start time indicated in the grant.

In one example, under the unlicensed regulation, NR-U can have at most one DL to UL switching, if the initiating device is a gNB and the responding device is the UE. In one sub-example, multiple UEs can perform UL transmissions with the COT after the DL to UL switching. In another example, under the unlicensed regulation, NR-U can have at most one UL to DL switching, if the initiating device is a UE and the responding device is the gNB.

In one embodiment, NR-U can allow more than one DL to UL switching point(s) and UL to DL switching point(s) within the channel occupancy time.

In one example, the COT can be the COT obtained by the gNB in an LBE mode. In one example, the COT can be the COT obtained by the gNB in an FBE mode. In one example, the COT can be obtained by the UE in LBE mode. In one example, the COT can be obtained by the UE in FBE mode. In one example, for each of the DL to UL switching points, LBT is not needed for the UE if the uplink transmission starts within SIFS duration (e.g., 16 µs for 5 GHz band) after the last downlink transmission from the UE perspective; otherwise LBT needs to be performed by the UE during an observation slot within a period of PIFS duration (e.g., 25 µs for 5 GHz band) ending before the granted uplink transmission. In one sub-example, this can be applied to COT obtained by the gNB, and the uplink transmission is the initial uplink transmission from the UE within this COT.

In one example, for each of the UL to DL switching points, LBT is not needed for a gNB if downlink transmission starts within SIFS duration (e.g., 16 µs for 5 GHz band) after the last uplink transmission from the gNB perspective; otherwise, LBT needs to be performed by the gNB during an observation slot within a period of PIFS duration (e.g., 25 µs for 5 GHz band) ending before the downlink transmission. In one sub-example, this can be applied to COT obtained by the UE, and the downlink transmission is the initial downlink transmission from the gNB within this COT.

In one example, a no-LBT option can be adopted for the DL to UL switching point(s), and/or UL to DL switching point(s), subject to regulation allowance and restrictions. For instance, this no-LBT option can be used when a UE responds HARQ-ACK to the corresponding DL transmission at the DL to UL switching point, subject to regulation restrictions.

In one example, for each switching from DL to UL then back to DL (e.g., DL-UL-DL switching) during a COT obtained by a gNB, LBT is not needed for the gNB to resume the DL transmission if the gap between the end of first DL transmission and the start of the second DL transmission for this DL-UL-DL switching is within SIFS duration (e.g., 16 µs for 5 GHz band); and if the gap between the end of first DL transmission and the start of the second DL transmission is between SIFS duration and PIFS duration (e.g., [16 µs, 25 µs] for 5 GHz band), a gNB can resume the DL transmission if LBT is passed during an observation slot.

For instance, this can be applied to sub-7 NR-U system with higher subcarrier spacing such as 60 kHz SCS or 120 kHz SCS. In another instance, this can be applied to FDD NR-U system, such as when NR-U uplink is transmitted through licensed carrier, and that the gap between two DL transmissions of this DL-UL-DL switching can be only 1 OFDM symbol, which is less than 25 µs with subcarrier spacing of 60 kHz or higher SCS.

In one sub-example, if the gap between the end of first DL transmission and the start of the second DL transmission is larger than PIFS duration (e.g., 25 µs for 5 GHz band), a gNB can resume the second DL transmission if LBT is passed during an observation slot within a period of PIFS duration ending before the start of second DL transmission. For instance, this can be used for FBE-based NR-U, or LBE-based NR-U in 6 GHz band or 5 GHz band, or FDD-based NR-U, such as uplink carrier on the licensed band.

In another sub-example, if the gap between the end of first DL transmission and the start of the second DL transmission is larger than PIFS duration (e.g., 25 µs for 5 GHz band), a gNB cannot resume the DL transmission. For instance, this can be used for LBE-based TDD NR-U in 5 GHz band and when the COT is obtained by the gNB LBT.

In another sub-example, if after the DL-UL-DL switching, another DL to UL switching is initiated, then the second DL to UL switching for this DL-UL-DL-UL switching is allowed only if the two UL transmissions are from the same UE over the unlicensed carrier and the gap between the two UL transmissions are within SIFS duration (e.g., 16 µs for 5 GHz band); or if the two UL transmissions are over the licensed carrier; or if the two UL transmissions are from different UEs over the unlicensed carrier, then the second DL to UL switching satisfies the example of the LBT requirement for such uplink transmission from the aforementioned embodiments and examples.

For instance, for sub-7 GHz NR-U and subcarrier spacing of no larger than 60 kHz and SIFS duration of 16 μs, the DL-UL-DL-UL switching cannot be allowed if the two UL transmissions over the unlicensed carrier are from the same UE; and the UE HARQ-ACK for the second DL transmission for the DL-UL-DL switching can be either reported by the UE within the next COT obtained by the gNB or reported by the UE with a COT obtained by this UE through CAT-4 LBT.

In another sub-example, if further DL/UL switching is needed, the LBT requirements from this example needs to be met, and the total number of DL/UL switching points need to meet the example on the maximum allowed number of DL/UL switching points for this principle.

In one example, for each switching from UL to DL then back to UL (e.g., UL-DL-UL switching) during a COT obtained UE, LBT is not needed for the UE to resume the UL transmission if the gap between the end of first UL transmission and the start of the second UL transmission of this UL-DL-UL switching is within SIFS duration (e.g., 16 μs for 5 GHz band); and if the gap between the end of first UL transmission and the start of the second UL transmission is between SIFS duration and PIFS duration (e.g., [16 μs, 25 μs] for 5 GHz band), a UE can resume the UL transmission if LBT is passed during an observation slot.

In one sub-example, if the gap between the end of first UL transmission and the start of the second UL transmission is larger than PIFS duration (e.g., 25 μs for 5 GHz band), a UE can resume the UL transmission if LBT is passed during an observation slot within a period of PIFS duration ending before the start of the second DL transmission. For instance, this can be used for FBE-based NR-U, or LBE-based NR-U in 6 GHz band or 5 GHz band.

In another sub-example, if the gap between the end of first UL transmission and the start of the second UL transmission is larger than PIFS duration (e.g., 25 μs for 5 GHz band), a UE cannot resume the UL transmission. For instance, this can be used for LBE-based NR-U in 5 GHz band and when the COT is obtained by a UE LBT.

In another sub-example, if after the UL-DL-UL switching, another UL to DL switching is initiated, then the second UL to DL switching for this UL-DL-UL-DL switching is allowed if the two DL transmissions are from the same gNB (or TRP) and the gap between the two DL transmissions are within SIFS duration (e.g., 16 μs for 5 GHz band); or if the two DL transmissions are from different gNBs (or TRPs), then the second UL to DL switching satisfies the example of the LBT requirement for such downlink transmission from the aforementioned embodiments and examples.

For instance, for sub-7 GHz NR-U and subcarrier spacing of no larger than 60 kHz and SIFS duration of 16 μs, the UL-DL-UL-DL switching cannot be allowed if the two DL transmissions are from the same gNB.

In another sub-example, if further DL/UL switching is needed, the LBT requirements from this example needs to be met, and the total number of DL/UL switching points need to meet the example on the maximum allowed number of DL/UL switching points for this principle.

In one example, the maximum allowed number of DL/UL switching points within the COT, including both DL to UL switching point(s) and UL to DL switching point(s) can be either predefined in the spec or configurable; wherein the spec can specify the total number of DL to UL switching point(s) and UL to DL switching point(s), or specify the number of DL to UL switching point(s) and the number for UL to DL switching point(s) separately, or specify either one of the number of DL to UL switching point(s) or the number for UL to DL switching point(s).

In one instance, the maximum number of switching points can be predefined in the spec as a fixed number, such as N (N>=1) within a COT duration. In another instance, the maximum number of switching points can be predefined in the spec, wherein the number is scalable with the COT duration, such as being non-decreasing with a COT duration for at least one of LBE-based or FBE-based NR-U. For instance, if the COT duration is M milliseconds, the maximum allowed total number of switching points can be 2*M−1, which can be at least applied to the scenario where a UE responds HARQ-ACK feedback to the corresponding DL transmissions every 1 millisecond.

Figure 32:
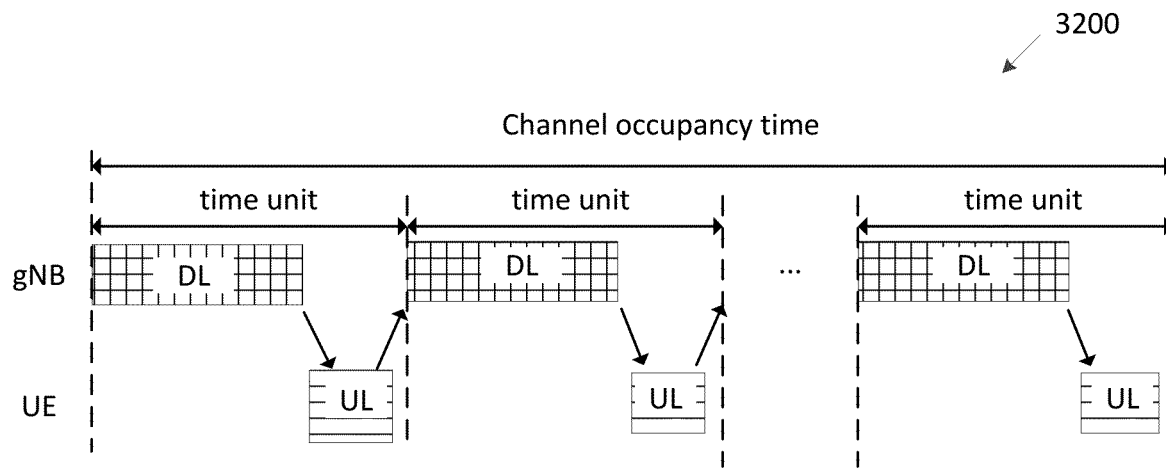
FIG. 32 illustrates an example time unit in channel occupancy time according to embodiments of the present disclosure.

FIG. 32 illustrates an example time unit in channel occupancy time 3200 according to embodiments of the present disclosure. The embodiment of the time unit in channel occupancy time 3200 illustrated in FIG. 32 is for illustration only. FIG. 32 does not limit the scope of this disclosure to any particular implementation.

FIG. 32 provides an illustration of this instance, wherein the time unit is 1 ms. In another instance, if the COT duration is M NR-U slots of a given subcarrier spacing (e.g., 15 kHz SCS for sub-7 GHz NR-U), the maximum allowed number of switching points can be 2*M−1, which can be at least applied to the scenario where a UE responds HARQ-ACK feedback to the corresponding DL transmissions once every NR-U slot duration of the given subcarrier spacing.

FIG. 32 provides an illustration of this instance, wherein the time unit is the slot duration of the given subcarrier spacing, such as 15 kHz SCS for sub-7 GHz NR-U or 60 kHz SCS for above-7 GHz NR-U.

In one example, the maximum number of switching points can be predefined in the spec, wherein the number is scalable with the LBT priority class, such as being non-decreasing as the LBT priority class increases, i.e., NR-U has lower priority to access the channel. In one example, the maximum number of switching points can be increased with the FFP duration for FBE-based NR-U.

In one example, for a given COT, the maximum number of switching points can be increased when the subcarrier spacing for NR-U increases. In one example, there can exist a maximum allowed number of switching points per NR-U slot, denoted by N, which can be larger than or equal to 1; or smaller than 1, in which case there can exist at most 1 DL/UL switching point every 1/N NR-U slots on average. In one example, there can exist at most 1 DL/UL switching point every NR-U mini-slot.

In one example, NR-U can utilize the allowance of one or multiple DL/UL switching points within a COT for a UE to report HARQ-ACK feedback(s) for the corresponding downlink transmissions at the UL portion(s) of the COT. For instance, the unlicensed regulation allows the device to skip LBT and immediately proceed with the transmission of management and control frames (e.g., ACK or block ACK frames), upon correct reception of a packet which was intended for this device.

In one sub-example, if a gNB does not receive HARQ-ACK from the UE at the pre-determined location(s) for a UE to respond HAQR-ACK, the gNB can treat this condition as receiving a NACK. In another sub-example, HARQ-ACK can also be treated as part of the short control signaling transmissions such that LBT can be skipped, as long as the constraints for short control signaling transmissions are satisfied.

In one embodiment, LBT at DL/UL switching points for NR-U is provided. In such embodiment, the principles and approaches are provided for operations at DL/UL switching point(s) and the corresponding LBT requirements for NR-U, which applies to both sub-7 GHz NR-U and above-7 GHz NR-U.

An important design consideration for DL/UL switching of NR-U (including both FBE and LBE based NR-U) is the timing analysis for the necessity of performing a single-shot LBT at DL to UL switching point and UL to DL switching point. In NR, the uplink NR-U slot transmission for a UE takes place $\tau=(N_{TA}+N_{TA,\ offset})*T_c$ before the start of the corresponding downlink NR-U slot at the UE, wherein $T_c=1/(4096*480\ kHz)$, $N_{TA}*T_c$ represents the timing advance value of the UE (e.g., round trip delay between an gNB and the UE); $N_{TA,\ offset}*T_c$ represents the guard period for the UL to DL switching time, which is 0 for FDD, 25560 $T_c=13\ \mu s$ for TDD in FR1 and 13763 $T_c=7\ \mu s$ for TDD in FR2. Such a timing relation is illustrated in FIG. 33.

Figure 33:
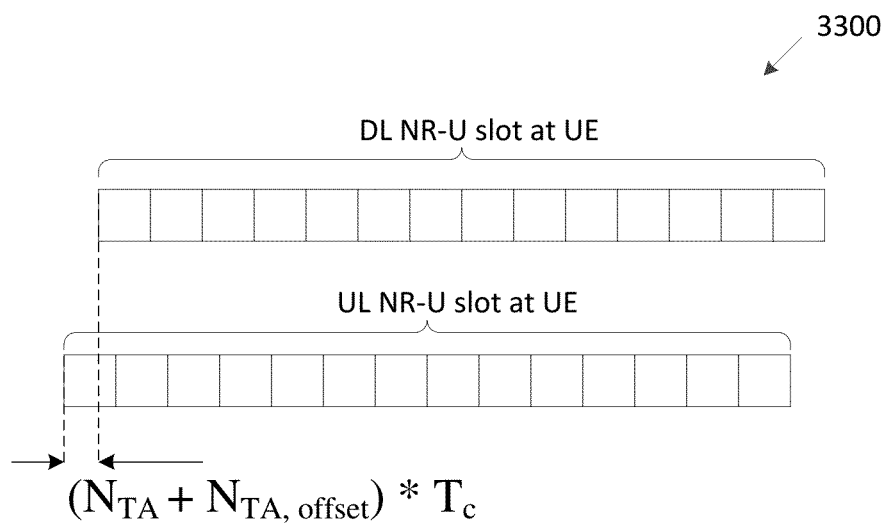
FIG. 33 illustrates an example timing relation according to embodiments of the present disclosure.

FIG. 33 illustrates an example timing relation 3300 according to embodiments of the present disclosure. The embodiment of the timing relation 3300 illustrated in FIG. 33 is for illustration only. FIG. 33 does not limit the scope of this disclosure to any particular implementation.

In one embodiment, denote by GP the total allocated guard period duration for one DL to UL switch and corresponding UL to DL switch, then GP is an integer number of NR-U OFDM symbols which needs to satisfy: $GP>=TA_{max}+N_{TA,\ offset}*T_c+T_{UE\ DL-UL}$, wherein $T_{UE\ DL-UL}$ is UE RF switching time from DL (reception) to UL (transmission); $N_{TA,\ offset}*T_c$ accounts for the guard period allocated for the UL to DL switch; while $GP-N_{TA,\ offset}*T_c$ is the guard period allocated for DL to UL switch, which needs to include at least the UE RF switching time from DL to UL (i.e., $T_{UE\ DL-UL}$) and the max UE timing advance value based on the cell size (i.e., $TA_{max}$).

Figure 34:
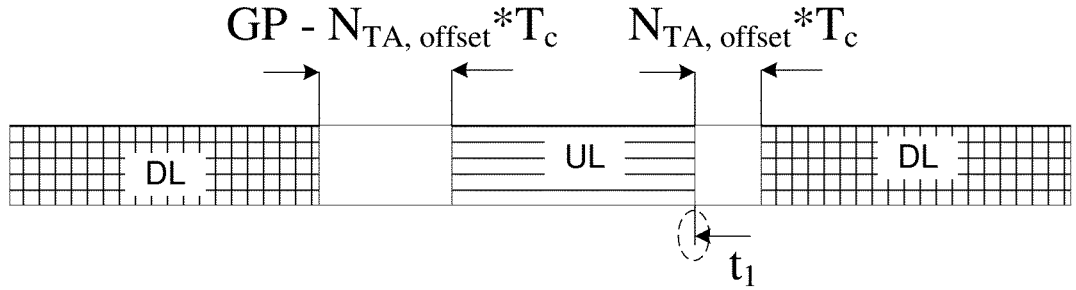
FIG. 34 illustrates an example guard period timing relation according to embodiments of the present disclosure.

FIG. 34 illustrates an example guard period timing relation 3400 according to embodiments of the present disclosure. The embodiment of the guard period timing relation 3400 illustrated in FIG. 34 is for illustration only. FIG. 34 does not limit the scope of this disclosure to any particular implementation.

In one example, FIG. 34 provides an illustration of such guard periods timing relation at a gNB.

Figure 35:
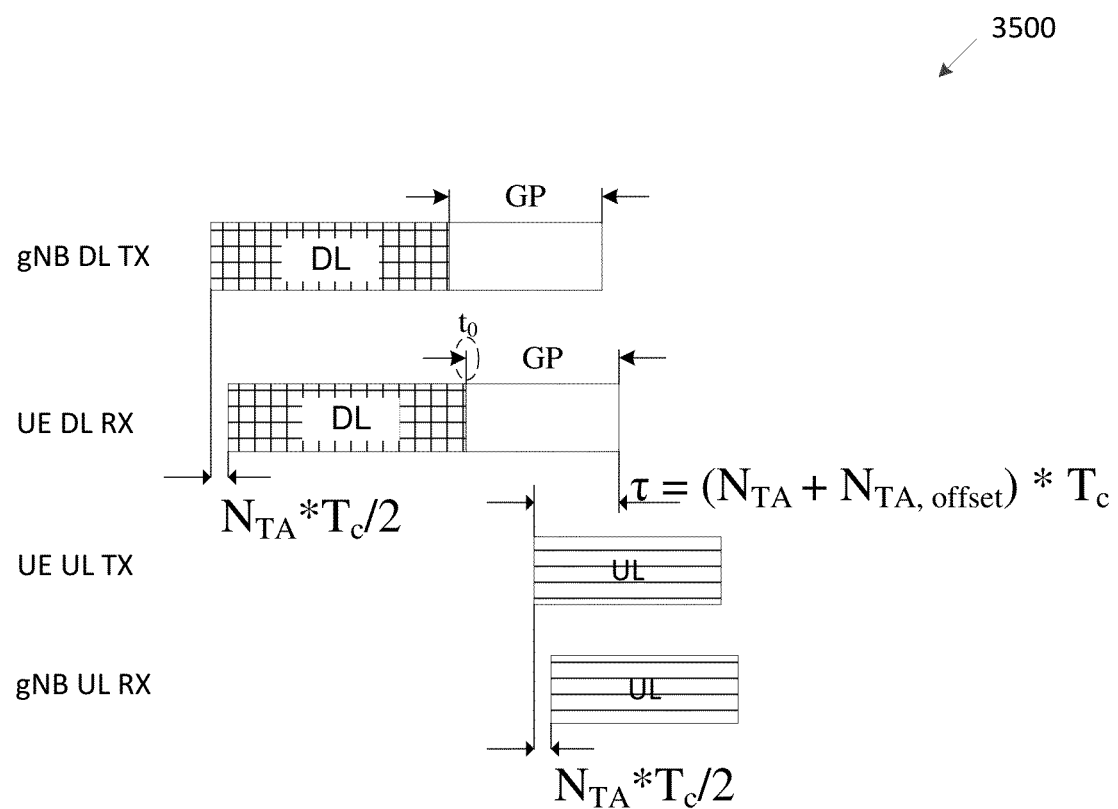
FIG. 35 illustrates an example timing relation according to embodiments of the present disclosure.

FIG. 35 illustrates an example timing relation 3500 according to embodiments of the present disclosure. The embodiment of the timing relation 3500 illustrated in FIG. 35 is for illustration only. FIG. 35 does not limit the scope of this disclosure to any particular implementation.

FIG. 35 provides an illustration of the timing relation at both a gNB side and a UE side for DL to UL switching, wherein the timing advance value for the UE is $N_{TA}*T_c$ (in $T_c$ units).

In one example, for a downlink to uplink switching point during a COT, if the gap duration between the start of the assigned uplink transmission and the end of previous downlink transmission is less than SIFS duration from the UE perspective (e.g., $GP-\tau<SIFS$ with $\tau=(N_{TA}+N_{TA,\ offset})*T_c$), then no LBT is needed for an NR-U UE to start UL transmission; and if the gap duration between the start of assigned the uplink transmission and the end of previous downlink transmission is at least SIFS duration from the UE perspective (e.g., $GP-\tau>=SIFS$ with $\tau=(N_{TA}+N_{TA,\ offset})*T_c$), then at least one of the following options can be adopted by an NR-U UE for the DL to UL switching.

In a first option, a UE can perform LBT during an observation slot within a period of PIFS duration ending before the assigned start of UL transmission inside the guard period. In one example, the start time to perform the LBT is within $[\max(t_0, t_0+GP-\tau-PIFS), t_0+GP-\tau-observation\ slot]$, wherein to refers to the end of DL transmission at a UE as illustrated in FIG. 35.

In a second option, a UE can transmit a reservation signal starting at time instance t, which is within $[t_0+T_{UE\ DL-UL}, t_0+SIFS]$; and end at $t_0+GP-\tau$, wherein to refers to the end of DL transmission at a UE as illustrated in FIG. 35; in this case the LBT is not required by the UE. This option needs SIFS to be no smaller than $T_{UE\ DL-UL}$, i.e., the UE DL to UL switching time.

In a third option, a UE can extend a cyclic prefix (CP) of the next uplink transmission, such that the extended CP can be transmitted from $[t_0+t, t_0+GP-\tau]$, with t within $[T_{UE\ DL-UL}, SIFS]$ and to refers to the end of DL transmission at the UE as illustrated in FIG. 35. In this case, the LBT is not required by the UE for next uplink transmission. This option needs SIFS to be no smaller than $T_{UE\ DL-UL}$, i.e., the UE DL to UL switching time.

In a fourth option, a UE can use a no-LBT option subject to regulation allowance and restrictions. For instance, this no-LBT option can be used when the UE responds HARQ-ACK to the corresponding DL transmission, subject to unlicensed band regulation restrictions.

In one example, for sub-7 GHz NR-U, the observation slot duration can be 9 μs, SIFS duration can be 16 μs, and the PIFS duration can be 25 μs. In another example, for above-7 GHz NR-U, the observation slot duration can be 5 μs, SIFS duration can be 3 μs, and the PIFS duration can be 8 μs.

In one example, for sub-7 GHz NR-U, the maximum allowed UE DL to UL RF switching time $T_{UE\ DL-UL}$ is 13 μs; and for above-7 GHz NR-U, the maximum allowed UE DL to UL RF switching time $T_{UE\ DL-UL}$ is 7 μs.

In one example, the same value of $N_{TA,\ offset}$ from TDD NR in FR1 can be used for sub-7 GHz NR-U, which leads to $N_{TA,\ offset}*T_c=13\ \mu s$. In another example, the same value of $N_{TA,\ offset}$ from TDD NR in FR2 can be used for above-7 GHz NR-U, which leads to $N_{TA,\ offset}*T_c=7\ \mu s$.

In one example, if the DL to UL switching during a COT is part of a UL-DL-UL switching, then the LBT requirement at the DL to UL switching may also follow the aforementioned examples and embodiments.

In one example, if LBT is needed by the UE for DL to UL switching, then GP as defined in the aforementioned embodiments and examples needs to further satisfy that: $GP>=TA_{max}+N_{TA,\ offset}*T_c+T_{UE\ DL-UL}+LBT\_time$, wherein LBT_time is the maximum time the LBT mechanism has available to assess the medium to determine if the medium is busy or idle during an observation slot, which is implementation dependent and is at most the observation slot duration; the other parameters are defined the same as in the aforementioned embodiments and examples.

In one example, for sub-7 GHz NR-U, the LBT requirement at DL to UL switching point(s) and the guard period duration GP depend on the NR-U subcarrier spacing.

In one sub-example, for sub-7 GHz NR-U with 15 kHz SCS, GP can be of 1 OFDM symbol length, and the aforementioned embodiments and examples are preferred for DL to UL switching within the COT, when $GP-\tau>=SIFS$. Specifically, for sub-7 GHz NR-U, the TA offset is 13 μs, and therefore $\tau=(13+TA)\ \mu s$, with TA denoting the timing advance value of a UE. For 15 kHz SCS NR-U, which has an average symbol duration of 71.4 μs, GP of 1 OFDM symbol length is sufficient to support a cell with coverage area of up to 6.81 km.

In addition, $GP-\tau=GP-13\ \mu s-TA$; and in order for $GP-\tau<=16\ \mu s$ needs $TA>GP-29\ \mu s$, which indicates the distance from a UE to a gNB needs to be at least 6.36 km.

Since NR-U is mainly targeting small cell scenario with less than few kilometers cell radius, most UEs may satisfy that GP−τ is much larger than 16 μs, and the third or second option can lead to high time overhead for reserving the channel. Therefore, for NR-U with 15 kHz SCS, it is more preferred for a UE to perform LBT during an observation slot at DL to UL switching point. For UEs in NR-U cells with large coverage size (e.g., more than 5 km), the second or third option may also be adopted when the corresponding time-overhead for reservation signal or extended CP is reasonable.

In one sub-example, for sub-7 GHz NR-U with 30 kHz SCS, GP can be of 1 OFDM symbol length, and the aforementioned embodiments and examples can be used for DL to UL switching within the COT, when GP−τ>=SIFS. Specifically, for 30 kHz SCS NR-U, which has an average symbol duration of 35.7 μs, GP of 1 OFDM symbol is sufficient to support a cell with coverage area of up to 1.455 km. In addition, GP−τ=GP−13−TA; and in order for GP−τ<=16 μs needs TA>GP−29 μs, which indicates the distance from a UE needs to be at least 1.005 km.

For UEs that are closer to an associated gNB than 1.005 km, option 2 and option 3 are feasible to grant UL transmission at the DL to UL switching point. In one example, for option 3, a UE can extend a CP for the next uplink transmission, such that the extra CP can be transmitted from $[t_0+16~\mu s, t_0+GP-\tau]$ (time to being the start of the guard period at a UE), wherein an extra copy of the UL data of (GP−29 μs−TA) duration is appended as the extra CP.

Since option 3 does not need an extra LBT, and can also potentially facilitate the decoding of the uplink data, it is the more preferred option for the 30 kHz SCS NR-U. By contrast, in order to use option 1, the GP needs to be GP>=$TA_{max}$+$N_{TA, offset}$*$T_c$+$T_{UE~DL-UL}$+LBT_time, this means $TA_{max}$<=0.7 μs assuming $T_{UE~DL-UL}$=13 μs and LBT_time=9 μs, which corresponds to a max cell size of 105 meters, which is too small for most NR-U application scenario. Therefore, option 1 is infeasible for most NR-U scenarios with 30 kHz SCS and GP of 1 symbol.

In another sub-example, for sub-7 GHz NR-U with 60 kHz SCS, GP can be of 2 OFDM symbols, and the aforementioned examples and embodiments are preferred for DL to UL switching within the COT, when GP−τ>=SIFS. For 60 kHz SCS NR-U, which has an average symbol duration of 17.8 μs, GP of at least 2 OFDM symbols is needed to meet the aforementioned embodiment. When the GP is of 2 OFDM symbols, the analysis may be the same as in the case of 30 kHz SCS NR-U with GP of 1 symbol, and thus option 3 is preferred for UEs and LBT for DL to UL switching is not needed.

In another sub-example, for sub-7 GHz NR-U with 60 kHz SCS, GP can be of 1 OFDM symbol. In this case, a smaller $N_{TA, offset}$ and/or $T_{UE~DL-UL}$ may be needed, such that the embodiment can be met, and LBT is not needed by the UE at the DL to UL switching point.

In another sub-example, for sub-7 GHz NR-U with 30 kHz SCS and 60 kHz SCS, the GP can be more than 1 OFDM symbol and 2 OFDM symbols respectively to support NR-U cells with large coverage size (e.g., more than 1.5 km), in which case the aforementioned embodiment and example can be used for DL to UL switching within the COT, when GP−τ>=SIFS.

In another sub-example, for sub-7 GHz NR-U, the sub-carrier spacing can be larger than 60 kHz, such as 120 kHz, and the GP can be more than 1 OFDM symbol for DL to UL switching within the COT.

In one example, a UE is required to perform LBT at the DL to UL switch point, when NR-U UE RF switching time from DL to UL is more than SIFS, irrespective of the NR-U subcarrier spacing. This is because the UE is unable to start UL transmission within SIFS duration after the end of previous DL transmission.

In one sub-example, this scenario can be applied to the above-7 GHz NR-U. For instance, NR-U at 60 GHz band has a SIFS duration of 3 μs, which is smaller the 7 μs maximum allowed UE RF switching time from DL to UL, and thus LBT is required for UEs with an RF switching time from DL to UL larger than 3 μs, which is typically the case.

In another sub-example, for above-7 GHz NR-U that needs to perform LBT at the DL to UL switching point, GP needs to satisfy that: GP>=$TA_{max}$+$N_{TA, offset}$*$T_c$+$T_{UE~DL-UL}$+LBT_time, which leads to GP>=6.67 30 7+7+5=25.67 μs assuming the max cell radius is 1 km, $T_{UE~DL-UL}$=7 μs and LBT_time=5 μs. This indicates the corresponding GP needs to be at least 2 OFDM symbols and 3 OFDM symbols respectively for above-7 GHz NR-U with 60 kHz SCS and 120 kHz SCS respectively.

In one embodiment, for UL to DL switching during a COT, if the gap duration between the start of the assigned downlink transmission and the end of previous uplink transmission is less than SIFS duration from the gNB perspective (i.e., $N_{TA, offset}$*$T_c$<SIFS), then no LBT is needed for a gNB to start the DL transmission; while if the gap duration between the start of the assigned downlink transmission and the end of previous uplink transmission is at least SIFS duration from the gNB perspective (i.e., $N_{TA, offset}$*$T_c$>=SIFS), then at least one of the following options can be adopted by an NR-U gNB for the UL to DL switching.

In a first option, a gNB can perform LBT during an observation slot within a period of PIFS duration ending before the assigned start of DL transmission. In one example of this option, the start time to perform the LBT is within [max($t_1$, $t_1$+$N_{TA, offset}$*$T_c$-PIFS), $t_1$+$N_{TA, offset}$*$T_c$-observation slot], wherein $t_1$ refers to the end of UL reception at the gNB, as illustrated in FIG. 34.

In a second option, a gNB can transmit a reservation signal starting at time instance t, which is within [$t_1$+$T_{gNB~UL-DL}$, $t_1$+SIFS]; and end at $t_1$+$N_{TA, offset}$*$T_c$, wherein $t_1$ refers to the end of UL reception at the gNB, as illustrated in FIG. 8; in this case the LBT is not required by the gNB. This option needs SIFS to be no smaller than $T_{gNB~UL-DL}$, i.e., the gNB UL (reception) to DL (transmission) RF switching time.

In a third option, a gNB can extend a cyclic prefix (CP) of the next uplink transmission, such that the extended CP can be transmitted from [$t_1$+t, $t_1$+$N_{TA, offset}$*$T_c$], with t within [$T_{gNB~UL-DL}$, SIFS] and $t_1$ refers to the end of UL reception at the gNB, as illustrated in FIG. 8. In this case, the LBT is not required by the gNB for next downlink transmission. This option needs SIFS to be no smaller than $T_{gNB~UL-DL}$, i.e., the gNB UL to DL RF switching time.

In a fourth option, a gNB can use a no-LBT option subject to regulation allowance and restrictions.

In one example, for sub-7 GHz NR-U, the observation slot duration can be 9 μs, SIFS duration can be 16 μs, and the PIFS duration can be 25 μs. In another example of the second approach in this embodiment, for above-7 GHz NR-U, the observation slot duration can be 5 μs, SIFS duration can be 3 μs, and the PIFS duration can be 8 μs.

In one example, the same value of NTA, offset from TDD NR can be applied to incorporate the UL to DL switching time for NR-U, which can be 13 μs for sub-7 GHz NR-U, and 7 μs for above-7 GHz NR-U.

In one example, if the UL to DL switching during a COT is part of the DL-UL-DL switching, then the LBT requirement at the UL to DL switching may also follow the aforementioned examples and embodiments.

In one example, if LBT is needed by the gNB for UL to DL switching, then the guard period for UL to DL switch needs be at least $T_{gNB\ UL-DL}$+LBT_time, wherein LBT_time is the maximum time the LBT mechanism has available to assess the medium to determine if the medium is busy or idle during an observation slot, which is implementation dependent and is at most the observation slot duration; and $T_{gNB\ UL-DL}$ is the gNB UL reception to DL transmission RF switching time.

In one example, for sub-7 GHz NR-U, a gNB does not need to perform LBT when switching from UL to DL, irrespective of the subcarrier spacing. This is because for sub-7 GHz NR-U, the guard period for UL to DL switching is contained within $N_{TA,\ offset}*T_c$, which is 13 μs and is always smaller than the SIFS duration of 16 μs for sub-7 GHz unlicensed bands.

In one example, for above-7 GHz NR-U, if the same value of $N_{TA,\ offset}$ from NR is used for NR-U, then the gap duration between the start of the assigned downlink transmission and the end of previous uplink transmission is larger than the SIFS duration. This is because for above-7 GHz NR-U, the guard period for UL to DL switching is 7 μs, which is larger than the SIFS duration for above-7 GHz unlicensed bands, i.e., 3 μs for 60 GHz unlicensed bands.

In one sub-example, if the gNB RF switching time from UL to DL satisfy that $T_{gNB\ UL-DL}$<SIFS, then the second option or the third option can be utilized, such that no LBT is needed by a gNB for UL to DL switching. In another sub-example, if the gNB RF switching time from UL to DL satisfies that $T_{gNB\ UL-DL}$>=SIFS and that $N_{TA,\ offset}*T_c$>=$T_{gNB\ UL-DL}$+LBT_time, then LBT can be performed by the gNB during an observation slot within the guard period $N_{TA,\ offset}*T_c$ for UL to DL switching.

In one example, for above-7 GHz NR-U, if a gNB RF switching time from UL to DL satisfies that $T_{gNB\ UL-DL}$>=SIFS and that $T_{gNB\ UL-DL}$±LBT_time>7 μs, then LBT needs to be performed by the gNB during an observation slot within the guard period allocated for UL to DL switching, and at least one of the following options for the duration of the guard period for UL to DL switching can be adopted:

In a first option of this example (e.g., Option 1), a larger value of $N_{TA,\ offset}$ than that of NR can be adopted for above-7 GHz NR-U, such that $N_{TA,\ offset}*T_c$ is enough for RF switching from UL to DL and the LBT operation for a gNB, i.e., $N_{TA,\ offset}*T_c$>=$T_{gNB\ UL-DL}$+LBT_time. Note this also affects the GP, which is the total allocated guard period for both DL to UL and UL to DL guards, such that GP needs to satisfy that GP>=$TA_{max}$+$T_{gNB\ UL-DL}$+$N_{TA,\ offset}*T_c$>=$TA_{max}$+$T_{gNB\ UL-DL}$+LBT_time+$T_{UE\ DL-UL}$.

In a second option of this example (e.g., Option 2), a gNB can extend the guard period allocated for UL to DL switching (or equivalently postpone the start of assigned DL transmission), such that it is enough for RF switching from UL to DL and the LBT operation for the gNB. In addition, the gNB can align the end of this guard period to the NR-U OFDM symbol or mini-slot boundary. Note this option does not require changing the value of $N_{TA,\ offset}$ from NR.

In one embodiment, when LBT is needed at the DL to UL switching point or UL to DL switching point, the number of LBT attempt(s) that is allowed to grant the UL transmission or the DL transmission respectively within the current COT can be either predefined in the spec or configurable.

In one example, the maximum number of allowed LBT attempt(s) can be predefined in the spec as a fixed number, such as N (N>=1). In one sub-example, N can be 1, which means at most 1 LBT attempt can be allowed, and the UL data or DL data may not be transmitted if the LBT fails. In another sub-example, N can be infinity, which means there is not an upper limit to the number of LBT attempts.

In another example, the maximum number of allowed LBT attempt(s) can be scalable and non-decreasing with the duration of the assigned UL transmission for DL to UL transmission, or the assigned DL transmission for the UL to DL transmission. In one sub-example, if the desired duration of the assigned UL or DL transmission is T, then the maximum number of allowed LBT attempts can be min(ceil(T/$t_0$), M), wherein M>=1 is the maximum allowed LBT attempts which can be infinity, and to can refer to sometime interval such as one NR-U OFDM symbol duration, one NR-U mini-slot duration (2/4/7 OFDM symbols), one NR-U slot duration, or any other arbitrary number of NR-U symbols duration.

For instance, if the desired duration of the assigned UL transmission at DL to UL switching point is one symbol (e.g., for HARQ-ACK in self-contained slot), and $t_0$ is one NR-U slot, then the max number of LBT attempts is 1. In another instance, if the desired duration of the assigned UL or DL transmission is 10 NR-U slots, and $t_0$ is one NR-U slot, then the maximum number of allowed LBT attempts can be 10.

In another example, the maximum number of allowed LBT attempt(s) at the DL to UL switching point or UL to DL switching point can be scalable with the COT duration, and/or the packet duration for the UL transmission or DL transmission respectively. In one sub-example, the COT duration can be referred to as the entire duration of the current COT; or the COT duration can be referred to as the remaining duration of the current COT. In another sub-example, subject to a maximum number of LBT attempts which can be predefined in the spec, the number of LBT attempts can have no limit as long as the corresponding UL transmission (for DL to UL switching) or DL transmission (for UL to DL switching) can start within the COT. In another sub-example, subject to a maximum number of LBT attempts which can be predefined in the spec, the number of LBT attempts can have no limit as long as the corresponding UL transmission (for DL to UL switching) or DL transmission (for UL to DL switching) can be entirely contained within the COT.

In another example, a time interval for adjacent LBT attempts can be configured at the DL/UL switching points; wherein if the current LBT attempt fails, the starting time for the next LBT attempt can follow one of the following options: (1) if the single-shot LBT of PIFS duration fails, the next LBT attempts can start immediately in the next PIFS duration; this option means the interval between two adjacent LBT attempts can be PIFS (i.e., 25 μs in 5 GHz band and 8 μs in 60 GHz band); (2) the next LBT can start after certain interval from the start of the previous LBT attempt, which can be an NR-U OFDM symbol duration, or one NR-U mini-slot duration (2/4/7 OFDM symbols), or one NR-U slot duration, or any other arbitrary number of NR-U symbols duration.

In one sub-example, the maximum allowed number of LBT switching points can be correspondingly determined as the min(ceil(T/$t_0$), M), wherein T can be the desired duration of the assigned UL or DL transmission, or the remaining COT duration, or the minimum of the desired duration of the assigned UL or DL transmission and the remaining COT duration; to is the time interval for adjacent LBT attempts; and M>=1 is the maximum allowed LBT attempts by the spec, wherein M can be infinity, in which case there is no cap for the number of LBT attempts by the spec. For instance, if the first option in this example is used, this means as long as the number of LBT attempts does not exceed the maximum value allowed by the spec (i.e., M in the sub-example), there is no limit on the number of LBT attempts.

In another example, a starting time for adjacent LBT attempts can be configured at the DL/UL switching points; wherein if the current LBT attempt fails, the starting time for the next LBT attempt can be immediately before the NR-U OFDM symbol/NR-U mini-slot/NR-U slot/ms boundary, such that the transmission after DL/UL switching can start at NR-U OFDM symbol/NR-U mini-slot/NR-U slot/ms boundary if LBT passes.

In another example, if all the allowed LBT attempt within current COT fails for the assigned UL transmission at the DL to UL switching point, or the assigned DL transmission at the UL to DL switching point, a UE or a gNB respectively can attempt CAT-4 LBT like LBT outside the current COT for the assigned UL transmission or DL transmission. In one sub-example, the COT associated with new CAT-4 LBT can be adjusted (either longer, shorter, or remain the same as the previous COT) to contain the assigned UL transmission or DL transmission. This can be up to network implementation to determine the COT.

In another example, if all the allowed LBT attempt within current COT fails for the assigned UL transmission at the DL to UL switching point, or the assigned DL transmission at the UL to DL switching point, a UE or a gNB can discard the assigned UL data or DL data respectively.

In another example, if the assigned UL transmission (or assigned DL transmission) at the DL to UL switching point (or UL to DL switching point) is not finished within the remaining COT, the UE (or a gNB) can attempt CAT-4 LBT like LBT outside the current COT to transmit the remaining UL transmission (or DL transmission). In one sub-example, the COT associated with new CAT-4 LBT can be adjusted (either longer, shorter, or remain the same as the previous COT) to contain the remaining UL transmission or DL transmission. This can be up to network implementation to determine the COT.

In another example, if the assigned UL transmission (or assigned DL transmission) at the DL to UL switching point (or UL to DL switching point) is not finished within the remaining COT, the UE (or a gNB) can discard the remaining UL transmission (or DL transmission).

Extend 5G NR into the unlicensed spectrum is an important component of the Rel-16 NR. One of the candidate unlicensed spectrum is the 5 GHz unlicensed band, wherein the IEEE 802.11-based Wi-Fi system operates at. The OFDM-based IEEE 802.11 systems, including the OFDM PHY (i.e., 802.11a), the high-throughput (HT) PHY (i.e., 802.11n), the very high throughput (VHT) PHY (i.e., 802.11ac), have defined the preamble that is appended to the start of a packet, based on which synchronization can be achieved.

Figure 36:
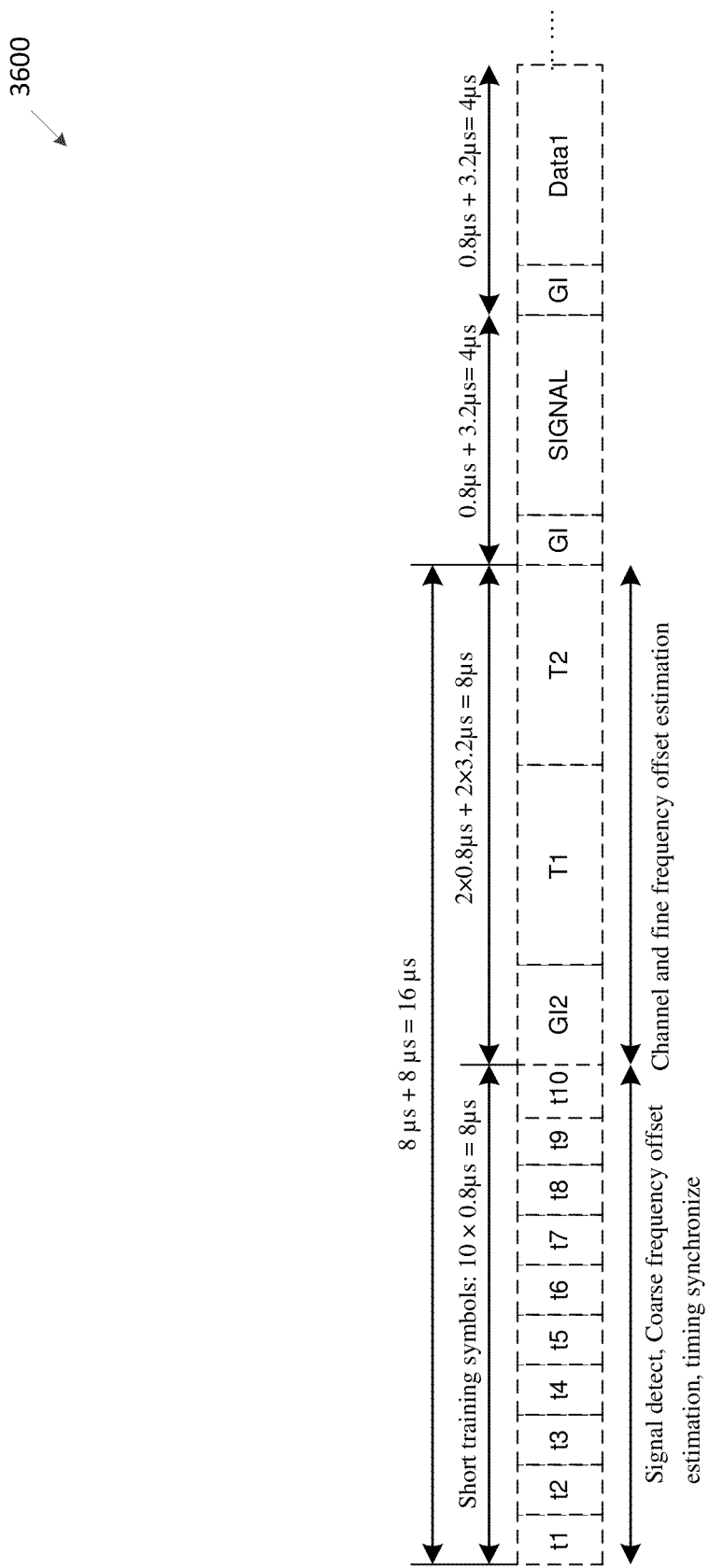
FIG. 36 illustrates an example preamble structure according to embodiments of the present disclosure.

FIG. 36 illustrates an example preamble structure 3600 according to embodiments of the present disclosure. The embodiment of the preamble structure 3600 illustrated in FIG. 36 is for illustration only. FIG. 36 does not limit the scope of this disclosure to any particular implementation.

FIG. 36 illustrates the preamble structure of 802.11a, which consists of 10 short training symbols of 0.8 μs each, which is used for coarse time and frequency synchronization, and preamble detection for identifying the arrival of a packet. Two long training symbols come after the short training symbols with 3.2 μs each, which are used for fine timing synchronization and channel estimation. The total length of the preamble is 16 μs, which is followed by the SIGNAL field and actual data field(s). The HT and VHT 802.11 systems either directly use the legacy preamble structure from 802.11a or have "green-field" preamble but with the same 10 repetitions of 0.8 μs period short training symbols.

For the short preamble symbols of the 802.11 preamble, the repetition of 0.8 μs is achieved by only allowing OFDM subcarriers with indices that are a multiple of 4 to have non-zero amplitude, which results in a periodicity of 0.8 μs given the IFFT/FFT period of 3.2 μs and subcarrier spacing of 312.5 kHz (i.e., 20 MHz/64) for the 802.11 system. The IEEE 802.11 preambles as illustrated in FIG. 36 can be detected through auto-correlation based algorithms by utilizing the repeated short training symbols structure, or through cross-correlation based algorithms by utilizing the known short or long training sequence as the local reference signal.

If the 802.11 preamble portion is present in an OFDM transmission, and the 802.11 preamble portion is received at a receive level equal to or greater than the receiver minimum input level sensitivity (which is also referred to as PDT, e.g., −82 dBm for 20 MHz channel), the Wi-Fi device may indicate the clear channel assessment (CCA) as busy with a probability >90% within 4 μs. This mechanism can be referred to as preamble detection (PD). If the 802.11 preamble is absent, the Wi-Fi device may indicate CCA as busy for any signal 20 dB above the receiver minimum input level sensitivity (which is also referred to as EDT, e.g., −62 dBm for 20 MHz channel). This mechanism can be referred to as energy detection (ED).

Without the introduction of Wi-Fi preamble to a NR system, a Wi-Fi system can only detect the existence of NR in unlicensed system through the energy detection mechanism, which can have negative impacts on the SINR and rate performance for Wi-Fi due to the much higher ED threshold (EDT) compared to PD threshold (PDT). By contrast, if NR unlicensed system (NR-U) supports to transmit the 802.11-like preamble that is also detectable by Wi-Fi, the preamble detection mechanism can be used instead of the energy detection mechanism for NR-U and Wi-Fi coexistence, which can have the benefits of improved coexistence between NR-U and Wi-Fi, better SINR and rate performance for Wi-Fi and NR-U, reduced Wi-Fi power consumption, etc.

The present disclosure provides the common preamble design of NR-U that can be detected by both NR-U and Wi-Fi, including the potential changes to the NR-U channel access procedure, sequence design, and time/frequency resource for this common preamble of NR-U and Wi-Fi.

In one embodiment, channel access procedure with common preamble for NR-U and Wi-Fi is provided.

In one embodiment, the potential changes to specifications is included in the channel access procedure, when NR-U supports a common preamble for NR-U and Wi-Fi.

In one example, the common preamble for NR-U and Wi-Fi refers to the preamble for NR-U that can be detected by the NR-U device, as well as the Wi-Fi device through existing Wi-Fi preamble detection algorithms.

In one example, the Wi-Fi receiver can detect the existence of the common preamble through auto-correlation-based algorithms or cross-correlation based algorithms.

In another example, in order for the Wi-Fi receiver to correctly detect the common preamble, the NR-U channel allocation can choose from the set of valid operating channel numbers defined by regional unlicensed regulations for corresponding unlicensed band.

In one sub-example, for 5 GHz unlicensed band, this means the NR-U channel bandwidth is integer multiple of 20 MHz, with each 20 MHz sub-band following the valid channel center frequencies allowed by regulatory domain. In addition, the common preamble can be transmitted over one or multiple of such 20 MHz sub-bands.

In another example, with the support of common preamble for NR-U and Wi-Fi, carrier sense clear channel assessment (CS/CCA) mechanism (or preamble detection mechanism) can be utilized by Wi-Fi in addition to energy detection in detecting the NR-U preamble. The preamble detection threshold for Wi-Fi device in detecting the NR-U common preamble can be the minimum modulation and coding rate sensitivity of Wi-Fi that corresponds to the channel bandwidth, wherein 802.11a device can perform preamble detection with −82 dBm threshold at 20 MHz channel; 802.11n device can perform preamble detection with −82 dBm threshold at 20 MHz channel or −79 dBm threshold at 40 MHz channel; 802.11ac device can perform preamble detection with −82 dBm threshold at the primary 20 MHz channel.

Figure 37A:
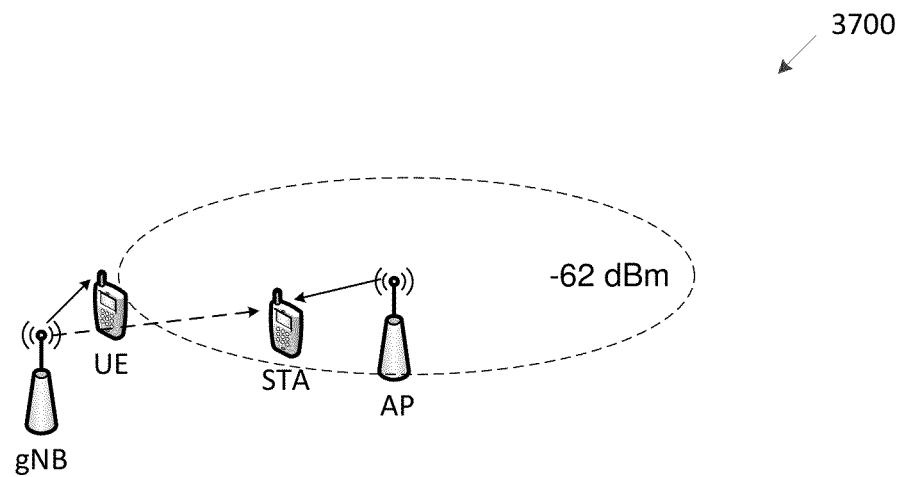
FIG. 37A illustrates an example determination of channel availability according to embodiments of the present disclosure.

FIG. 37A illustrates an example determination of channel availability 3700 according to embodiments of the present disclosure. The embodiment of the determination of channel availability 3700 illustrated in FIG. 37A is for illustration only. FIG. 37A does not limit the scope of this disclosure to any particular implementation.

Figure 37B:
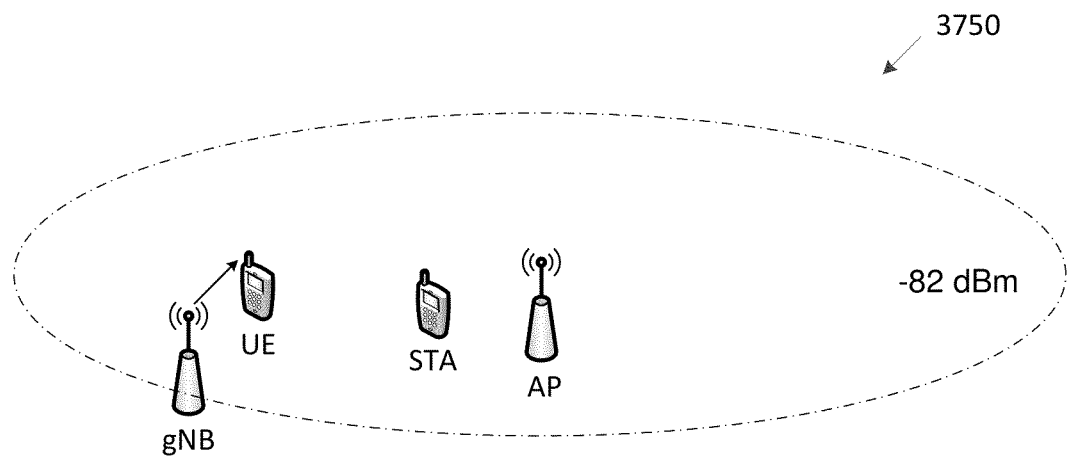
FIG. 37B illustrates another example determination of channel availability according to embodiments of the present disclosure.

FIG. 37B illustrates another example determination of channel availability 3750 according to embodiments of the present disclosure. The embodiment of the determination of channel availability 3750 illustrated in FIG. 37B is for illustration only. FIG. 37B does not limit the scope of this disclosure to any particular implementation.

FIGS. 37A and 37B provide an illustration of this example, wherein a Wi-Fi AP is performing CCA to determine channel availability while an NR-U gNB starts transmission after passing the CCA. In FIG. 37A, NR-U does not support the common preamble, and Wi-Fi AP determines channel as available since AP received power from the gNB is below −62 dBm; in FIG. 37B, NR-U first transmits the common preamble, and Wi-Fi detects the existence common preamble through the preamble detection mechanism.

As a result, the Wi-Fi station (STA) in FIG. 37A may have low SINR due to the strong interference from the gNB, which may significantly lower the rate or cause retransmissions for Wi-Fi AP. By contrast, the preamble detection mechanism in FIG. 37B can facilitate Wi-Fi to avoid transmissions from Wi-Fi AP to STA with low SINR and save power.

In another example, with the support of NR-U common preamble, carrier sense clear channel assessment (CS/CCA) mechanism (or preamble detection mechanism) can be utilized by NR-U as the supported channel access procedures.

In one sub-example, with the CS/CCA mechanism for NR-U, the channel is considered as busy by an NR-U device if any NR-U common preamble is detected and the corresponding received power of the detected preamble at the NR-U device exceeds the CS/CCA detection threshold or preamble detection threshold (PDT) within a certain channel sensing duration.

In another sub-example, due to similar structure of NR-U common preamble and existing Wi-Fi preamble at least in the time-domain, NR-U device may also optionally be implemented to have the capability to detect Wi-Fi preambles through auto-correlation or cross-correlation based detection algorithms.

In another sub-example, the PDT for NR-U common preamble by NR-U, and the PDT for Wi-Fi preamble by NR-U if NR-U device is able to detect Wi-Fi preamble, can be chosen the same as the Wi-Fi preamble detection threshold for corresponding bandwidth, which can be −82 dBm at 20 MHz channel or −79 dBm threshold at 40 MHz channel.

In another example, NR-U can utilize the CS/CCA mechanism in combination with the energy detection mechanism, such that within a certain channel sensing duration, the observation channel is considered as busy by an NR-U device according to one of the following sub-examples; wherein the preamble refers to the NR-U common preamble, or both NR-U common preamble and Wi-Fi preamble if NR-U device is able to detect Wi-Fi preamble as well.

In one sub-example, the channel is considered as busy if the total energy received in the observation channel exceeds energy detection threshold.

In one sub-example, the channel is considered as busy if the total energy received in the observation channel exceeds energy detection threshold AND any preamble that exceeds the PDT is detected.

In one sub-example, the channel is considered as busy if the total energy received in the observation channel exceeds energy detection threshold OR any preamble that exceeds the PDT is detected.

In one sub-example, the channel is considered as busy any preamble that exceeds the PDT is detected.

In another sub-example, the energy detection threshold (EDT) for NR-U when NR-U supports the common preamble, can be chosen to be the same as that of Wi-Fi preamble detection threshold for corresponding bandwidth. For instance, the EDT can be −62 dBm at 20 MHz channel or −59 dBm threshold at 40 MHz channel.

In another sub-example, the above rules in determining if an observation channel is busy can be used by the single-shot LBT procedure, wherein the channel sensing duration is the PIFS duration in the unlicensed band (e.g., 25 μs in 5 GHz unlicensed band).

In another sub-example, the above rules in determining if an observation channel is busy can be used by the CAT-4 LBT procedure, wherein the channel sensing duration in decrementing the backoff counter can be the of an observation slot (e.g., 9 μs in 5 GHz unlicensed band). In another sub-example, NR-U can utilize one of the rules in determining if an observation channel is busy by default, which can also be configurable through higher layer parameter.

In another example, the applicable unlicensed band for enabling the NR-U to support a common preamble can include the 5 GHz unlicensed band, and/or 6 GHz unlicensed band, and/or unlicensed bands in FR2 (e.g., 60 GHz band).

In one embodiment, designs for common preamble of NR-U is provided.

In one embodiment, the NR-U preamble can directly reuse Wi-Fi preamble design and follow the Wi-Fi 802.11 OFDM timing-related parameters.

In one example, the NR-U preamble can follow the 802.11a training sequence, wherein the subcarrier spacing is 312.5 kHz for 802.11 system, with the FFT/IFFT size for 20 MHz channel being 64, among which the total number of subcarriers is 52 (48 data carriers and 4 pilot subcarriers). The short OFDM training symbol consists of only 12 subcarriers out of 52 subcarriers, and subcarriers with indices of multiple of 4 have non-zero amplitude; while the long training sequence consists of 53 subcarriers (including a zeros value at DC subcarrier). The details of the sequences are provided in LTE and NR specification, with an illustration of the 802.11a preamble provided in FIG. 36.

In one sub-example, the NR-U common preamble can only consist of the short training symbols part of 802.11a preamble with 10×0.8 µs duration, which can be detected by the neighboring Wi-Fi devices.

In another sub-example, the NR-U common preamble can consist of both the short training symbols and long training symbols of 802.11a preamble with 8+8 µs duration.

In another sub-example, the NR-U common preamble can consist of the short training symbols, the long training symbols of 802.11a preamble, and the SIG field of the 802.11a preamble with 8+8+4 µs duration.

In another sub-example, this example can be used for NR-U in the 5 GHz unlicensed band.

In another sub-example, this example can be used for NR-U in the 6 GHz unlicensed band.

In another example, the NR-U preamble can follow the non-HT short training field (i.e., L-STF), or both the L-STF and the non-HT long training field (L-LTF) of the 802.11n HT and 802.11ac VHT system. In particular, the L-STF and L-LTF bandwidth can be 20 MHz, 40 MHz, 80 MHz, 160 MHz, or 80 MHz+80 MHz (i.e., aggregation of 2 non-contiguous 80 MHz channel). The duration for L-STF is 10×0.8 µs=8 µs, while the duration for L-LTF is also 8 µs as in 802.11a.

In another sub-example, this example can be used for NR-U in the 5 GHz unlicensed band.

In another sub-example, this example can be used for NR-U in the 6 GHz unlicensed band.

In another example, the NR-U preamble can follow the HT-Greenfield short training field (HT-GF-STF) of the 802.11n HT system. In particular, the HT-GF-STF bandwidth can be 20 MHz or 40 MHz, and the duration for HT-GF-STF is 10×0.8 µs=8 µs.

In another sub-example, this example can be used for NR-U in the 5 GHz unlicensed band.

In another sub-example, this example can be used for NR-U in the 6 GHz unlicensed band.

In another example, the NR-U preamble can follow the highly efficient (HE) part of the preamble of 802.11ax HE system.

In one sub-example, this example can be used for NR-U in the 5 GHz unlicensed band.

In one sub-example, this example can be used for NR-U in the 6 GHz unlicensed band.

In another example, in order to for NR-U to directly reuse the Wi-Fi preamble sequence, the NR-U device needs to support the Wi-Fi 802.11 transmitter block processing for generating the Wi-Fi preamble sequence (e.g., subcarrier spacing of 312.5 kHz and FFT size of 64 over 20/40 MHz channel), either through the existing NR-U RF module or supporting a separate RF module for Wi-Fi processing at the NR-U device.

In addition to the supported preamble sequence, another important design consideration is time position to transmit such NR-U common preamble that reuses Wi-Fi preamble.

In one example, the NR-U common preamble can be transmitted after the LBT is successfully completed plus some additional processing time $\tau$. The processing time $\tau$ takes into consideration the processing time for NR-U transmitter to switch from LBT to transmit NR-U preamble using Wi-Fi timing-related parameters; or the time for NR-U transmitter to switch to transmit using the Wi-Fi RF module (if supported); which can be implementation dependent. Denote by T the NR-U OFDM symbol duration, t (0<=t<=7) the time instance of LBT completion with respect to the start of the NR-U OFDM symbol that contains this time instance, $T_{pre}$ the NR-U preamble duration, and $\tau_2$ the additional processing time for NR-U transmitter to switch from transmitting the preamble to transmitting NR-U signal/channel (e.g., PDCCH/PDSCH).

Figure 38A:
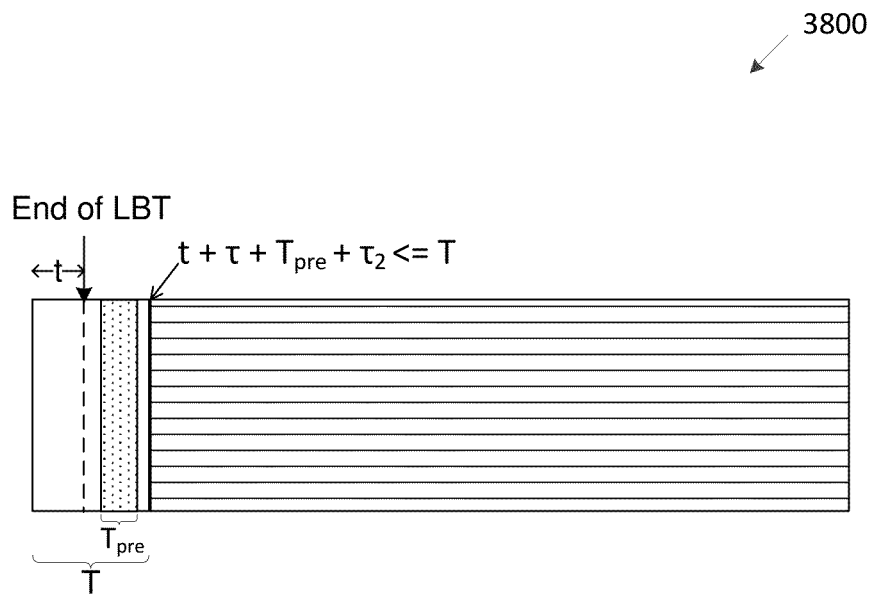
FIG. 38A illustrates an example NRU-U preamble transmission according to embodiments of the present disclosure.

FIG. 38A illustrates an example NRU-U preamble transmission 3800 according to embodiments of the present disclosure. The embodiment of the NRU-U preamble transmission 3800 illustrated in FIG. 38A is for illustration only. FIG. 38A does not limit the scope of this disclosure to any particular implementation.

Figure 38B:
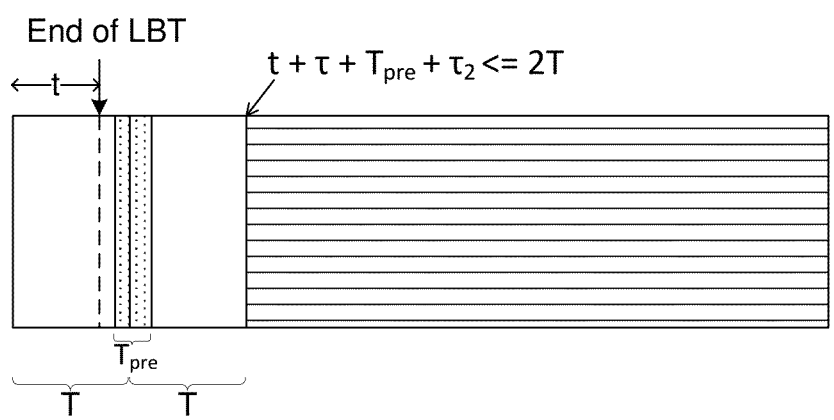
FIG. 38B illustrates an example NRU-U preamble transmission according to embodiments of the present disclosure.

FIG. 38B illustrates an example NRU-U preamble transmission 3850 according to embodiments of the present disclosure. The embodiment of the NRU-U preamble transmission 3850 illustrated in FIG. 38B is for illustration only. FIG. 38B does not limit the scope of this disclosure to any particular implementation.

In one sub-example, an NR-U preamble can be transmitted within the same NR-U OFDM symbol in which the LBT is completed, if $t+\tau+T_{pre}+\tau_2<=T$. FIG. 38A provides an illustration of this sub-example.

In another sub-example, if $t+\tau+T_{pre}+\tau_2>T$, the NR-U preamble can either be transmitted across two NR-U OFDM symbols or transmitted within the NR-U OFDM symbol that comes after the NR-U OFDM symbol in which LBT is completed. Since the duration of the NR-U preamble in this approach is either 8 µs or 16 µs, higher NR-U subcarrier spacing such as 60 kHz or 30 kHz is more suitable in supporting this sub-example, which can avoid or reduce the chance for a gap larger than 25 µs between the end of NR-U preamble and the start of next NR-U transmission within the COT. FIG. 38B provides an illustration of this sub-example.

In another sub-example, the earliest NR-U OFDM symbol within the COT wherein the NR-U transmitter can start to transmit NR-U signal/channel (e.g., PDCCH/PDSCH), is the earliest NR-U OFDM symbol that comes after time instance $t+\tau+T_{pre}+\tau_2$ starting at the start of NR-U OFDM symbol wherein LBT is completed. FIG. 38A and 38B provide illustrations of this sub-example.

In one embodiment, the NR-U common preamble can be transmitted through NR-U resource grid, such that the continuous-time OFDM baseband signal for the common preamble can have a periodic repetition pattern that can be detected by NR-U receiver, as well as the Wi-Fi receiver.

In one example, the period of the repetition pattern for NR-U common preamble can be close to the 0.8 µs period of 802.11 short training symbol, with a difference less than the 0.05 µs sample duration of Wi-Fi 802.11 system. This can be referred to as the short NR-U common preamble.

In one sub-example, with such repetition pattern for NR-U common preamble, the NR-U device can detect the existence of NR-U common preamble through either auto-correlation based algorithms or cross-correlation based algorithms.

In another sub-example, with such repetition pattern for NR-U common preamble, the Wi-Fi device can detect the existence of NR-U common preamble at least through auto-correlation based algorithms.

In one example, the NR-U common preamble can further include a longer preamble sequence with a repetition pattern with a periodicity close to the 3.2 µs period of 802.11 long training symbol, with a difference less than one or few of the 0.05 μs sample duration of 802.11 system. This can be referred to as the long NR-U common preamble.

In one example, the repetition pattern for NR-U common preamble can be achieved by having the periodicity of $1/(\Delta f \times \delta)$, wherein $\Delta f$ is the subcarrier spacing of the preamble which shares the subcarrier spacing of NR-U; and $\delta$ is an integer parameter such that the common NR-U preamble sequence can potentially have non-zero amplitudes on NR-U subcarriers within the resource grid with indices $i \times \delta + N_{grid,x}^{size,\mu} N_{SC}^{RB}/2 - k_0^\mu$ and zero amplitude otherwise; wherein i is an integer, $N_{grid,x}^{size,\mu}$ is the resource grid size in unit of PRB, $N_{SC}^{RB}$ is number of subcarriers per PRB, and $k_0^\mu$ is defined in LTE and NR specification.

Specifically, the time-continuous OFDM baseband signal of NR-U common preamble on antenna port p and subcarrier spacing μ for OFDM symbol l is given by:

$$s_l^{(p,\mu)}(t) = \sum_{k=0}^{N_{grid,x}^{size,\mu} N_{SC}^{RB}/2 - 1} a_{k,l}^{(p,\mu)} \times \exp[j2\pi(k + k_0^\mu - N_{grid,x}^{size,\mu} N_{SC}^{RB}/2)\Delta f(t - N_{CP,l}^\mu T_c - t_{start,l}^\mu)],$$

wherein $a_{k,l}^{(p,\mu)}$ is the complex symbol of the NR-U common preamble sequence transmitted at subcarrier k and OFDM symbol l at antenna port p; $N_{CP,l}^\mu$ is the CP length in the unit of $T_c$, and $t_{start,l}^\mu$ is the start time of OFDM symbol l.

For the NR-U common preamble sequence of this example, it satisfies that $|a_{k,l}^{(p,\mu)}|=0$ for any $k \neq i \times \delta + N_{grid,x}^{size,\mu} N_{SC}^{RB}/2 - k_0^\mu$, with $i_m \leq i \leq i_M$ and $i_m = \lceil (k_0^\mu - N_{grid,x}^{size,\mu} N_{SC}^{RB}/2)/\delta \rceil$; $i_M = \lfloor (k_0^\mu + N_{grid,x}^{size,\mu} N_{SC}^{RB}/2 - 1)/\delta \rfloor$. As a result, the time-continuous OFDM baseband signal for the common NR-U preamble is given by:

$$s_l^{(p,\mu)}(t) = \sum_{i=i_m}^{i_M} a_{i \times \delta + N_{grid,x}^{size,\mu} N_{SC}^{RB}/2 - k_0^\mu, l}^{(p,\mu)} \times \exp[j2\pi i \delta \Delta f(t - N_{CP,l}^\mu T_c - t_{start,l}^\mu)],$$

which is a periodic signal that satisfies $s_l^{(p,\mu)}(t) = s_l^{(p,\mu)}(t+1/\delta\Delta f)$.

Figure 39:
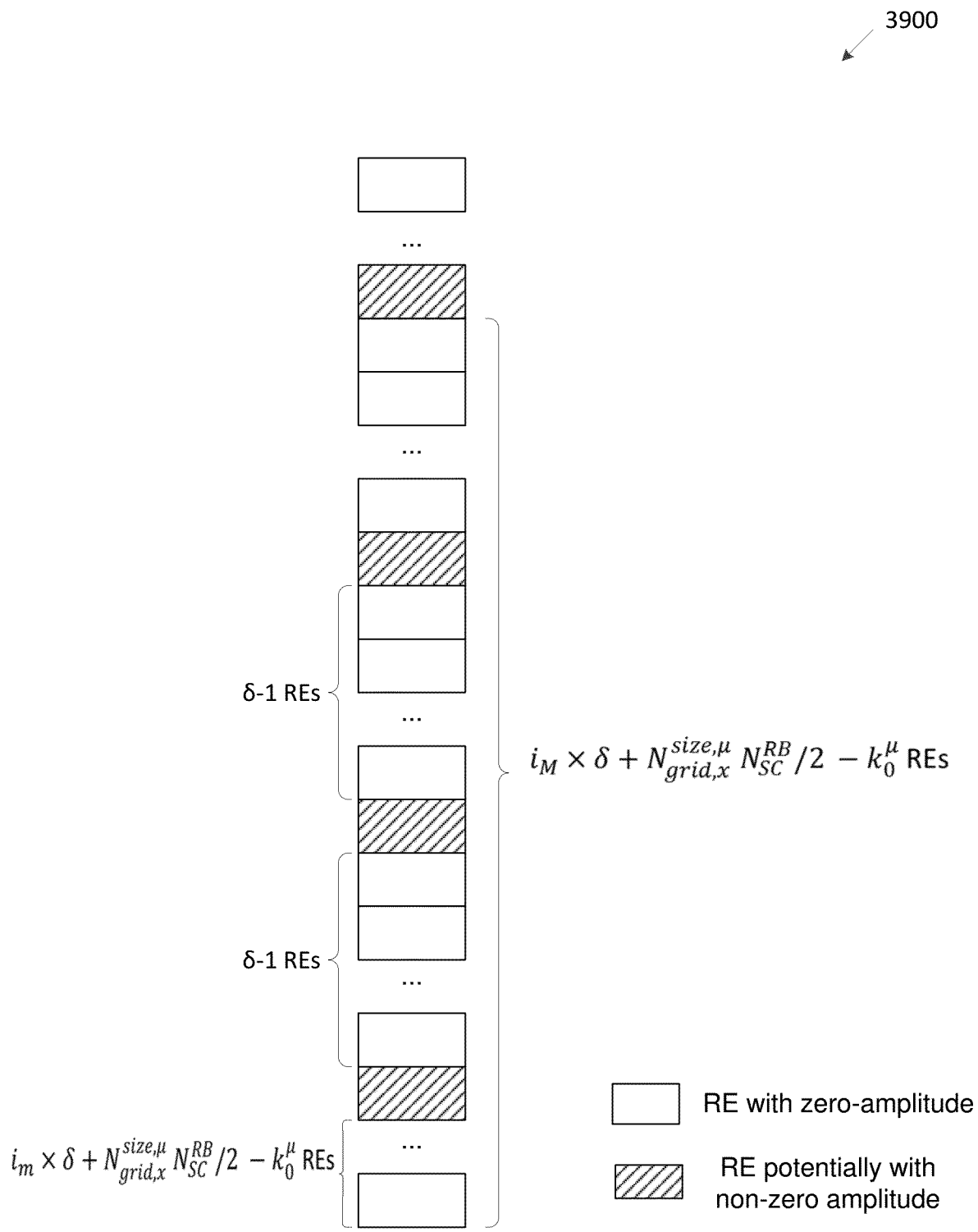
FIG. 39 illustrates an example structure of the NR-U common preamble according to embodiments of the present disclosure.

FIG. 39 illustrates an example structure of the NR-U common preamble 3900 according to embodiments of the present disclosure. The embodiment of the structure of the NR-U common preamble 3900 illustrated in FIG. 39 is for illustration only. FIG. 39 does not limit the scope of this disclosure to any particular implementation.

FIG. 39 illustrates the structure of the NR-U common preamble in this example which is transmitted at OFDM symbol l, wherein $|a_{k,l}^{(p,\mu)}|=0$ for any $k \neq i \times \delta + N_{grid,x}^{size,\mu} N_{SC}^{RB}/2 - k_0^\mu$, with $i_m \leq i \leq i_M$; while the remaining subcarriers/REs can potentially have non-zero amplitude.

In one sub-example, the short NR-U common preamble can be achieved by setting the NR-U subcarrier spacing $\Delta f$, and parameter $\delta$ as defined in this example according to one or multiple of the options as shown in TABLE 1.

In addition, for each carrier bandwidth and subcarrier spacing, the maximum length of the NR-U common preamble sequence, which corresponds to the maximum number of subcarriers that can have non-zero amplitudes, is illustrated in TABLE 2. TABLE 2 is obtained as $i_M - i_m + 1$ assuming $|a_{k,l}^{(p,\mu)}| \neq 0$ for any $k = i \times \delta + N_{grid,x}^{size,\mu} N_{SC}^{RB}/2 - k_0^\mu$, with $i_m \leq i \leq i_M$ and $k_0^\mu = 0$; the max preamble sequence length for other values of $k_0^\mu$ (e.g., 6, 12) can be obtained similarly.

TABLE 1

Parameters for NR-U common preamble

| Δf | δ | NR-U preamble periodicity (1/δΔf) |
|---|---|---|
| 15 kHz | 83 | 0.8032 μs |
| 15 kHz | 84 | 0.79365 μs |
| 30 kHz | 41 | 0.813 μs |
| 30 kHz | 42 | 0.79365 μs |
| 60 kHz | 20 | 0.8333 μs |
| 60 kHz | 21 | 0.79375 μs |

TABLE 2

Parameters for NR-U common preamble

| | Δf = 15 kHz, δ = 83 | Δf = 15 kHz, δ = 84 | Δf = 30 kHz, δ = 41 | Δf = 30 kHz, δ = 42 | Δf = 60 kHz, δ = 20 | Δf = 60 kHz, δ = 21 |
|---|---|---|---|---|---|---|
| 20 MHz | 15 | 15 | 15 | 15 | 15 | 13 |
| 40 MHz | 31 | 31 | 31 | 31 | 31 | 29 |
| 60 MHz | N/A | N/A | 47 | 47 | 47 | 45 |
| 80 MHz | N/A | N/A | 63 | 62 | 65 | 61 |
| 100 MHz | N/A | N/A | 79 | 78 | 81 | 77 |

In another sub-example, the long NR-U common preamble can be achieved through setting the NR-U subcarrier spacing $\Delta f$, and parameter $\delta$ as defined in this example according to one or multiple of the options as shown in TABLE 3.

As can be observed from TABLE 3, $(\Delta \eta, \delta) = (15 \text{ kHz}, 21)$ satisfies that the difference between the periodicity for NR-U preamble and the 3.2 μs periodicity of long training symbol for 802.11 is less than 1 802.11 OFDM sample period, while other configurations from TABLE 3 have difference larger than 1 802.11 OFDM sample period. In addition, for each carrier bandwidth and subcarrier spacing, the maximum length of the NR-U common preamble sequence, which corresponds to the maximum number of subcarriers that have non-zero amplitudes, is illustrated in TABLE 4. TABLE 4 is obtained as $i_M - i_m + 1$ assuming $|a_{k,l}^{(p,\mu)}| \neq 0$ for any $k = i \times \delta + N_{grid,x}^{size,\mu} N_{SC}^{RB}/2 - k_0^\mu$, with $i_m \leq i \leq i_M$ and $k_0^\mu = 0$; the max preamble sequence length for other values of $k_0^\mu$ (e.g., 6, 12) can be obtained similarly. Compared to the short NR-U common preamble, the sequence length for long NR-U common preamble can be much longer due to longer periodicity in the time-domain.

TABLE 3

Parameters for NR-U common preamble

| Δf | δ | NR-U preamble periodicity (1/δΔf) |
|---|---|---|
| 15 kHz | 21 | 3.1746 μs |
| 15 kHz | 20 | 3.333 μs |
| 30 kHz | 10 | 3.333 μs |
| 30 kHz | 11 | 3.0303 μs |
| 60 kHz | 5 | 3.3333 μs |

TABLE 4

Parameters for NR-U common preamble

| | Δf = 15 kHz, δ = 21 | Δf = 15 kHz, δ = 20 | Δf = 30 kHz, δ = 10 | Δf = 30 kHz, δ = 11 | Δf = 60 kHz, δ = 5 |
|---|---|---|---|---|---|
| 20 MHz | 61 | 63 | 61 | 55 | 57 |
| 40 MHz | 123 | 129 | 127 | 115 | 123 |
| 60 MHz | N/A | N/A | 195 | 177 | 189 |
| 80 MHz | N/A | N/A | 261 | 237 | 257 |
| 100 MHz | N/A | N/A | 327 | 297 | 324 |

In another sub-example, depending on the frequency resources that the NR-U common preamble is intended to transmit over with if LBT is successful, the NR-U common preamble can be mapped in frequency domain to either the entire resource grid of $N_{grid,x}^{size,\mu}$ PRBs for an NR-U carrier; or a subset of the resource grid of $N_{grid,x}^{size,\mu}$ PRBs of an NR-U carrier. For instance, the frequency resource for NR-U common preamble can be the configured BWP(s) for DL or UL transmission, while the remaining REs can have zero-amplitude in generating the OFDM signal for preamble, i.e., $|a_{k,l}^{(p,\mu)}|=0$ if NR-U common preamble is not mapped onto subcarrier k and OFDM symbol 1 at antenna port p within the common resource grid. In addition, among the frequency resources that the NR-U common preamble is mapped to, the actual frequency resource that can be utilized to transmit the NR-U common preamble may further depend on the result of LBT.

In addition to the design of the NR-U common preamble sequence pattern, another important consideration is the timing position to transmit the preamble.

In one example, the time-domain resource to transmit the NR-U common preamble sequence can be the NR-U OFDM symbol(s) that comes after the completion of a successful LBT process.

In one sub-example, if the LBT finishes in the middle of an NR-U OFDM symbol, the NR-U common preamble may be transmitted as early as the next NR-U OFDM symbol that comes after LBT.

In one sub-example, if the NR-U common preamble only includes the short NR-U preamble sequence, the NR-U common preamble can be transmitted in the first NR-U OFDM symbol that comes after the completion of a successful LBT process. An illustration of this sub-example is provided by FIGS. 40A, 40B, 40C, and 40D.

Figure 40A:
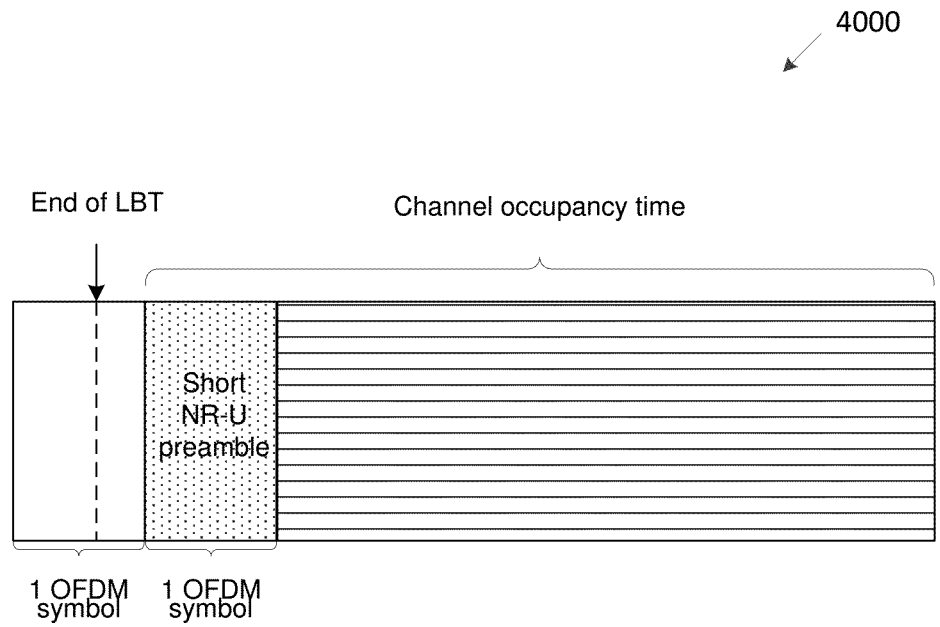
FIG. 40A illustrates an example timing position according to embodiments of the present disclosure.

FIG. 40A illustrates an example timing position 4000 according to embodiments of the present disclosure. The embodiment of the timing position 4000 illustrated in FIG. 40A is for illustration only. FIG. 40A does not limit the scope of this disclosure to any particular implementation.

Figure 40B:
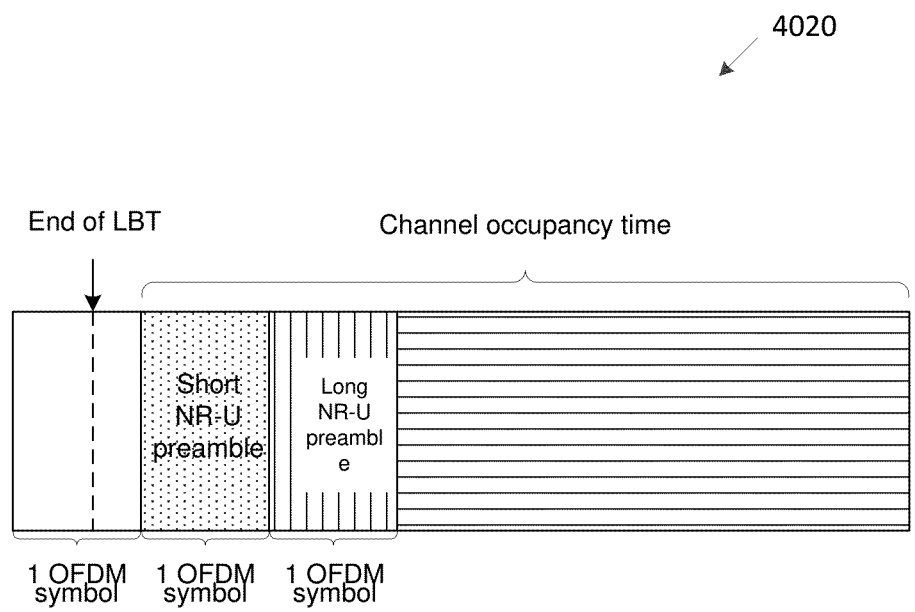
FIG. 40B illustrates another example timing position according to embodiments of the present disclosure.

FIG. 40B illustrates another example timing position 4020 according to embodiments of the present disclosure. The embodiment of the timing position 4020 illustrated in FIG. 40B is for illustration only. FIG. 40B does not limit the scope of this disclosure to any particular implementation.

Figure 40C:
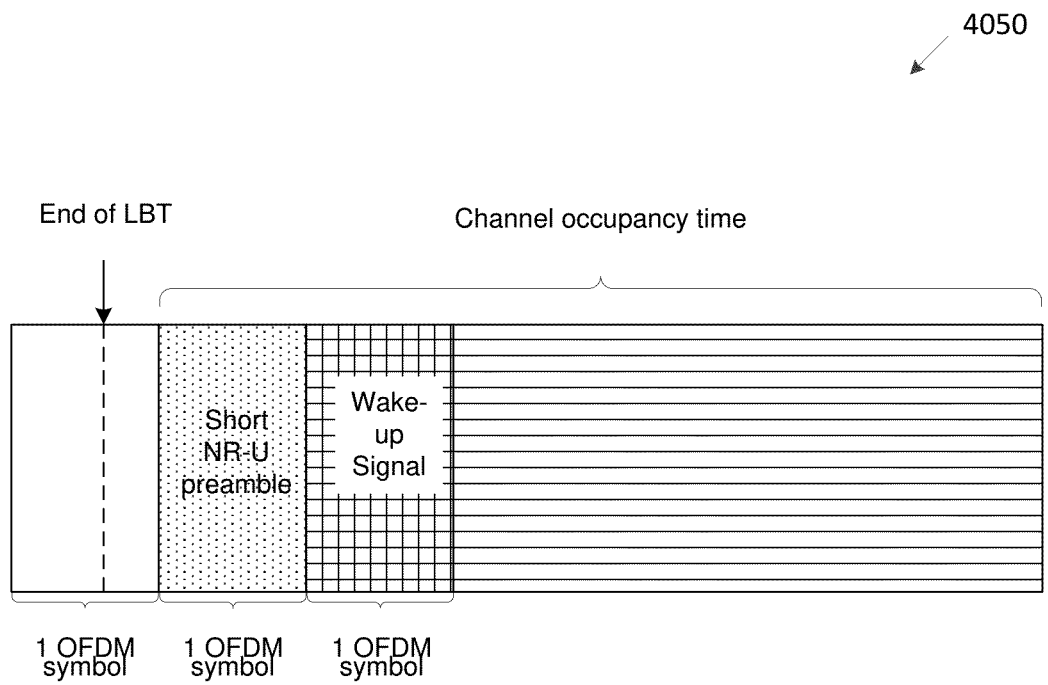
FIG. 40C illustrates yet another example timing position according to embodiments of the present disclosure.

FIG. 40C illustrates yet another example timing position 4050 according to embodiments of the present disclosure. The embodiment of the timing position 4050 illustrated in FIG. 40C is for illustration only. FIG. 40C does not limit the scope of this disclosure to any particular implementation.

Figure 40D:
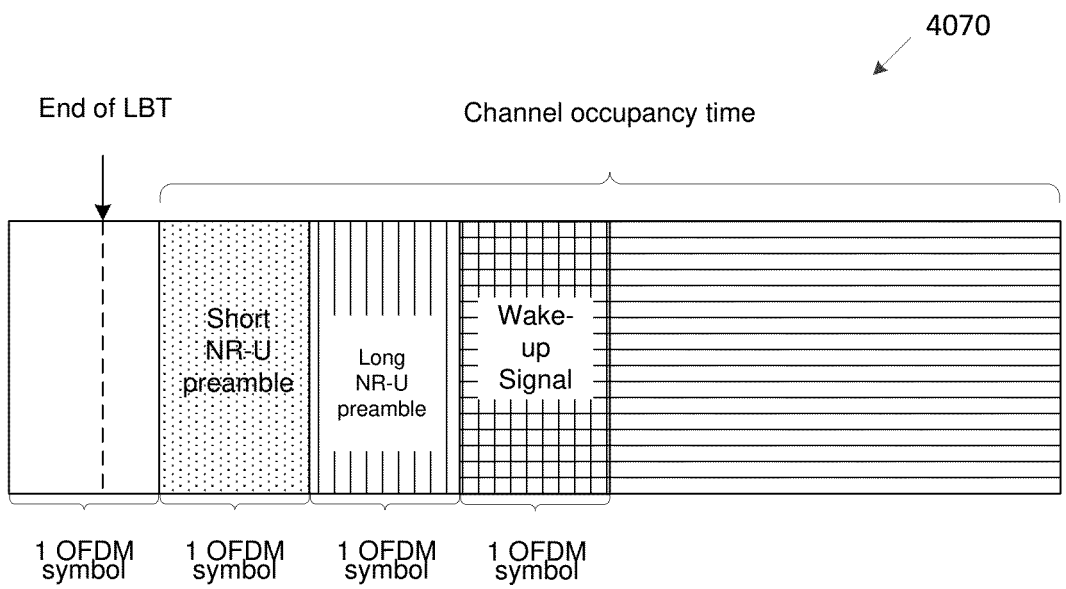
FIG. 40D illustrates yet another example timing position according to embodiments of the present disclosure.

FIG. 40D illustrates yet another example timing position 4070 according to embodiments of the present disclosure. The embodiment of the timing position 4070 illustrated in FIG. 40D is for illustration only. FIG. 40D does not limit the scope of this disclosure to any particular implementation.

In another sub-example, if the NR-U common preamble includes both the short NR-U preamble sequence and long NR-U preamble sequence, the NR-U common preamble can be transmitted in the first two NR-U symbols that come after the completion of a successful LBT process. An illustration of this sub-example is provided by FIG. 40B.

In another sub-example, the NR-U common preamble can include only the short NR-U preamble sequence, which is transmitted in the NR-U OFDM symbol that comes after the completion of a successful LBT process; while another wake-up signal (WUS) can be transmitted in the one or few OFDM symbols after the NR-U common preamble, which can carry information such as the NR-U cell-ID, a UE-group ID, COT duration information, etc. An illustration of this sub-example is provided by FIG. 40C. In one instance, the WUS can follow the NR-U frame structure and time-frequency domain resource allocation. In another instance, the WUS can be the SIG field of 802.11a.

In another sub-example, the NR-U common preamble can include the short NR-U preamble sequence and long NR-U preamble sequence, which is transmitted in the first two NR-U OFDM symbols that come after the completion of a successful LBT process; while another wake-up signal (WUS) can be transmitted in the one or few OFDM symbols after the NR-U common preamble, which can carry information such as the NR-U cell-ID, a UE-group ID, COT duration information, etc.; and the bandwidth of WUS can be same or different from the bandwidth of the preamble. An illustration of this sub-example is provided by FIG. 40D.

In one instance, the WUS can follow the NR-U frame structure and time-frequency domain resource allocation. In another instance, the WUS can be the SIG field of 802.11a.

In another sub-example, the NR-U common preamble can include in time domain a subset of all the samples of the short NR-U preamble sequence, and/or in time domain a subset of all the samples of the long NR-U preamble sequence, such that the resulting subset samples of the short/long NR-U preamble sequence has the same duration as the short/long training symbols of 802.11a (i.e., 8 μs).

In another sub-example, when the WUS is transmitted after the NR-U common preamble wherein the WUS carries information regarding the COT duration or the ending time instance of the COT, the unlicensed device that is able to detect the NR-U common preamble and decode the WUS of NR-U can determine the channel may be occupied for the duration or until the ending position indicated by WUS. For instance, this can facilitate the virtual carrier sensing for NR-U and/or Wi-Fi.

In another example, the NR-U common preamble sequence can carry the radio-access-technology (RAT) information, such that an NR-U UE upon detecting the existence of the NR-U common preamble can further determine the preamble is from NR-U rather than Wi-Fi.

This can be achieved by using cross-correlation based algorithms or through observing the frequency domain structure of the preamble by the UE. In addition, upon detecting a preamble sequence, the Wi-Fi device can also differentiate if the sequence is from NR-U or Wi-Fi using similar approaches, such that that Wi-Fi device can stop fine synchronization/channel estimation or detecting the SIGNAL field, which is beneficial in power saving.

In another example, the NR-U common preamble sequence can carry the NR-U operator information, such that NR-U receiver can identify which NR-U operator the detected NR-U common preamble belongs to.

In addition to the NR-U common preamble sequence, another design consideration is the frequency position for NR-U transmitter to transmit the NR-U common preamble sequence after a successful LBT, which may depend on the frequency-unit(s) wherein the LBT is performed and the corresponding LBT result.

In one embodiment, NR-U transmitter can transmit the NR-U common preamble sequence over all the frequency units that have passed LBT.

In one example, LBT can performed over the entire component carrier bandwidth, and the NR-U common preamble can be transmitted over the entire component carrier if LBT is passed.

In one sub-example, the component carrier bandwidth can be 20/40/60/80/100 MHz.

In another sub-example, wherein NR-U preamble reuses Wi-Fi preamble, since Wi-Fi supports bandwidth of 20 MHz (802.11a/n/ac), 40 MHz (802.11n/ac), 80 MHz (802.11ac), 80+80 MHz (802.11ac), 160 MHz (802.11ac), NR-U can support carrier bandwidth being selected as one of the options supported by Wi-Fi when the aforementioned embodiment is used, and the Wi-Fi preamble that corresponds the selected carrier bandwidth can be transmitted by the NR-U transmitter.

In another example, the frequency unit for LBT can be a bandwidth-part (BWP).

In one sub-example, NR-U transmitter can perform LBT over at least one BWPs in parallel, and the NR-U common preamble sequence can be transmitted in the BWP(s) that have successfully passed LBT.

In one sub-example, each BWP can be an integer multiple of 20 MHz.

In another sub-example, wherein NR-U preamble reuses Wi-Fi preamble, NR-U can select the BWP bandwidth to be one of the Wi-Fi supported bandwidth, i.e., 20 MHz (802.11a/n/ac), 40 MHz (802.11n/ac), 80 MHz (802.11ac), 160 MHz (802.11ac); and the Wi-Fi preamble that corresponds to the selected BWP bandwidth can be transmitted by the NR-U transmitter if LBT is passed on this BWP.

In another example, the frequency unit for LBT can be a sub-band of fixed bandwidth, and NR-U transmitter can perform LBT over multiple sub-bands in parallel, and the NR-U common preamble sequence can be transmitted in the sub-band(s) that have successfully passed LBT.

In one sub-example, each sub-band can be 20 MHz. In another sub-example, wherein NR-U preamble reuses Wi-Fi preamble, NR-U can select the sub-band bandwidth to be one of the Wi-Fi supported bandwidth, i.e., 20 MHz (802.11a/n/ac), 40 MHz (802.11n/ac), 80 MHz (802.11ac), 160 MHz (802.11ac); and the Wi-Fi preamble that corresponds to the selected sub-band bandwidth can be transmitted by the NR-U transmitter if LBT is passed on this sub-band; or for neighboring consecutive sub-bands that pass LBT and their combined bandwidth is one of the supported Wi-Fi bandwidth, the Wi-Fi preamble that corresponds to the combined sub-bands bandwidth can be transmitted by the NR-U transmitter.

In another example, this means $|a_{k,l}^{(p,\mu)}| \neq 0$ for any $k = i \times \delta + N_{grid,x}^{size,\mu} N_{SC}^{RB}/2 - k_0^{\mu}$, with $i_m \leq i \leq i_M$ and subcarrier k belongs the frequency unit that passes LBT.

In another example, through the frequency unit(s) wherein the NR-U preamble is detected, the NR-U receiver can derive the frequency position(s) that the NR-U transmitter passes LBT.

In another sub-example, this example can be applied by the UE to down-select from configured BWPs (e.g., the successful detection of a NR-U preamble is treated as an indicator of the availability of the corresponding configured BWP), or the sub-bands within the configured BWPs (e.g., the successful detection of a NR-U preamble is treated as an indicator of the availability of the corresponding sub-band within the configured BWP), for PDCCH monitoring inside current COT; such that a UE only monitors for PDCCH from the BWP(s), or the sub-band(s) within the configured BWPs that passes LBT. As a result, the PDCCH monitoring occasions for the UE can potentially be reduced after detecting the NR-U common preamble.

In one instance, if a UE is configured with 4 DL BWPs indexed BWP 0 to BWP 3, and BWP 0 being the active DL BWP previously configured to the UE; assume BWP 0 and BWP 1 fail LBT while BWP 2 and BWP 3 pass LBT. If NR-U common preamble is not supported, then the UE may either need to monitor for PDCCH only on the previously configured active BWP which fails the LBT; or to enable switching to a new active DL BWP that passes LBT within current COT, the UE needs to also monitor for PDCCH on BWP 1, BWP 2 and BWP 3 within current COT; which potentially cause high UE power consumption.

Figure 41A:
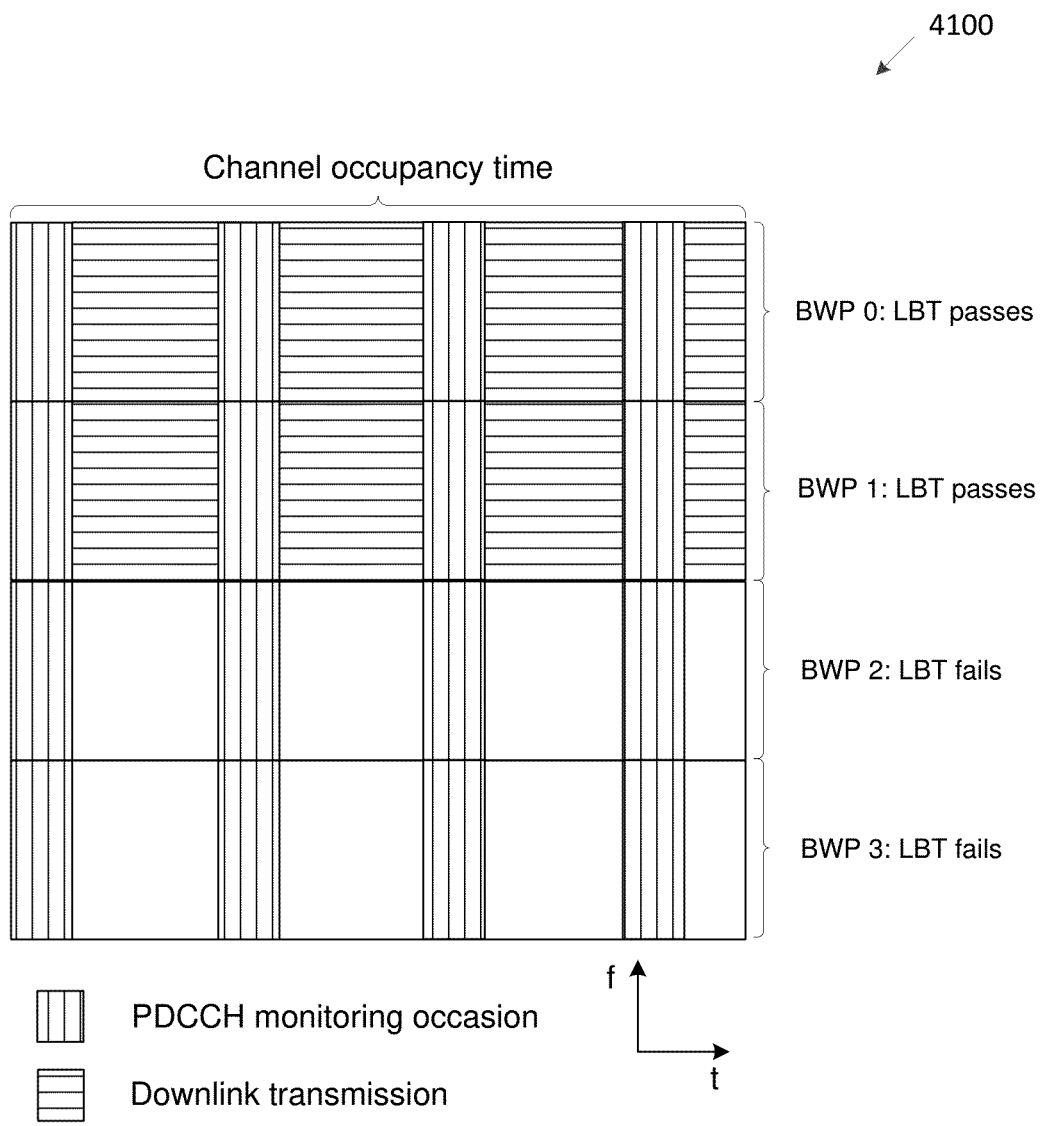
FIG. 41A illustrates an example BWP switching according to embodiments of the present disclosure.

FIG. 41A illustrates an example BWP switching 4100 according to embodiments of the present disclosure. The embodiment of the BWP switching 4100 illustrated in FIG. 41A is for illustration only. FIG. 41A does not limit the scope of this disclosure to any particular implementation.

Figure 41B:
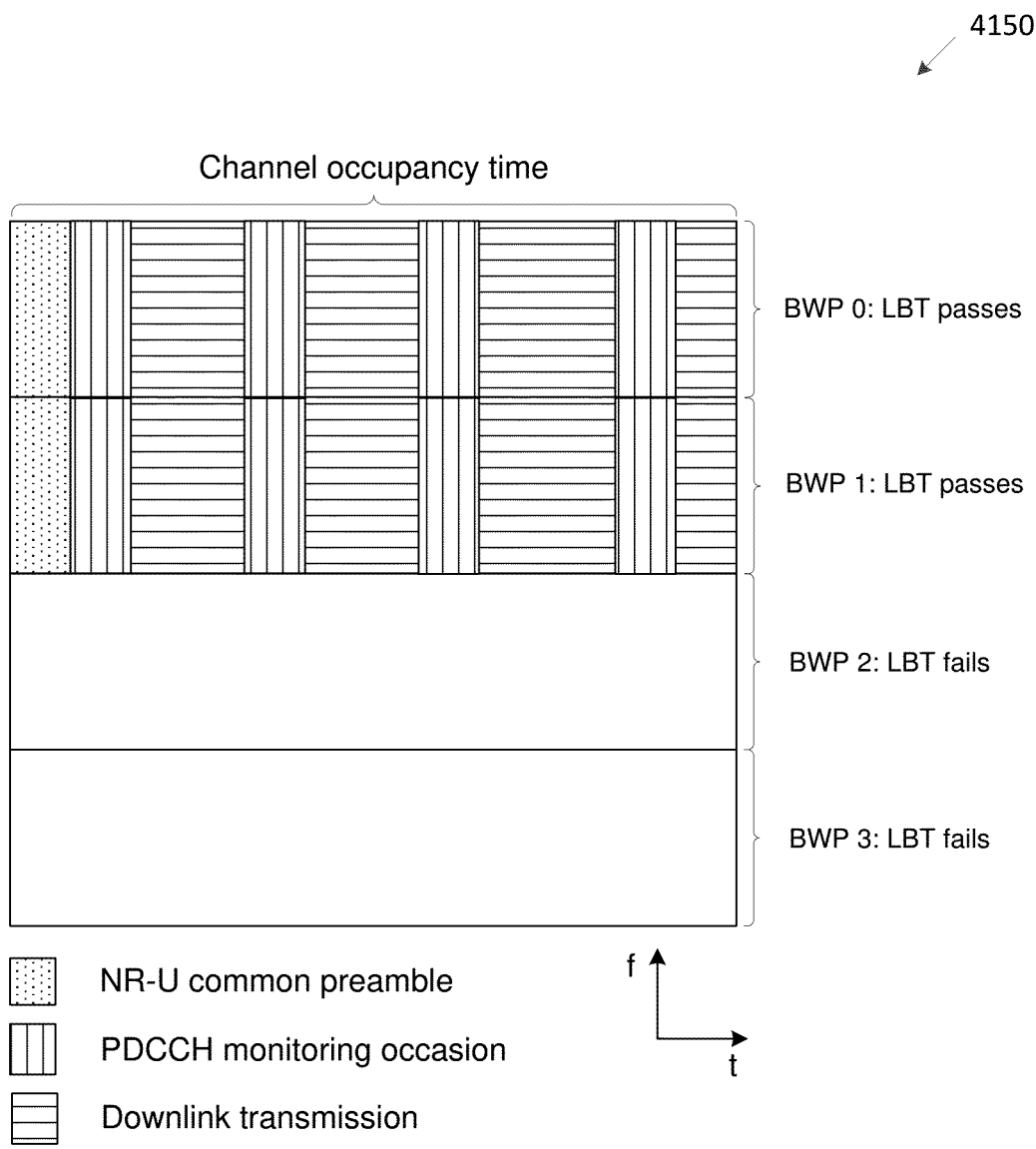
FIG. 41B illustrates another example BWP switching according to embodiments of the present disclosure.

FIG. 41B illustrates another example BWP switching 4150 according to embodiments of the present disclosure. The embodiment of the BWP switching 4150 illustrated in FIG. 41B is for illustration only. FIG. 41B does not limit the scope of this disclosure to any particular implementation.

As illustrated in FIGS. 41A and 41B. By contrast, if an NR-U common preamble is supported, and with NR-U common preamble being detected only on BWP 2 and BWP 3 but not BWP 0 and BWP 1, the UE can down-select to only monitor PDCCH on BWP 2 and BWP 3 for BWP switching. An illustration of this scenario is provided in FIG. 41B.

In one embodiment, an NR-U transmitter can transmit the NR-U common preamble sequence over a subset S of the frequency units that have passed LBT.

In one example, LBT can performed over the entire component carrier bandwidth, and the NR-U common preamble can be transmitted over a sub-band of the component carrier if LBT is passed.

In one sub-example, the sub-band can be of 20 or 40 MHz.

In another sub-example, wherein NR-U preamble reuses Wi-Fi preamble, NR-U can select this sub-band bandwidth to be one of the Wi-Fi supported bandwidth, i.e., 20 MHz (802.11a/n/ac), 40 MHz (802.11n/ac), 80 MHz (802.11ac), 160 MHz (802.11ac); and the Wi-Fi preamble that corresponds to the selected BWP bandwidth can be transmitted by the NR-U transmitter.

In another example, the frequency unit for LBT can be a bandwidth-part (BWP), and NR-U transmitter can perform LBT over multiple BWPs in parallel, and the NR-U common preamble sequence can be transmitted in a subset of the BWP(s) that have successfully passed LBT.

In one sub-example, this example can be applied by the gNB for indicating the active DL BWP to the UE and BWP switching if necessary, through selecting one BWP (if any) among the BWPs that have passed LBT.

In one instance, if a gNB configures 4 BWPs for a UE and the previously configured active DL BWP passes LBT, the gNB can only transmit the NR-U common preamble sequence on the active DL BWP, and the UE that detects the NR-U common preamble can continue to monitor this active DL BWP for PDCCH/PDSCH inside current COT.

In another instance, if a gNB configures 4 BWPs for a UE and the previously configured active DL BWP fails LBT, the gNB can transmit the NR-U common preamble sequence on one of the remaining DL BWPs that have passed LBT, while the UE switches to this DL BWP for receiving PDCCH/PDSCH if the UE detected the NR-U common preamble on this BWP inside current COT.

In another sub-example, an NR-U preamble reuses Wi-Fi preamble and NR-U can select each BWP bandwidth to be one of the Wi-Fi supported bandwidth, i.e., 20 MHz (802.11a/n/ac), 40 MHz (802.11n/ac), 80 MHz (802.11ac), 160 MHz (802.11ac); and the Wi-Fi preamble that corresponds to the selected BWP bandwidth can be transmitted by the NR-U transmitter.

In another example, the frequency unit for LBT can be a sub-band of fixed bandwidth, and NR-U transmitter can perform LBT over multiple sub-bands in parallel, and the NR-U common preamble sequence can be transmitted in a subset of the sub-band(s) that have successfully passed LBT.

In one sub-example, through selecting the sub-band(s) that have passed the LBT to transmit NR-U preamble sequence, a gNB can indicate to the UE the active DL BWP as well as which sub-band(s) within the active DL BWP to monitor to receive PDCCH/PDSCH.

For instance, if a gNB configures 4 BWPs for a UE, and certain sub-band(s) within the previously configured active DL BWP passes LBT, the gNB can transmit the NR-U common preamble sequence on the sub-band(s) within the active DL BWP that passes LBT, while the UE can receive PDCCH/PDSCH only from these sub-band(s) within the active DL BWP inside current COT.

Figure 42:
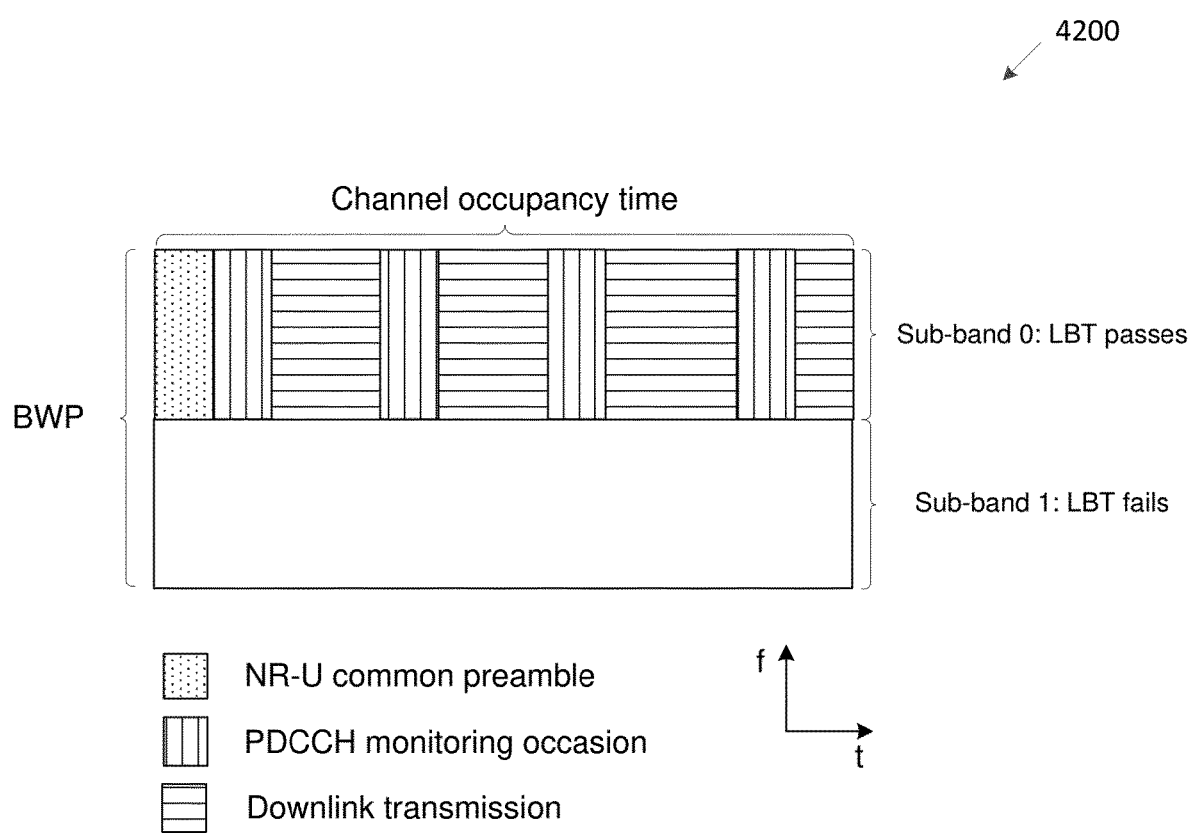
FIG. 42 illustrates an example active BWP according to embodiments of the present disclosure.

FIG. 42 illustrates an example active BWP 4200 according to embodiments of the present disclosure. The embodiment of the active BWP 4200 illustrated in FIG. 42 is for illustration only. FIG. 42 does not limit the scope of this disclosure to any particular implementation.

As illustrated in FIG. 42, the active BWP includes two sub-bands with sub-band 0 passes LBT and sub-band 1 fails LBT; then the gNB would transmit NR-U common preamble on sub-band 0 and only transmits in sub-band 0 for the remaining of the current COT.

In another sub-example, where NR-U preamble reuses Wi-Fi preamble, NR-U can select each sub-band bandwidth to be one of the Wi-Fi supported bandwidth, i.e., 20 MHz (802.11a/n/ac), 40 MHz (802.11n/ac), 80 MHz (802.11ac), 160 MHz (802.11ac); and the Wi-Fi preamble that corresponds to the selected sub-band bandwidth can be transmitted by the NR-U transmitter; or for neighboring consecutive sub-bands that pass LBT and their combined bandwidth is one of the supported Wi-Fi bandwidth, the Wi-Fi preamble that corresponds to the combined sub-bands bandwidth can be transmitted by the NR-U transmitter.

In another example, this means $|a_{k,l}^{(p,\mu)}| \neq 0$ for any $k = i \times \delta + N_{grid,x}^{size,\mu} N_{SC}^{RB}/2 - k_0^\mu$, with $i_m \leq i \leq i_M$ and subcarrier k belongs selected sub-set S within the frequency unit that passes LBT.

Another design consideration is the additional information that can be carried or derived from the NR-U common preamble sequence.

In one embodiment, the NR-U receiver can detect the start of a channel occupancy time by detecting the existence of the NR-U common preamble sequence.

In one example, for NR-U downlink, a UE can detect the start of a COT upon detecting NR-U common preamble sequence; after which the UE can start to monitor for PDCCH until corresponding PDCCH can be received, or the end of the COT is reached, wherein the UE can determine the COT duration as the longest COT allowed by unlicensed regulation (e.g., 8 ms for 5 GHz unlicensed band).

Figure 43:
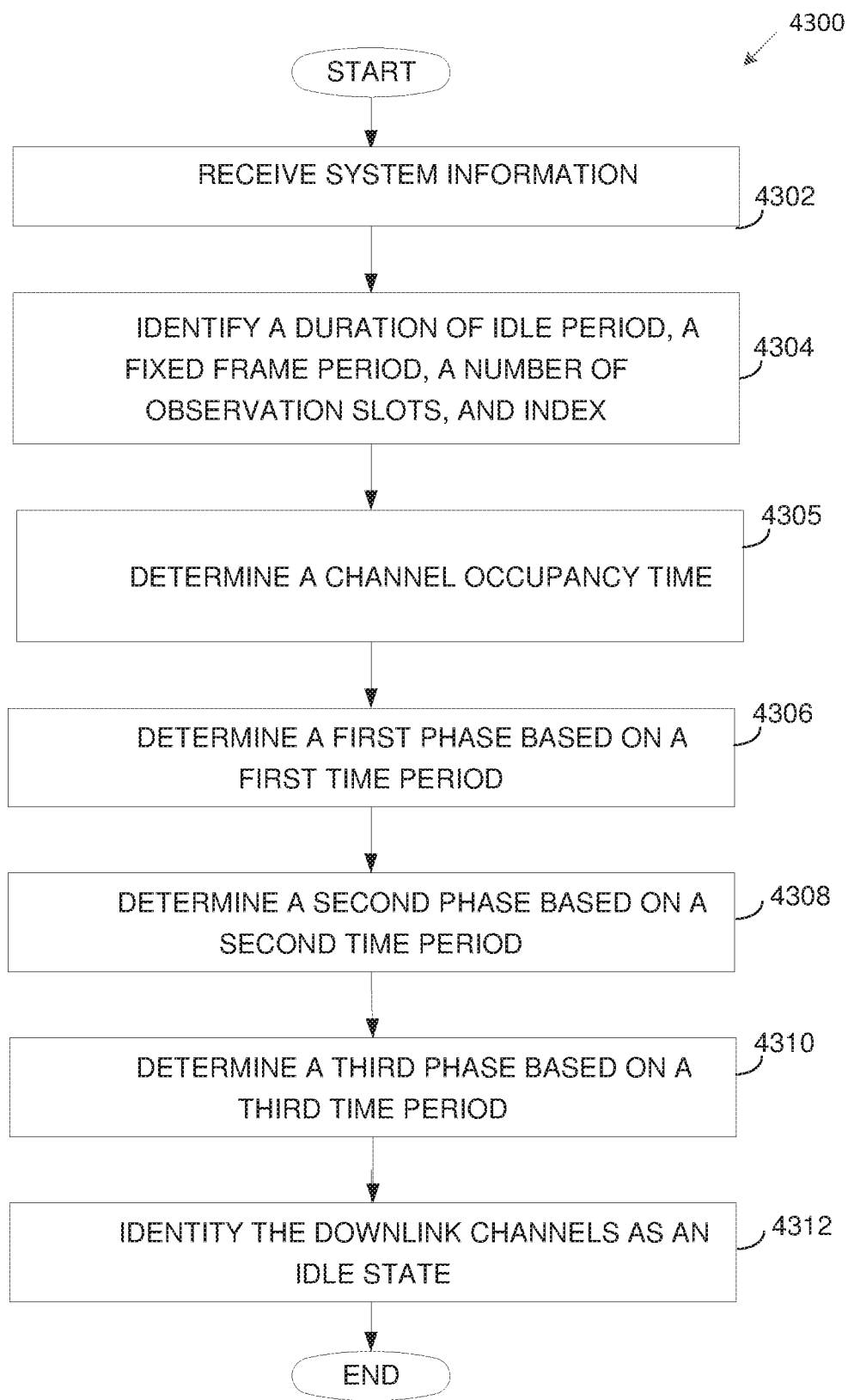
FIG. 43 illustrates a flowchart of a method for a frame-based equipment operation according to embodiments of the present disclosure.

FIG. 43 illustrates a flowchart of a method 4300 for a frame-based equipment operation according to embodiments of the present disclosure, as may be performed by a user equipment (e.g., 111-116 as illustrated in FIG. 1). The embodiment of the method 4300 illustrated in FIG. 43 is for illustration only. FIG. 34 does not limit the scope of this disclosure to any particular implementation.

As illustrated in FIG. 43, the method 4300 begins at step 4302. In step 4302, a UE receives, from a base station (BS), system information carried by downlink channels that are sensed by the BS.

Subsequently, the UE in step 4304 identifies, based on the system information, a duration of idle period, a fixed frame period, a number of observation slots included in the duration of idle period, and an index of at least one observation slot.

Subsequently, the UE in step 4305 determines a channel occupancy time based on the identified duration of idle period and the fized period.

Subsequently, the UE in step 4306 determines a first phase based on a first time period between a starting instance of the idle period and an ending instance of the at least one observation slot.

Subsequently, the UE in step 4308 determines a second phase based on a second time period between the ending instance of the at least one observation slot and an ending instance of the idle period.

Next, the UE in step 4310 determines a third phase based on a third time period between the ending instance of the idle period and an ending instance of the fixed frame period.

Finally, the UE in step 4312 identifies the downlink channels as an idle state in the at least one observation slot.

In one embodiment, the UE determines to assume that the BS does not transmit downlink signals or the downlink channels in the determined first phase.

In one embodiment, the UE receives, from the BS, a preamble in the determined second phase, wherein the preamble includes at least one of information for channel reservation, information for channel sensing, or information for time domain structure of the third phase.

In such embodiment, the preamble includes a signal that is detectable by a coexistence radio access technology (RAT) comprising IEEE 802.11a and a physical downlink control channel (PDCCH).

In one embodiment, the UE receives, from the BS, at least one of PDCCH or a physical downlink shared channel (PDSCH) in the determined third phase.

In one embodiment, the UE receives, from the BS, a group common PDCCH (GC-PDCCH) including information of slot structure that is applicable to slots included in the third phase.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

What is claimed is:

1. A user equipment (UE) in a wireless communication system supporting a semi-static shared spectrum channel access, the UE comprising:
   at least one transceiver configured to receive, from a base station (BS), system information carried by downlink channels that are sensed by the BS; and
   at least one processor operably connected to the at least one transceiver, the at least one processor configured to:
      identify, based on the system information, a duration of idle period, a fixed frame period, a number of observation slots included in the duration of idle period, and an index of at least one observation slot;
      determine a channel occupancy time based on the identified duration of idle period and the fixed frame period;
      determine a first phase based on a first time period between a starting instance of the idle period and an ending instance of the at least one observation slot;
      determine a second phase based on a second time period between the ending instance of the at least one observation slot and an ending instance of the idle period;
      determine a third phase based on a third time period between the ending instance of the idle period and an ending instance of the channel occupancy time; and
      identify the downlink channels as an idle state in the at least one observation slot.

2. The UE of claim 1, wherein the at least one processor is further configured to determine to assume that the BS does not transmit downlink signals or the downlink channels in the determined first phase.

3. The UE of claim 1, wherein the at least one transceiver is further configured to receive, from the BS, a preamble in the determined second phase.

4. The UE of claim 3, wherein the preamble includes at least one of information for channel reservation, information for channel sensing, or information for time domain structure of the third phase.

5. The UE of claim 3, wherein the preamble includes a signal that is detectable by a coexistence radio access technology (RAT) comprising IEEE 802.11a and a physical downlink control channel (PDCCH).

6. The UE of claim 1, wherein the at least one transceiver is further configured to receive, from the BS, at least one of PDCCH or a physical downlink shared channel (PDSCH) in the determined third phase.

7. The UE of claim 1, wherein the at least one transceiver is further configured to receive, from the BS, a group common PDCCH (GC-PDCCH) including information of slot structure that is applicable to slots included in the third phase.

8. A base station (BS) in a wireless communication system supporting a semi-static shared spectrum channel access, the BS comprising:
   at least one processor configured to:
      sense downlink channels to transmit, to a user equipment (UE), system information, and
      generate the system information including a duration of idle period, a fixed frame period, a number of observation slots included in the duration of idle period, and an index of at least one observation slot; and
   at least one transceiver operably connected to the at least one processor, the at least one transceiver configured to transmit, to the UE, the generated system information over the sensed downlink,
   wherein a channel occupancy time is determined based on the duration of idle period and the fixed frame period, and
   wherein a first phase, a second phase, and a third phase are determined based on a first time period between a starting instance of the idle period and an ending instance of the at least one observation slot, a second time period between the ending instance of the at least one observation slot and an ending instance of the idle period, and a third time period between the ending instance of the idle period and an ending instance of the channel occupancy time, respectively, and
   wherein the downlink channels are determined as an idle state in the at least one observation slot.

9. The BS of claim 8, wherein the UE determines to assume that the BS does not transmit downlink signals or the downlink channels in the determined first phase.

10. The BS of claim 8, wherein the at least one transceiver is further configured to transmit, to the UE, a preamble in the determined second phase.

11. The BS of claim 10, wherein the preamble includes at least one of information for channel reservation, information for channel sensing, or information for time domain structure of the third phase.

12. The BS of claim 10, wherein the preamble includes a signal that is detectable by a coexistence radio access technology (RAT) comprising IEEE 802.11a and a physical downlink control channel (PDCCH).

13. The BS of claim 8, wherein the at least one transceiver is further configured to transmit, to the UE, at least one of PDCCH or a physical downlink shared channel (PDSCH) in the determined third phase.

14. The BS of claim 8, wherein the at least one transceiver is further configured to transmit, to the UE, a group common PDCCH (GC-PDCCH) including information of slot structure that is applicable to slots included in the third phase.

15. A method of a user equipment (UE) in a wireless communication system supporting a semi-static shared spectrum channel access, the method comprising:
   receiving, from a base station (BS), system information carried by downlink channels that are sensed by the BS;
   identifying, based on the system information, a duration of idle period, a fixed frame period, a number of observation slots included in the duration of idle period, and an index of at least one observation slot;
   determining a channel occupancy time based on the identified duration of idle period and the fixed frame period;
   determining a first phase based on a first time period between a starting instance of the idle period and an ending instance of the at least one observation slot;
   determining a second phase based on a second time period between the ending instance of the at least one observation slot and an ending instance of the idle period;
   determining a third phase based on a third time period between the ending instance of the idle period and an ending instance of the channel occupancy time; and
   identifying the downlink channels as an idle state in the at least one observation slot.

16. The method of claim 15, further comprising determining to assume that the BS does not transmit downlink signals or the downlink channels in the determined first phase.

17. The method of claim 15, further comprising receiving, from the BS, a preamble in the determined second phase, wherein the preamble includes at least one of information for channel reservation, information for channel sensing, or information for time domain structure of the third phase.

18. The method of claim 17, wherein the preamble includes a signal that is detectable by a coexistence radio access technology (RAT) comprising IEEE 802.11a and a physical downlink control channel (PDCCH).

19. The method of claim 15, further comprising receiving, from the BS, at least one of PDCCH or a physical downlink shared channel (PDSCH) in the determined third phase.

20. The method of claim 15, further comprising receiving, from the BS, a group common PDCCH (GC-PDCCH) including information of slot structure that is applicable to slots included in the third phase.

\* \* \* \* \*